US008577538B2

(12) United States Patent
Lenser et al.

(10) Patent No.: US 8,577,538 B2
(45) Date of Patent: Nov. 5, 2013

(54) METHOD AND SYSTEM FOR CONTROLLING A REMOTE VEHICLE

(75) Inventors: Scott Raymond Lenser, Waltham, MA (US); Christopher Vernon Jones, Woburn, MA (US); Brian Masao Yamauchi, Boston, MA (US)

(73) Assignee: iRobot Corporation, Bedford, MA (US)

( * ) Notice: Subject to any disclaimer, the term of this patent is extended or adjusted under 35 U.S.C. 154(b) by 1702 days.

(21) Appl. No.: 11/826,541

(22) Filed: Jul. 16, 2007

(65) Prior Publication Data

US 2008/0027591 A1 Jan. 31, 2008

Related U.S. Application Data

(63) Continuation-in-part of application No. 11/618,742, filed on Dec. 30, 2006, now Pat. No. 7,539,557.

(60) Provisional application No. 60/807,434, filed on Jul. 14, 2006, provisional application No. 60/871,771, filed on Dec. 22, 2006, provisional application No. 60/822,176, filed on Aug. 11, 2006.

(51) Int. Cl.
*G05D 1/00* (2006.01)

(52) U.S. Cl.
USPC .................. 701/28; 701/2; 701/300; 701/301

(58) Field of Classification Search
USPC .................. 700/259; 701/2, 28, 300, 301
See application file for complete search history.

(56) References Cited

U.S. PATENT DOCUMENTS

| 4,556,313 | A | 12/1985 | Miller, Jr. et al. |
| 4,751,658 | A | 6/1988 | Kadonoff et al. |
| 4,777,416 | A | 10/1988 | George, II et al. |
| 4,811,228 | A | 3/1989 | Hyyppa et al. |
| 4,962,453 | A | 10/1990 | Pong et al. |
| 5,006,988 | A | 4/1991 | Borenstein et al. |

(Continued)

FOREIGN PATENT DOCUMENTS

| JP | 62154008 | 7/1987 |
| JP | 9185410 | 7/1997 |
| JP | 2003036116 | 2/2003 |

OTHER PUBLICATIONS

Sebastian Thrun, *Learning Occupancy Grid Maps With Forward Sensor Models*, School of Computer Science, Carnegie Mellon University, pp. 1-28.

(Continued)

*Primary Examiner* — James Trammell
*Assistant Examiner* — Jerrah Edwards
(74) *Attorney, Agent, or Firm* — Honigman Miller Schwartz and Cohn LLP

(57) ABSTRACT

A system for controlling more than one remote vehicle. The system comprises an operator control unit allowing an operator to receive information from the remote vehicles and send commands to the remote vehicles via a touch-screen interface, the remote vehicles being capable of performing autonomous behaviors using information received from at least one sensor on each remote vehicle. The operator control unit sends commands to the remote vehicles to perform autonomous behaviors in a cooperative effort, such that high-level mission commands entered by the operator cause the remote vehicles to perform more than one autonomous behavior sequentially or concurrently. The system may perform a method for generating obstacle detection information from image data received from one of a time-of-flight sensor and a stereo vision camera sensor.

8 Claims, 46 Drawing Sheets

(56) References Cited

U.S. PATENT DOCUMENTS

| | | | |
|---|---|---|---|
| 5,040,116 | A | 8/1991 | Evans et al. |
| 5,319,611 | A | 6/1994 | Korba |
| 5,321,614 | A | 6/1994 | Ashworth |
| 5,465,525 | A | 11/1995 | Mifune et al. |
| 5,467,273 | A | 11/1995 | Faibish et al. |
| 5,682,313 | A | 10/1997 | Edlund et al. |
| 5,684,695 | A | 11/1997 | Bauer |
| 5,812,267 | A | 9/1998 | Everett, Jr. et al. |
| 5,819,008 | A | 10/1998 | Asama et al. |
| 6,108,076 | A | 8/2000 | Hanseder |
| 6,240,342 | B1 | 5/2001 | Fiegert et al. |
| 6,374,155 | B1 | 4/2002 | Wallach et al. |
| 6,463,368 | B1 | 10/2002 | Feiten et al. |
| 6,487,303 | B1* | 11/2002 | Yamaguchi et al. .......... 382/103 |
| 6,496,755 | B2 | 12/2002 | Wallach et al. |
| 6,611,738 | B2 | 8/2003 | Ruffner |
| 6,819,779 | B1* | 11/2004 | Nichani ........................ 382/104 |
| 6,886,651 | B1 | 5/2005 | Slocum et al. |
| 6,999,850 | B2 | 2/2006 | McDonald |
| 7,024,278 | B2 | 4/2006 | Chiappetta et al. |
| 7,069,124 | B1 | 6/2006 | Whittaker et al. |
| 7,085,624 | B2 | 8/2006 | Aldred et al. |
| 7,206,677 | B2 | 4/2007 | Hulden |
| 7,386,163 | B2* | 6/2008 | Sabe et al. .................... 382/153 |
| 8,009,871 | B2* | 8/2011 | Rafii et al. .................... 382/106 |
| 2003/0135327 | A1 | 7/2003 | Levine et al. |
| 2003/0169906 | A1* | 9/2003 | Gokturk et al. ............... 382/115 |
| 2004/0039509 | A1 | 2/2004 | Breed |
| 2004/0096082 | A1* | 5/2004 | Nakai et al. ................... 382/104 |
| 2004/0252862 | A1* | 12/2004 | Camus et al. ................. 382/104 |
| 2006/0041333 | A1* | 2/2006 | Anezaki ........................ 700/259 |
| 2006/0293856 | A1* | 12/2006 | Foessel et al. ................ 701/301 |
| 2007/0156286 | A1* | 7/2007 | Yamauchi ..................... 700/245 |
| 2008/0009965 | A1 | 1/2008 | Bruemmer et al. |
| 2008/0109126 | A1 | 5/2008 | Sandin et al. |

OTHER PUBLICATIONS

Cameron Morland, *Autonomous Lawn Mower Control*, Jul. 24, 2002.
Fox, Markov Localization: A Probabilistic Framework for Mobile Robot Localization and Navigation, Ph.D. Thesis, Dept. of Computer Science, Univ. of Bonn, Germany, Dec. 1998.
Leonard et al., Simultaneous map building and localization for an autonomous mobile robot, Int'l Proceedings, IEEE Int'l Workshop on Intelligent Robots and Systems, pp. 1442-1447, Osaka, Japan, Nov. 1991.
Haehnel et al., A highly efficient FastSLAM algorithm for generating cyclic maps of large-scale environments from raw laser range measurements, Int'l Proceedings of the Conference on Intelligent Robots and Systems (IROS), 2003.
Eliazar et al., DP-SLAM: Fast, Robust Simultaneous Localization and Mapping Without Predetermined Landmarks, IJCAI, 2003.
Trouvain et al., Comparison of a map- vs. camera-based user interface in a multi-robot navigation task, Systems, Man and Cybernetics, IEEE International Conference, pp. 3224-3231, vol. 4, Oct. 5-8, 2003.
Bruemmer et al., Mixed-initiative control for remote characterization of hazardous environments, System Sciences, Proceedings of the 36th Annual Hawaii International Conference, Jan. 2003.
Powell et al., Multi-Robot Operator Control Unit, Proceedings of SPIE 6230, pp. 562-569, Apr. 2006.
Carroll et al., Command and Control for Mixed Manned and Unmanned Security Forces, Space and Naval Warfare Systems Center San Diego, 2003.
Borenstein, J. and Koren, Y., "Real-Time Obstacle Avoidance for Fast Mobile Robots." *IEEE Transactions on Systems, Man, and Cybernetics*, vol. 19, No. 5, Sep./Oct. 1989, pp. 1179-1187.
Cummings, M. L. and Mitchell, P. M., "Managing Multiple UAVs through a Timeline Display." in *AIAA 5th Aviation, Technology, Integration, and Operations Conference*, Arlington, VA, Sep. 2005.
Fontana, Robert J., "Recent System Applications of Short-Pulse Ultra-Wideband (UWB) Technology," *IEEE Microwave Theory & Tech.*, vol. 52, No. 9, Sep. 2004, pp. 2087-2104, 2004.
Goodrich, M. A. and Olsen, Jr., D. R. "Seven Principles of Efficient Interaction." *Proceedings of IEEE International Conference on Systems, Man, and Cybernetics*, Oct. 2003, pp. 3943-3948.
Macedo, J., Manduchi, Roberto, and Matthies, Larry, "Ladar-Based Discrimination of Grass from Obstacles for Autonomous Navigation," in *Proceedings of ISER '00 (Seventh International Symposium on Experimental Robotics)*, Honolulu, HI, 2000.
Moravec, Hans, and Elfes, Alberto, "High Resolution Maps From Wide Angle Sonar." In *Proceedings of the 1985 IEEE International Conference on Robotics and Automation*, pp. 116-121, 1985.
Scharfenberg, Kevin, "KOUN Case Study, Sep. 18, 2002: Large Hail," http://www.cimms.ou.edu/~kscharf/hail/. See also the Polarimetric Case Studies Website at http://www.cimms.ou.edu/~kscharf/pol/.
Scharfenberg, Kevin, "Polarimetric Radar Signatures in Microburst-Producing Thunderstorms," *31st International Conference on Radar Meteorology*, Seattle, WA, American Meteorological Society, pp. 581-584, 2003.
Yamauchi, B., "A Frontier-Based Approach for Autonomous Exploration," In *Proceedings of the 1997 IEEE International Symposium on Computational Intelligence in Robotics and Automation*, Monterey, CA, Jul. 1997.
Yamauchi, B., "Frontier-Based Exploration Using Multiple Robots," *Journal of Robotics and Autonomous Systems*, vol. 29, No. 2-3, Nov. 1999.
Yamauchi, B., "PackBot: A Versatile Platform for Military Robotics." in *Unmanned Ground Vehicle Technology VI*, Proceedings of SPIE, vol. 5422, Orlando, FL, Apr. 2004.
Yamauchi, B., "PackBot: A Versatile Platform for Mililtary Robotics," May 10, 2004.
Yamauchi, B., "The Wayfarer Modular Navigation Payload for Intelligent Robot Infrastructure." in *Unmanned Ground Vehicle Technology VII*, edited by Grant Gerhart, Charles Shoemaker, and Douglas W. Gage, Proceedings of SPIE, vol. 5804 (SPIE, Bellingham, WA, 2005), pp. 85-96.
Yamauchi, B., "Autonomous Urban Reconnaissance Using Man-Portable UGVs," *Proceedings of SPIE: Unmanned Ground Vehicle Technology VIII*, Orlando, FL, Apr. 2006.
Yamauchi, B., "Daredevil: Ultra Wideband Radar Sensing for Small UGVs," *Proceedings of SPIE: Unmanned Ground Vehicle Technology IX*, Orlando, FL, Apr. 2007.
Yamauchi, B., "(KICKOFF) Wayfarer: Autonomous Urban Reconnaissance Using Small UGVs" (30 pages) Nov. 25, 2003.
Yamauchi, B., "(BRIEF) Wayfarer: Autonomous Urban Reconnaissance Using Small UGVs" (19 pages) Jun. 24, 2004.
Thrun et al., Probabilistic Robotics, MIT Press, Sep. 2005.

\* cited by examiner

METHOD AND SYSTEM FOR CONTROLLING A REMOTE VEHICLE

This is a continuation-in-part of U.S. patent application Ser. No. 11/618,742, filed Dec. 30, 2006 now U.S. Pat. No. 7,539,557, entitled Autonomous Mobile Robot. This application claims priority to U.S. Provisional Patent Application No. 60/807,434, filed Jul. 14, 2006, entitled Mobile Robot, Robotic System, and Robot Control Method, U.S. Provisional Patent Application No. 60/871,771, filed Dec. 22, 2006, entitled System for Command and Control of Small Teleoperated Robots, and U.S. Provisional Patent Application No. 60/822,176, filed Aug. 11, 2006, entitled Ground Vehicle Control. The entire contents of the above-listed patent applications are incorporated by reference herein.

STATEMENT REGARDING FEDERALLY SPONSORED RESEARCH OR DEVELOPMENT

This invention was made with Government support under contract No. W56 HZV-04-C-0684, awarded by the U.S. Army (TACOM/TARDEC). The Government has certain rights in the invention.

FIELD OF THE INVENTION

This invention relates to vehicles having autonomous capabilities and operator control of more than one remote vehicle at a time, the remote vehicles being at least semi-autonomous and able to undertake a cooperative effort.

BACKGROUND OF THE INVENTION

Remote vehicles are increasingly being used in military operations for tasks such as ordinance or explosives handling or disposal, field reconnaissance, terrain mapping, and various other procedures. These remote vehicles are commonly equipped with video cameras and have been used to scout hostile positions in environments such as caves or other non-urban terrain. Such remote vehicles cab be restricted in their operative range to line-of-sight or areas substantially proximal to the teleoperator, due to real-time wireless communications issues (for example, limited wireless bandwidth availability and/or transmission power for transmitting live camera signals to a teleoperator station) presented by remote vehicles that cannot operate autonomously but instead rely entirely on continuous real-time remote control.

In addition, military operations in urban environments may be increasingly common because of political and sociological reasons, and require increase levels of situational awareness. Aerial and satellite reconnaissance can provide valuable information to enhance situational awareness in urban environments, but can only provide limited real-time information to ground troops about what lies around the next corner or on the next block. Military personnel currently perform such reconnaissance tasks themselves, potentially placing themselves at great risk in hostile urban environments.

Although remote vehicles are increasingly being deployed for reconnaissance, non-autonomous remote vehicles are limited by both radio range, interference and the need for a full-time operator. In urban environments particularly, radio signal attenuation caused by buildings or radio interference may substantially reduce the operational range of such non-autonomous remote vehicles. In addition, the need for an operator to devote continuous attention to operating the remote throughout the duration of an operation increases the manpower requirements associated with such reconnaissance.

The speed and/or accuracy of reconnaissance and other missions performed by remote vehicles could be increased if remote vehicles are controlled to cooperate in accomplishing a mission.

In addition, the ability of an operator to control more than one remote vehicle at a time in performing a mission would decrease manpower requirements for missions utilizing remote vehicles.

The effective control and coordination of more than one remote vehicle is both challenging and necessary if such systems are to be successfully deployed. To date, remote vehicles have not been able to operate completely autonomously in scenarios where objectives may be vague, conflicting, or continuously changing.

Providing remote vehicles with the ability to perform certain tasks autonomously, particularly when combined with a user interface for the remote vehicle control system that allows a single human operator to control more than one remote vehicle in an efficient and coordinated manner, would increase the usefulness of remote vehicles in a variety of applications.

To appropriately control more than one remote vehicle, the operator should have adequate situational awareness regarding the spatial proximity, health status, etc. of each remote vehicle, along with perhaps its ability to accomplish and progress toward successfully accomplishing operator-controlled high-level goals. Although the remote vehicles need some level of autonomy, the operator should retain an interface to command the individual remote vehicles at a low-level in the event the remote vehicles fail to execute desired actions autonomously.

SUMMARY OF THE INVENTION

The invention provides a system for controlling a remote vehicle, comprising an operator control unit allowing an operator to receive information from the remote vehicle and send commands to the remote vehicle via a touch-screen interface, the remote vehicle being capable of performing autonomous behaviors using information received from at least one sensor on the remote vehicle. The operator control unit sends commands to the remote vehicle to perform autonomous behaviors, such that high-level mission commands entered by the operator cause the remote vehicle to perform more than one autonomous behavior sequentially or concurrently, and low-level teleoperation commands entered by the operator cause non-autonomous operation of the remote vehicle. The operator control unit displays remote vehicle information to the operator, allowing the operator to monitor a status and progress of the remote vehicle.

The invention also provides a system for controlling more than one remote vehicle, comprising an operator control unit allowing an operator to receive information from the remote vehicles and send commands to the remote vehicles via a touch-screen interface, the remote vehicles being capable of performing autonomous behaviors using information received from at least one sensor on each remote vehicle. The operator control unit sends commands to the remote vehicles to perform autonomous behaviors in a cooperative effort, such that high-level mission commands entered by the operator cause the remote vehicles to perform more than one autonomous behavior sequentially or concurrently. The operator control unit displays remote vehicle information to the operator, allowing the operator to monitor a status and progress of each remote vehicle.

The invention also provides a method for controlling more than one remote vehicle. The method comprises starting an operator control unit and a remote vehicle controllable by the operator control unit, teleoperating the remote vehicle with the operator control unit to perform simultaneous localization and mapping, sending data from the remote vehicle to the operator control unit, the data including a map generated during simultaneous localization and mapping, starting other remote vehicles and sending data to the started remote vehicles including the map generated during simultaneous localization and mapping, each of the started remote vehicles localizing itself relative to the map, sending data from the started remote vehicles to the operator control unit, the data including each remote vehicle's initial localization information and additional localization information that is updated at predetermined intervals, displaying data sent to the operator control unit to an operator, and inputting operator commands via a touch-screen interface of the operator control unit to control the started remote vehicles.

The invention also provides a system for controlling one or more remote vehicles. The system includes an operator control unit with a touch-screen user interface comprising an initial screen including a map view window that facilitates operator entry of high-level mission commands to one or more remote vehicles, a remote vehicle selection/detection window allowing the operator to see which remote vehicles have been detected by the operator control unit and select among those vehicles to display a detailed window for the selected remote vehicle, the detailed window including status information regarding the remote vehicle, and a button or icon for launching a control application including the initial screen and the remote vehicle selection/detection window. The map view window displays a map of a remote vehicle environment.

The invention further provides a method for generating an occupancy grid map from image data received from one of a time-of-flight sensor and a stereo vision camera sensor. The method comprises determining a direction for each pixel of the image data from the sensor and combining the direction with a detected potential obstacle depth reading for that pixel, using the combined direction and depth information to plot points, sequentially, for each column of the image data, each point representing a distance of a detected potential obstacle from the remote vehicle and a direction of the detected potential object, creating one or more best-fit lines from a predetermined number of sequential plotted points, determining the slope of each best-fit line, and determining the existence of an obstacle if the slope of the best-fit line is above a predetermined threshold slope, creating a one-dimensional set of values, derived from the best-fit lines, representing the distance to any obstacle detected by the sensor and indexed by angle from the platform, creating the occupancy grid map from the one-dimensional set of values by incrementing a cell of the occupancy grid map if an obstacle was detected within that cell, and adding a location of the remote vehicle to the occupancy grid map.

The invention further provides a method for generating obstacle detection information from image data received from one of a time-of-flight sensor and a stereo vision camera sensor. The method comprises determining a direction for each pixel of the image data from the sensor and combining the direction with a detected potential obstacle depth reading for that pixel, using the combined direction and depth information to plot points, sequentially, for each column of the image data, each point representing a distance of a detected potential obstacle from the remote vehicle and a direction of the detected potential object, creating one or more best-fit lines from a predetermined number of sequential plotted points, determining the slope of each best-fit line, and determining the existence of an obstacle if the slope of the best-fit line is above a predetermined threshold slope, and creating a one-dimensional set of values, derived from the best-fit lines, representing the distance to any obstacle detected by the sensor and indexed by angle from the platform.

The invention still further provides a method for controlling one or more remote vehicles by touching a screen. The method comprises launching a control application including an initial screen allowing touch navigation to a map view window, a remote vehicle availability window, and one or more remote vehicle detail windows, selecting at least one remote vehicle to control via touch-screen manipulation of the remote vehicle availability window, issuing high-level commands for at least one selected remote vehicle via touch screen manipulation of the map view window, and issuing low-level teleoperation commands for at least one selected remote vehicle via touch-screen manipulation of a remote vehicle detail window.

The invention also provides a touch-screen user interface for controlling one or more remote vehicles. The touch-screen user interface includes a control application and comprises an initial screen allowing touch navigation to a map view window, a remote vehicle availability window, and one or more remote vehicle detail windows. The remote vehicle availability window allows touch-screen selection of at least one remote vehicle to control. The map view window allows touch-screen issuance of high-level commands for at least one remote vehicle. The remote vehicle detail window allows touch-screen issuance of low-level teleoperation commands for at least one remote vehicle.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Figure 1:
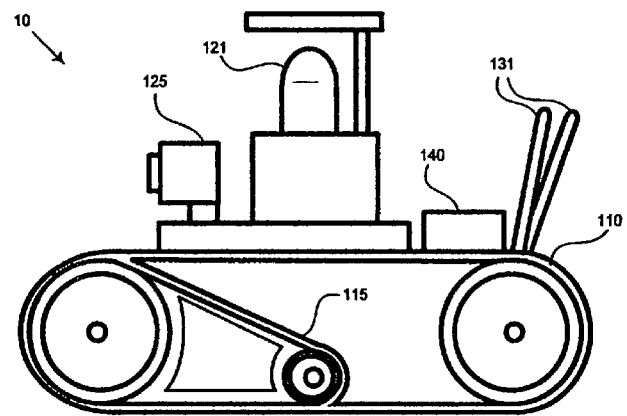
FIG. 1 illustrates a side view of an embodiment of a remote vehicle in accordance with the present invention.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF THE INVENTION

The present invention contemplates enabling remote vehicles to perform certain semi- or fully-autonomous behaviors and cooperate in performing such autonomous behaviors, including reconnaissance missions in urban, industrial, or other such developed environments where navigation can be challenging. The remote vehicles are capable of exploring beyond the range of radio communications required for non-autonomous remote vehicles to perform such missions, generating detailed maps of complex urban terrain, recording and/or transmitting video and infrared image data, and returning to provide up-to-date reconnaissance information.

In accordance with the present invention, remote vehicles are provided with the capability to perform certain mission-specific behaviors, such as reconnaissance behaviors, in a fully-autonomous or semi-autonomous manner. These behaviors may include, for example, route reconnaissance (in which the remote vehicle is provided with one or more waypoints to be traversed while recording a map of its environment as it travels the path defined by the waypoints), perimeter reconnaissance (in which the remote vehicle circumnavigates a building or other structure by identifying and following the walls of the structure, while recording and/or transmitting a map of the terrain along the perimeter of the building), and street reconnaissance (in which the remote vehicle travels a particular distance down a road or street, and returns to its initial location, while recording a map of the road).

As such, instead of necessarily using excessive computational or sensory resources to solve the general problems of complex machine vision and navigation in remote vehicles, an embodiment of the present invention contemplates enabling autonomy of certain mission-specific tasks.

In view of the above, a remote vehicle and associate control system and method are discussed herein that are capable of autonomously performing navigational and other mission-specific tasks, as well as other functions. The remote vehicle may perform, for example, perimeter tracking and/or street traversal reconnaissance in autonomous or semi-autonomous operation, while avoiding obstacles. The remote vehicle uses input from a variety of sensors, for example, range-finding or proximity sensors, optical sensors or machine vision techniques to perform its tasks. The range-finding sensors may include, for example, LIDAR, radar, or sonar ranging sensors, and preferably also includes a stereo vision system, a global positioning satellite receiver, an inertial navigation system (INS), and/or an odometer.

According to an embodiment of the invention, more than one remote vehicle can be monitored and controlled by a single operator. Additionally, the remote vehicles can be controlled to perform cooperative efforts, such as cooperative reconnaissance wherein remote vehicles each perform reconnaissance over a portion of an area or cover the same area to provide additional or reconfirmed data about that area. In a specific example, two remote vehicles can start out in opposite directions to provide perimeter reconnaissance, thus performing such reconnaissance in about half the time.

The present invention also contemplates providing the remote vehicles with an autonomous, persistent obstacle avoidance system enabling the remote vehicles to avoid collisions with a wide range of obstacles, which is particularly helpful in crowded urban environments.

Figure 2:
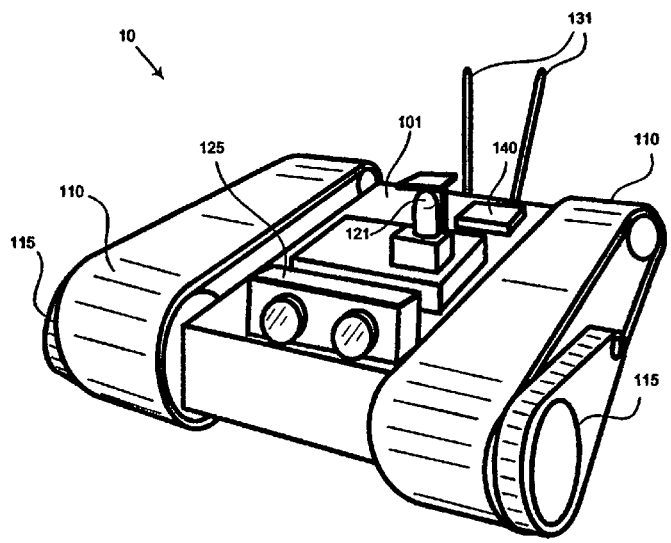
FIG. 2 illustrates a front perspective view of the remote vehicle of FIG. 1.

FIGS. 1 and 2 illustrate an embodiment of a remote vehicle 10 having payloads with sensors, processors, and peripherals that assist in performing autonomous behaviors such as autonomous navigation in urban environments while generating a map of the area around its traveled path. The remote vehicle 10 includes a range-finding system 121 that can scan the environment surrounding the remote vehicle to detect reflective surfaces of objects such as walls, automobiles, trees, furniture, etc. Data from the range-finding system is used to generate and maintain an occupancy grid map of the remote vehicle's environment along its path of travel, which can be used by an autonomous behavior such as obstacle avoidance and/or conveyed to the operator of the remote vehicle 10. Furthermore, by identifying patterns in the range-finding data corresponding to linear arrangements or features, structures such as streets, fences, or rectangular buildings may be used as navigational landmarks for orienting the remote vehicle's direction of travel.

The illustrated remote vehicle embodiment 10 includes a control unit or processor 140 for executing control software, processing sensor input and commands from an operator, and controlling the components and subsystems of the remote vehicle 10. In accordance with an embodiment of the invention, the control software includes sets of computer software corresponding to various remote vehicle behaviors and routines, and also includes operation routines that orchestrate high-level missions or operations in response to commands received from the operator. For example, the control software may include routines for a follow-perimeter operation, a follow-street operation, and a follow-waypoints operation that can be selected by the operator via an operator control unit (OCU), embodiments of which are described in more detail below. Various concurrent behaviors or routines may additionally be running, such as an obstacle avoidance behavior or a stasis detection behavior that function automatically during operation of the remote vehicle 10.

The chassis 101 of the remote vehicle 10 may include a payload bay into which the processor 140 or other/additional components, such as the stereo vision system 125 or range finding system 121, may be detachably installed. The stereo vision system 125 may include, for example, a Point Grey Flea color camera or a Tyzx G2 stereo vision system.

The range finding system 121 may include a scanning light source (for example, an infrared laser that is continuously rotated to scan and detect reflective surfaces of objects positioned anywhere around the remote vehicle) and corresponding detector or other LIDAR (light detection and ranging) system, as shown in FIGS. 1 and 2. In an embodiment of the invention, SICK LIDAR is utilized.

Data from the range finding system 121 typically includes patterns or clusters of dots indicating that an object was detected by the range finder at the location corresponding to the dot (see, e.g., 16, illustrating, in the lower right corner, an occupancy grid map generated by a remote vehicle circumnavigating a building interior). In an embodiment of the invention, to identify linear features and select an appropriate heading to follow among the linear features, the remote vehicle 10 analyzes the range finder data using a Hough transform.

Hough transform techniques may be employed to detect walls and road orientations for various navigation behaviors in accordance with the present invention. The Hough transform is a computer vision technique that works by transforming image point coordinates into votes in the parameter space of possible lines. Each point corresponds to a vote for all of the lines that pass through that point. By finding the strongest points in the parameter space, the Hough transform can determine the parameterized equations for the strongest lines in the image.

The Hough transform is able to reliably find linear features in the range finder data and determine their location and orientation. Using the Hough transform in both outdoor and indoor environments, a remote vehicle employing the Hough transform may reliably detect exterior building walls, interior hallway walls, street curbs, and rows of parked cars, for example.

In accordance with at least one non-limiting example, the Hough transform processes range data from a LIDAR and calculates the strongest line orientations and offsets relative to the remote vehicle's current position. This system is highly accurate and reliable in determining the location and orientation of walls indoors and shows promising levels of accuracy and reliability outdoors.

Figure 38:
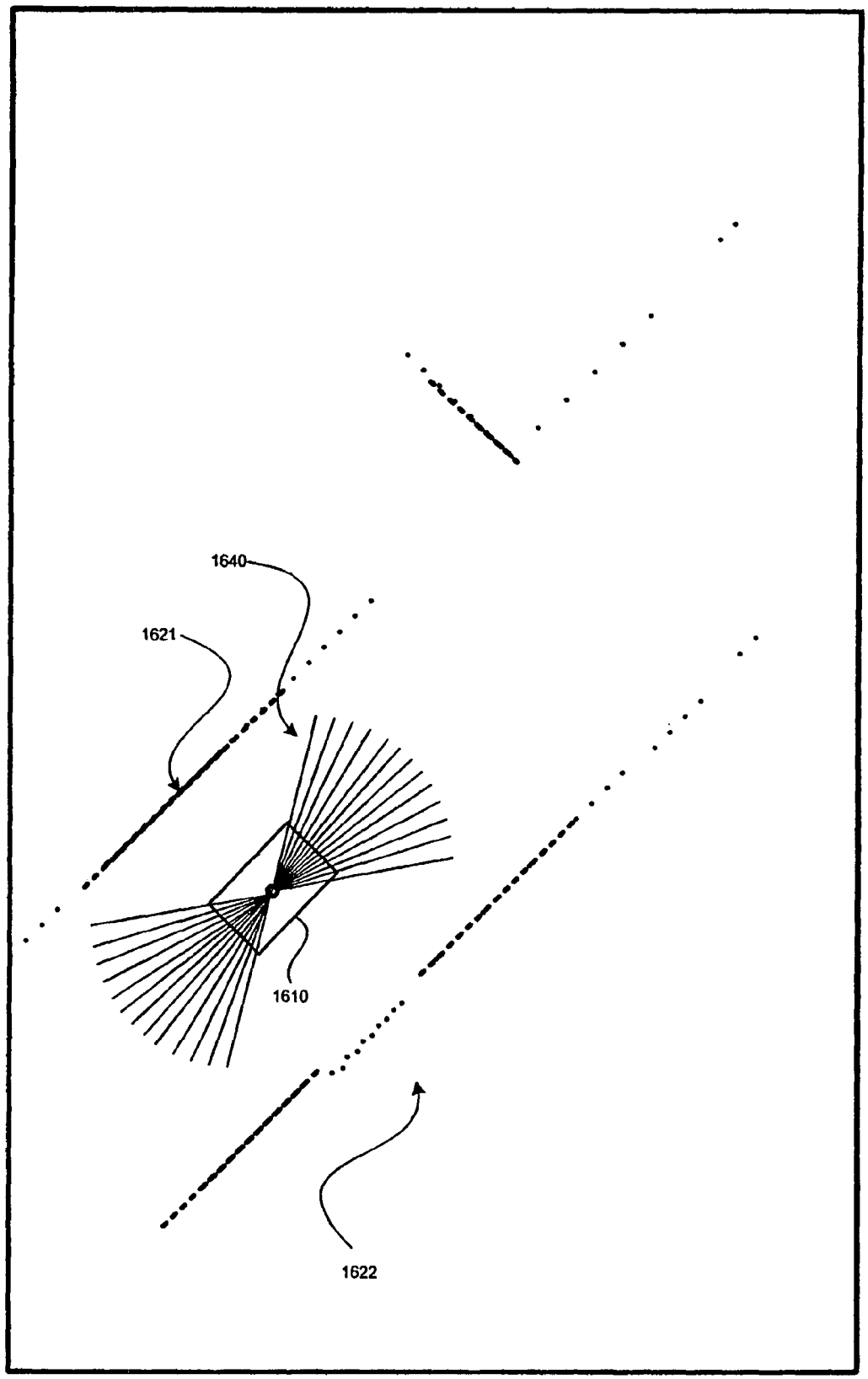
Figure 39:
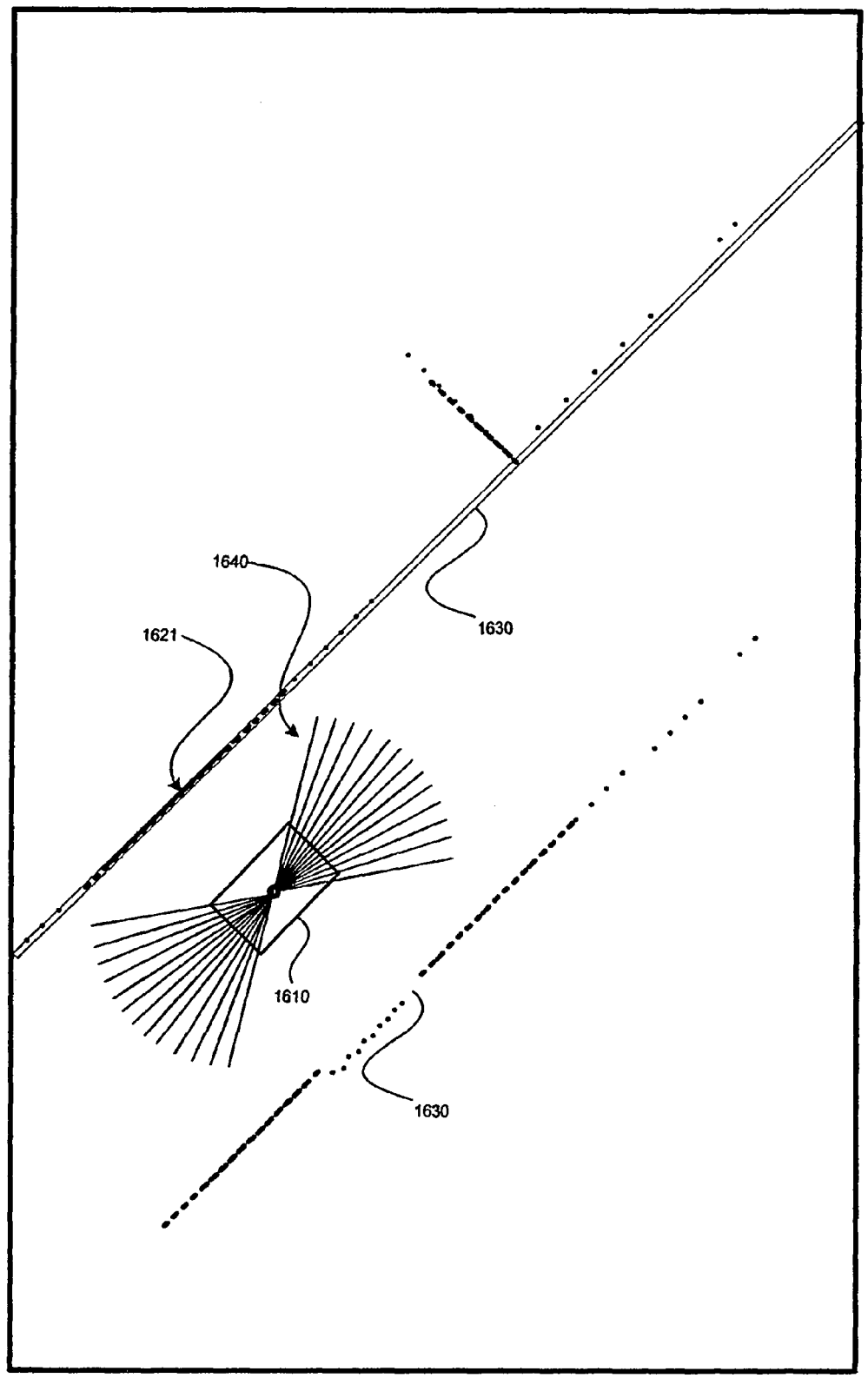
Figure 40:
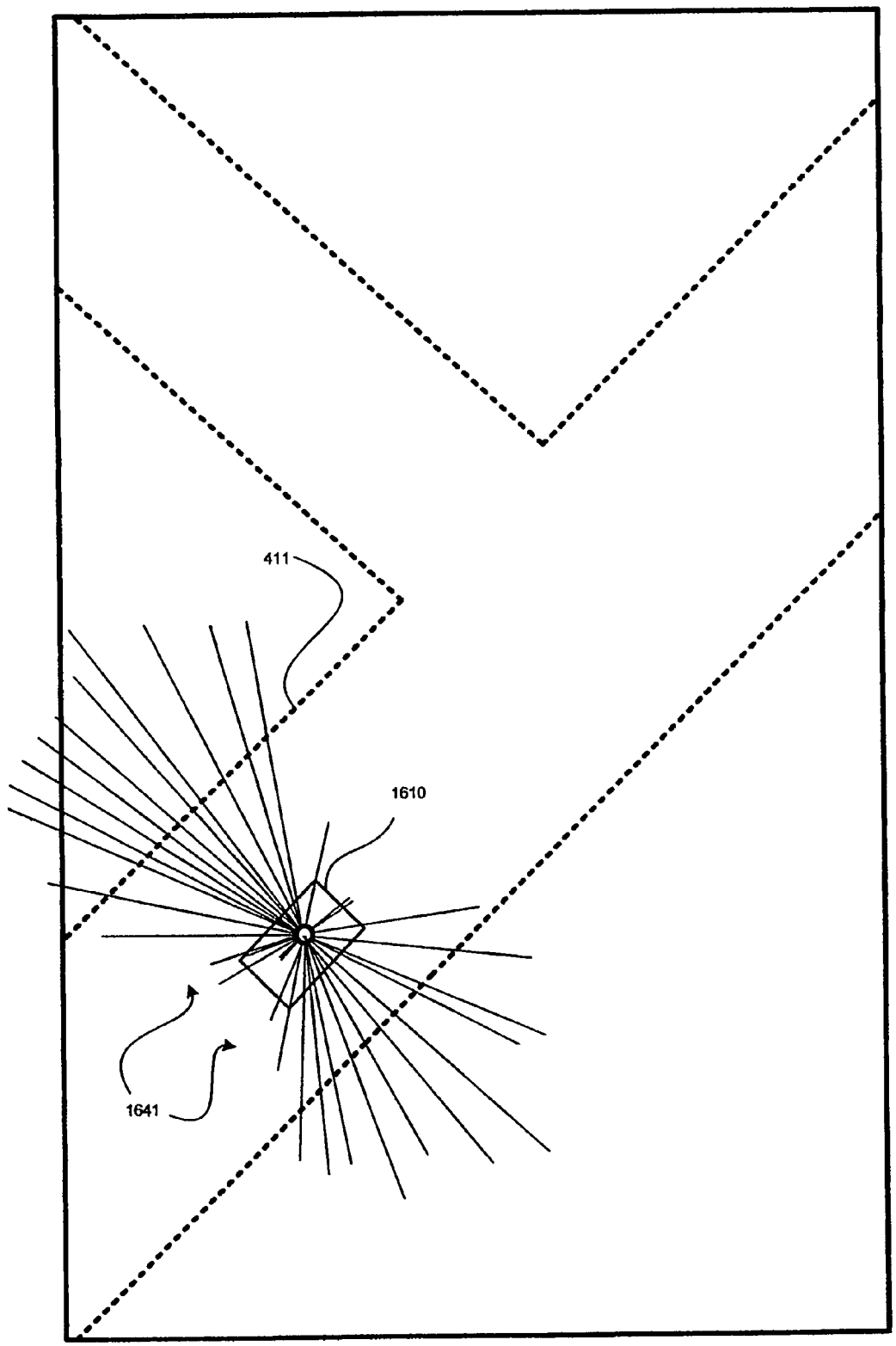

For example, FIGS. 38-40 show multiple Hough line candidates for the remote vehicle 10 when positioned in a hallway (in which the outline 1610 of the remote vehicle 10 is positioned between the line clusters).

Figure 3:
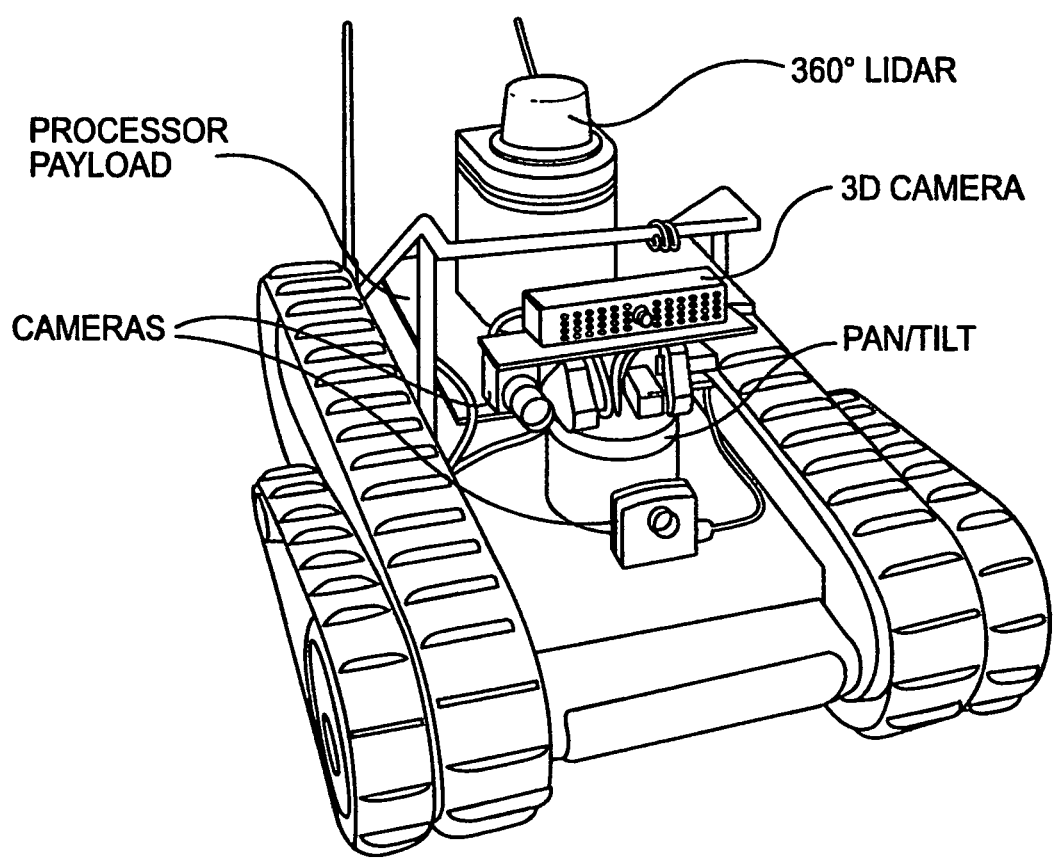
FIG. 3 illustrates a front perspective view of another embodiment of a remote vehicle in accordance with the present invention.

FIG. 3 illustrates an embodiment of a remote vehicle of the present invention including a range-finding system (e.g., LIDAR), a 3D camera, a pan/tilt unit, and cameras located on the chassis, along with a processor. A pan/tilt unit (e.g., TracLabs Biclops pan/tilt unit) allows the remote vehicle to pan a mounted sensor back and forth too increase its field of view. This information can be displayed to the operator and can additionally be used to remove a "false positive" (spurious) potential strongest lines identified by a Hough transform. Similarly, a camera could be used to remove such spurious lines. Points in 3D that are located below the remote vehicle (relative to the gravity vector) are removed from the laser scan before this scan is passed to the Hough transform.

A 3D camera (e.g., a SwissRanger) can be located on top of the pan/tilt to provide dense 3D range information. In this embodiment, the 3D camera can be a primary sensor for obstacle detection (in addition to an ultra wide band radar (UWB), when provided), mapping, and localization. 3D cameras such as the SwissRanger can provide 3D range information at a resolution of 124×160 pixels, covering a field of view of 45 degrees, a depth resolution of down to 5 mm, with a refresh rate of 30 Hz. The SwissRanger can be physically scanned back and forth. Mounting the 3D camera on the pan/tilt unit can address the small field of view of this sensor and give a better angle for error reduction. In an embodiment of the invention, the 3D camera can be used for all activities that require range data, except for mapping. 3D cameras measure distance using a phase offset in a periodic light signal.

Figure 4:
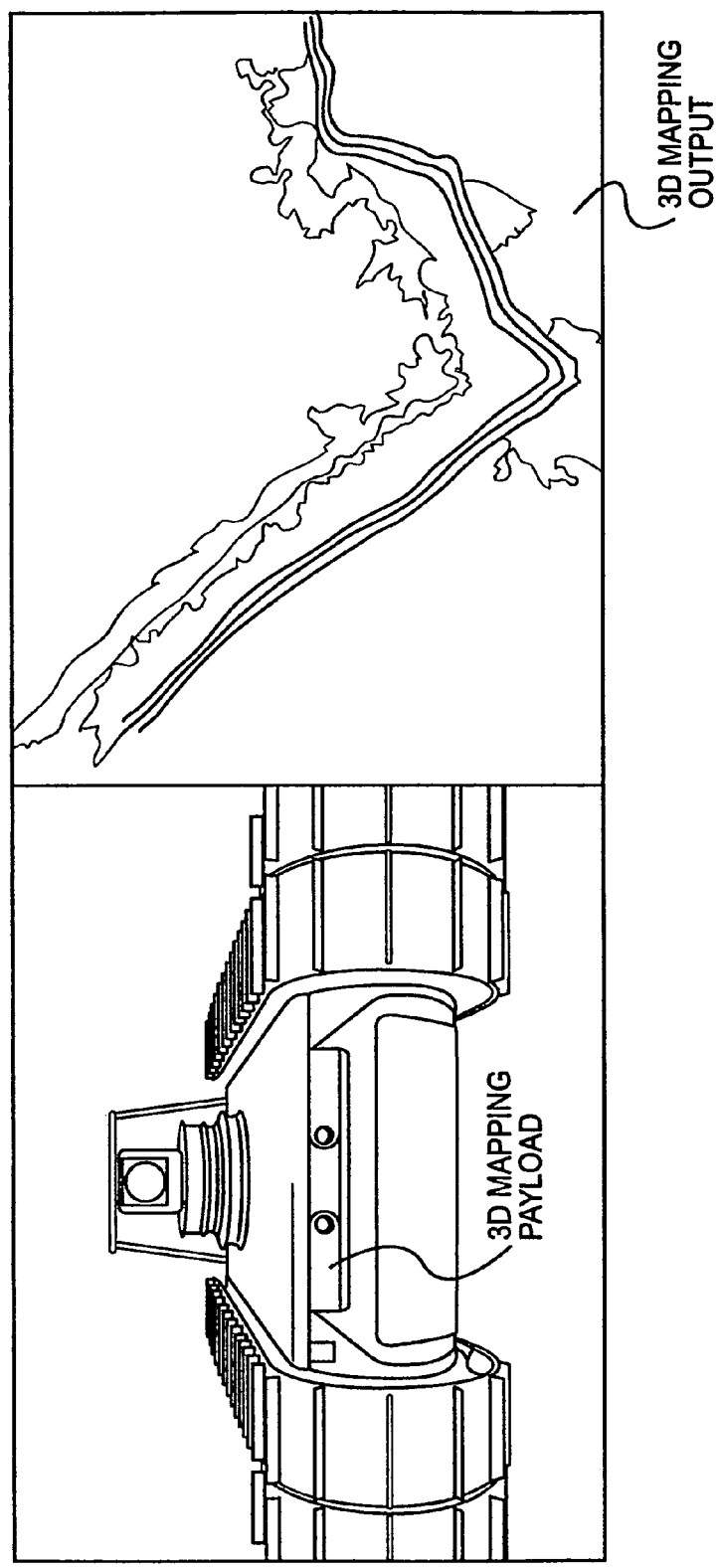
FIG. 4 illustrates a front perspective view of another embodiment of a remote vehicle in accordance with the present invention.

FIG. 4 illustrates an embodiment of the invention having a 3D mapping payload including, for example, an instant scene modeler (iSM) from MDA robotics to create a high-fidelity, photo-realistic, 3D map. Like human vision, iSM uses a pair of cameras to observe a scene. Because each camera looks at the scene from a slightly different angle, iSM can measure distances to hundreds of thousands of points in each scene. When the cameras move, new objects come into the field of view. iSM automatically matches new images, computes camera motion, and seamlessly merges 3D data into one virtual model. The model is calibrated, and provides measurements for immediate viewing or can be saved for future reference. When combined with the navigation-enabling sensors in FIGS. 1-3, the 3D mapping payload allows a remote vehicle to map its environment as it navigates.

Figure 5:
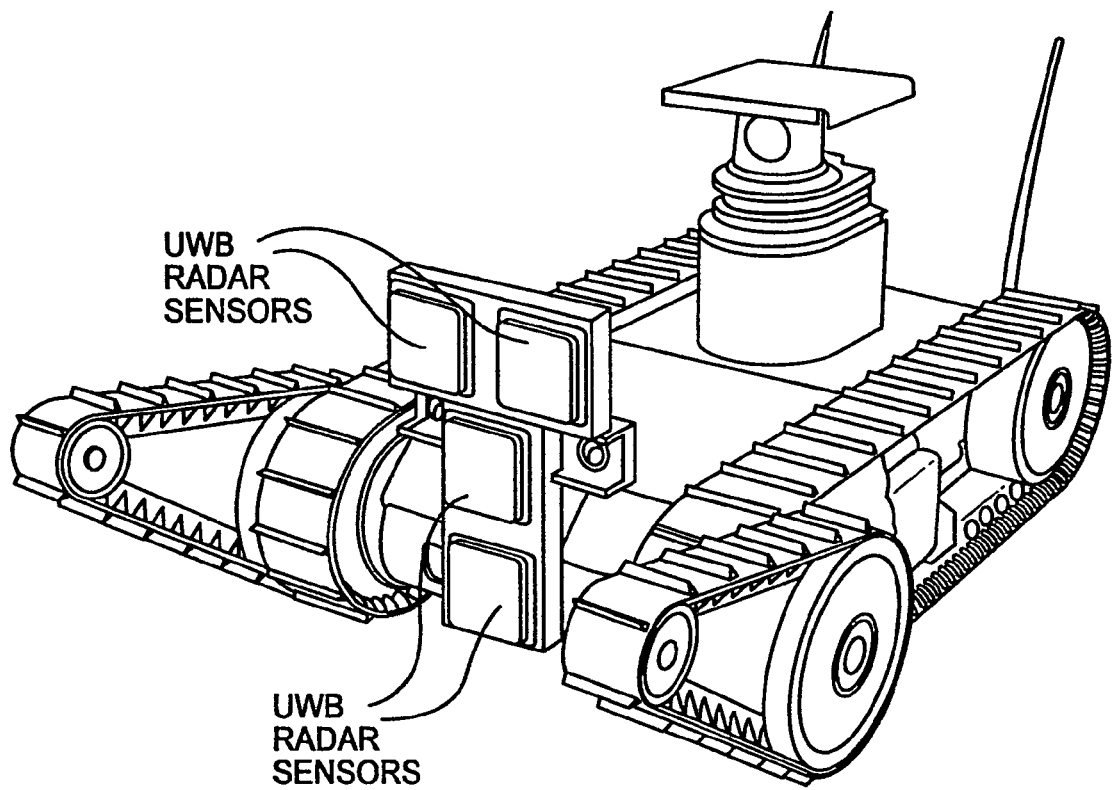
FIG. 5 illustrates a front perspective view of another embodiment of a remote vehicle in accordance with the present invention.
Figure 6:
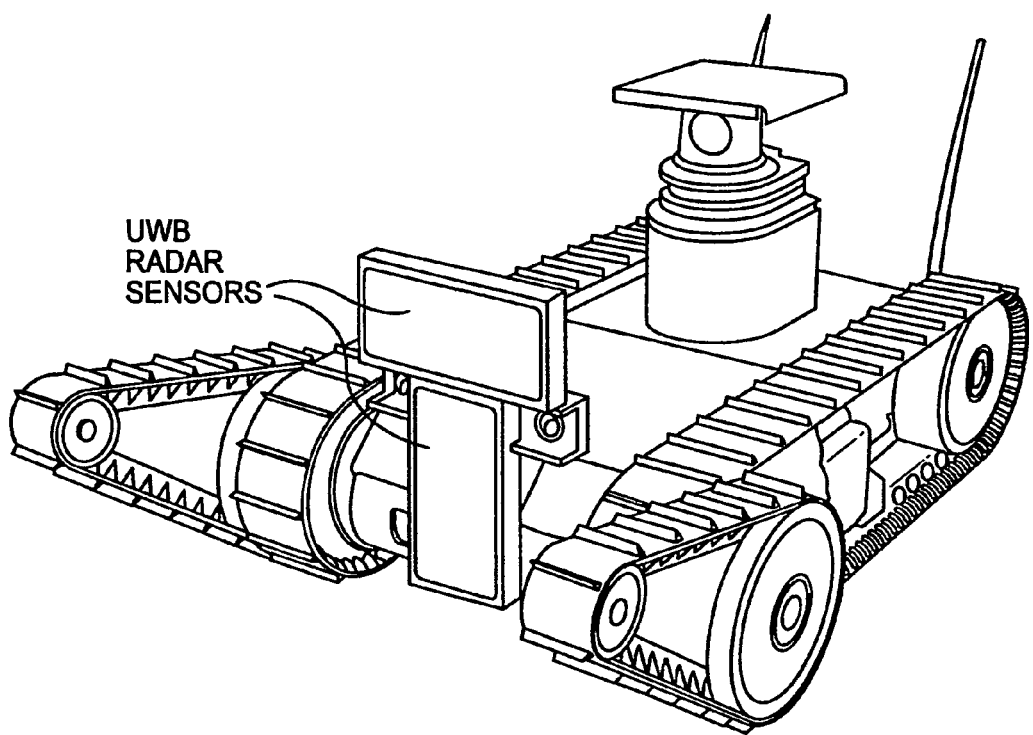
FIG. 6 illustrates a front perspective view of another embodiment of a remote vehicle in accordance with the present invention.

FIGS. 5 and 6 illustrate embodiments of the invention employing UWB radar sensors, for example the Developer's Kit Lite (RaDeKL) manufactured by Multispectral Solutions, Inc. As can be seen, the UWB sensors are arranged in a horizontal and vertical array. UWB sensors provide a remote vehicle with the capability to see through foliage and poor weather (e.g., rain and snow). This enhances the remote vehicles navigational capability, particularly for obstacle avoidance, where differentiation of passable foliage/weather and impassable solid objects can be critical. The frequency of operation of RaDeKL UWB sensors is 6.0-6.6 GHz, and the receiver dynamic range is 40 dB above noise floor. Range resolution is 30 cm. 256 range bins, and the range extent is selectable in 4-foot increments from 128-1,152 feet (39-351 meters). Frequency of update rate is a selectable single return by command or 20 Hz streaming. The RaDeKL is USB 2.0m compliant.

When tracking three satellites, it reports 2D positional data. When four satellites are in site, u-blox provides 3D data including altitude and velocity. The u-blox GPS receiver communicates using two protocols over serial: a proprietary UBX protocol and the NMEA protocol. U-blox provides windows software for logging data from GPS.

Figure 7:
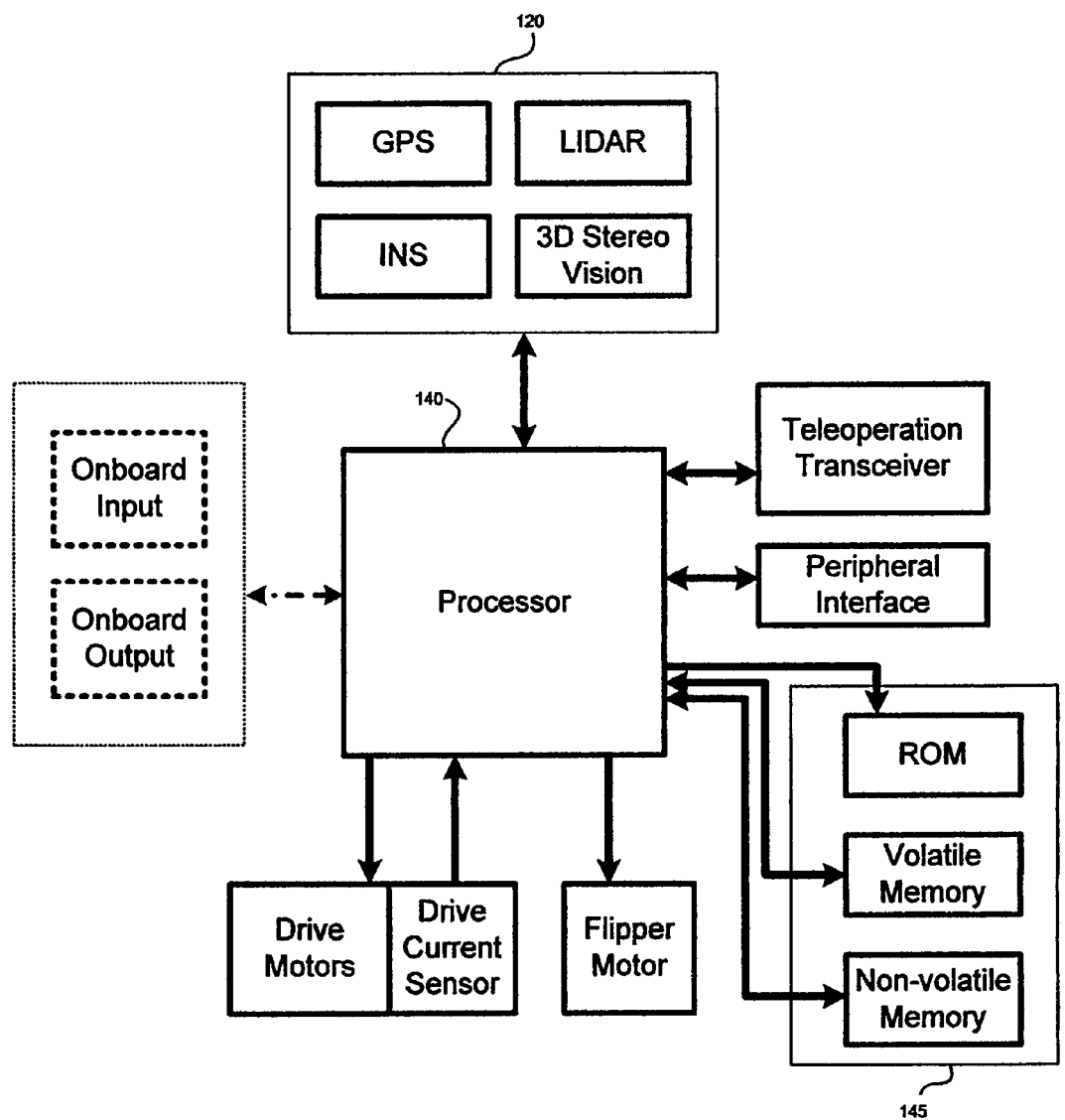
FIG. 7 illustrates an embodiment of a computer hardware organization for a remote vehicle in accordance with the present invention.

FIG. 7 illustrates an embodiment of a computer hardware organization for a remote vehicle 10, in which the processor 140 exchanges data with various peripheral devices via a peripheral interface and arbitrates communication among the peripheral devices. The processor may be, for example, an Intel® Pentium-III. The peripheral interface may be wireless or alternatively may include a USB port into which a USB memory stick may be placed, and onto which the remote vehicle 10 can record a data including, for example, a map for manual retrieval by the operator (see FIG. 3). In this example, an OCU transceiver permits the processor 140 to receive commands from an OCU (see embodiments of the in FIGS. 9-12) and transmit data, e.g., video streams and map data, to the OCU during a mission, such as a reconnaissance operation.

The processor 140 also interfaces with memory 145 including read-only memory (ROM), volatile memory, and non-volatile memory. A variety of sensors 120, as described above, provide input to the processor 140 to facilitate control of the remote vehicle and allow the remote vehicle to perform intended behaviors such as reconnaissance missions and mapping. In the embodiment of FIG. 7, four types of sensors are illustrated; however, as set forth above with respect to FIGS. 1-6, a variety of sensors may be utilized and provide input to the processor 140.

As further illustrated in FIG. 7, the processor may also exchange data with the remote vehicle's drive motor(s), a drive current sensor, and a flipper motor. This data exchange can facilitate an automatic flipper deployment behavior, as described below in detail. In addition, the processor may exchange data with onboard input and onboard output.

Figure 8:
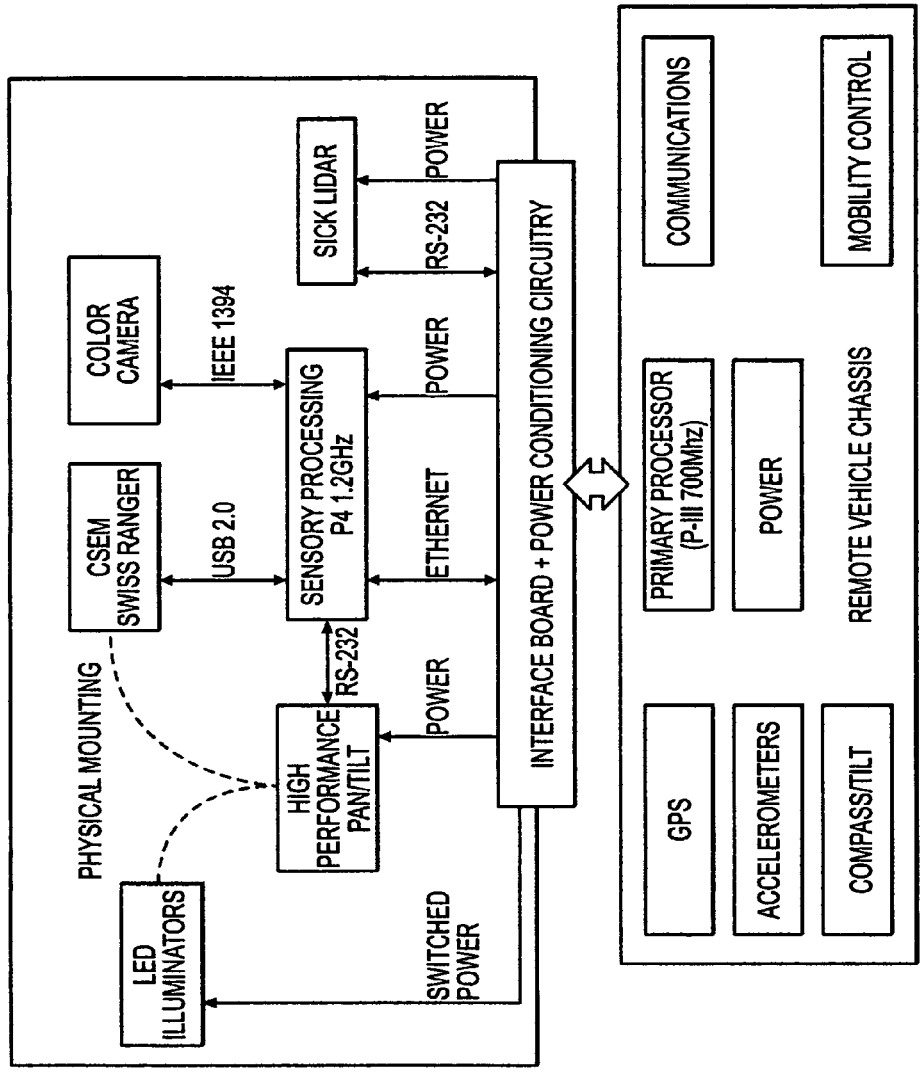
FIG. 8 illustrates another embodiment of a computer hardware organization for a remote vehicle in accordance with the present invention.

FIG. 8 illustrates another embodiment of a computer hardware organization for a remote vehicle 10 such as a PackBot having sensors including a SwissRanger 3D camera, a high performance pan/tilt, a color camera for stereo vision, and a SICK LIDAR range finding system. In the illustrated embodiment, the 3D camera, pan/tilt, and stereo vision are connected to a sensory processor, for example a STEALTH LPC-401PCI computer acting as a sensor processing computer and as an interface to the PackBot platform (i.e., its primary processor (140 in FIG. 8)). The sensory processor interfaces with the PackBot via an interface board, such as a PayBreak interface board providing power and an Ethernet connection to the OCU. Power conditioning circuitry can be employed to utilize the PackBot's batteries to power any payloads added to the PackBot to provide sensing and processing necessary to accomplished intended behaviors. This allows the PackBot to power itself with its additional payload and remain untethered.

One or more drivers running on the remote vehicle's primary processor 140 interface with drivers for each sensor provided on the remote vehicle to receive incoming sensor information and transmit action or configuration commands to the sensors. The driver(s) make a publish/subscribe interface to the sensors and actuators available to the behaviors running on the remote vehicle.

Figure 9:
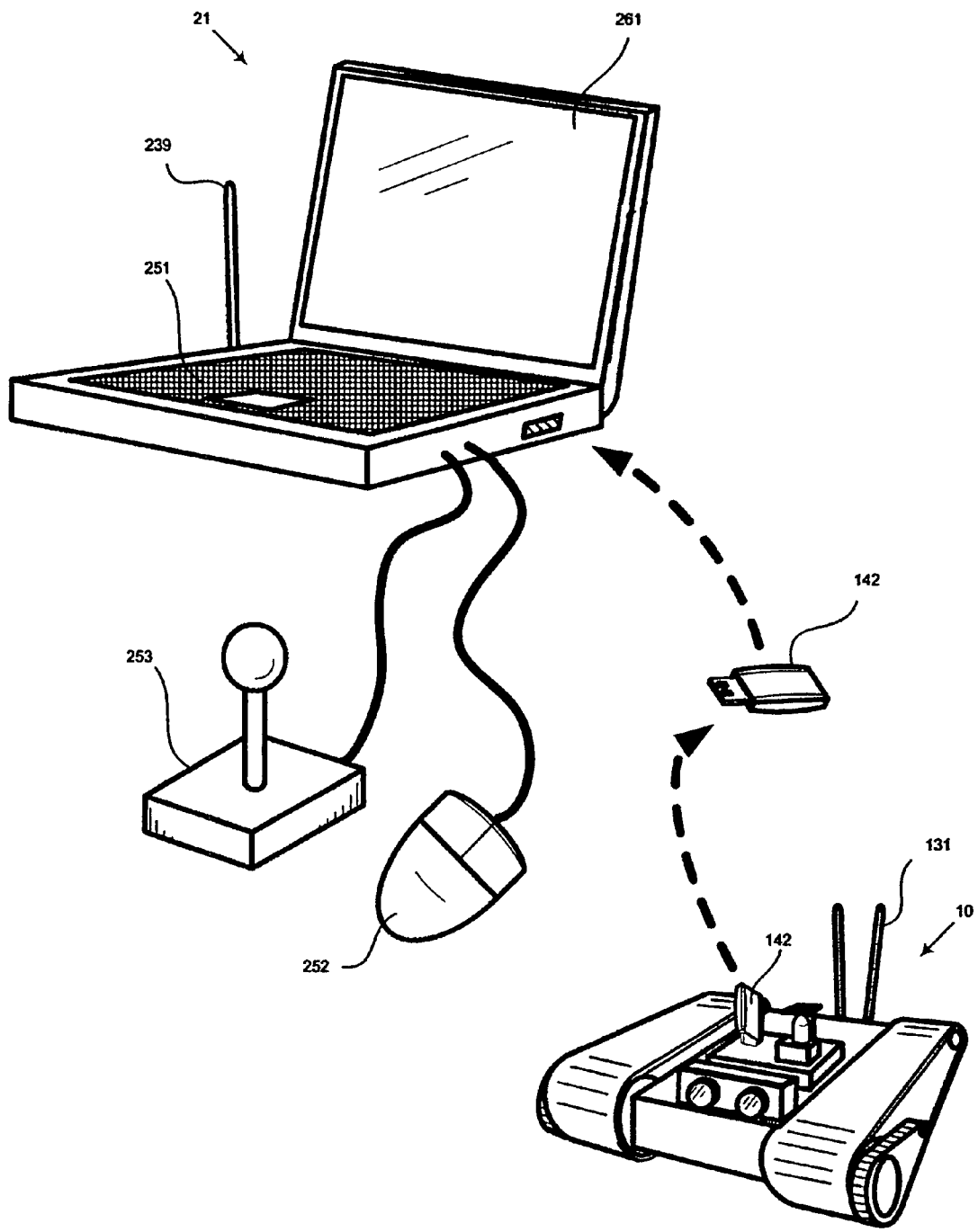
FIG. 9 illustrates an embodiment of an operator control unit (OCU) in accordance with the present invention.

FIG. 9 illustrates an operator control unit (OCU) 21 for controlling a remote vehicle in accordance with the present invention. The OCU platform used in the present invention preferably has standard interfaces for networking, display, wireless communication, etc. The OCU 21 includes a computer system having a display 261 for presenting relevant control information including an occupancy grid map to the operator, as well as input systems such as a keyboard 251, a mouse 252, and a joystick 253. The control information may be transmitted wirelessly from an antenna 131 of the remote vehicle 10 to an antenna 239 of the OCU 21. Alternatively, the remote vehicle 10 may store control information such as the occupancy grid map on a detachable memory storage device 142 (which may be a USB memory stick, a Flash RAM or SD/MMC memory chip, etc.) that the operator can retrieve when the remote vehicle completes an autonomous operation and access using the OCU 21 or other suitable device.

Figure 10:
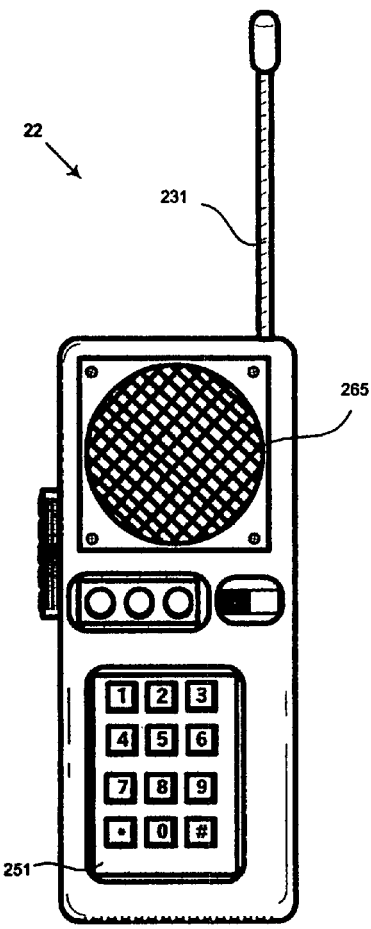
FIG. 10 illustrates another embodiment of an OCU in accordance with the present invention.
Figure 11:
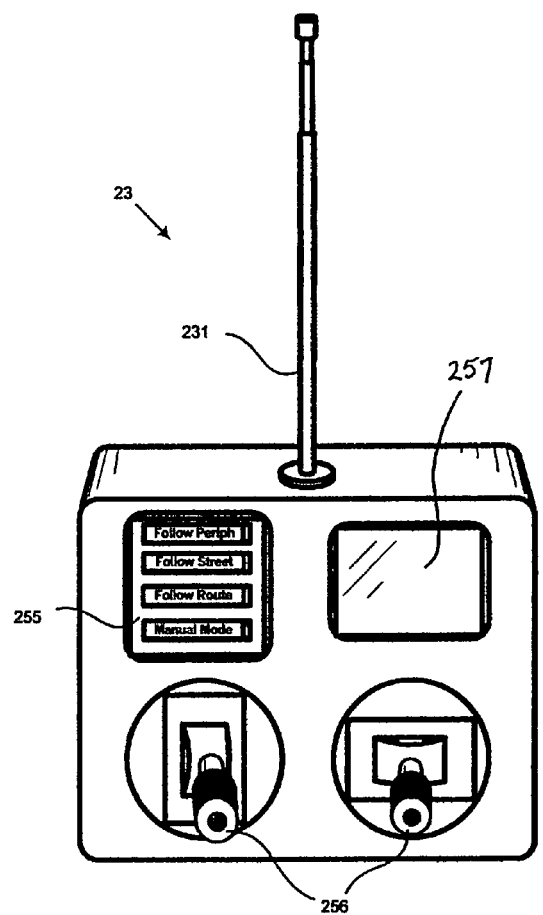
FIG. 11 illustrates another embodiment of an OCU in accordance with the present invention.

FIGS. 10 and 11 illustrate alternative OCU implementations. In FIG. 10, a walkie talkie-style OCU 22 includes a numeric keypad 251 for entering numeric codes corresponding to operation commands, an antenna 231, and a speaker 265 that can output audible tones or messages from the remote vehicle 10 (which may indicate operation status such as "operation complete" or "robot is stuck," inter alia, via distinctive tones or synthesized speech). The walkie talkie can be tuned to a radio frequency used to communicate with the remote vehicle, and the numeric codes entered by the operator onto the keypad 251 can be encoded as dual-tone multifrequency (DTMF) signals recognizable by the remote vehicle 10 and transmitted to the remote vehicle 10 over a radio channel. Exemplary numeric codes include a three-digit numeric sequence such as "111" or "456" to command the remote vehicle 10 to perform an operation such as a follow-perimeter or a follow-street operation that is assigned to the entered sequence.

FIG. 11 illustrates a remote control-type OCU 23, which includes X-axis and Y-axis joysticks 256 for directly steering the remote vehicle 10, as well as an antenna and mission-selection buttons 255 for choosing an autonomous operation to be performed by the remote vehicle 10. A display 257 may provide information to the operator, such as remote vehicle status information or a video feed from the remote vehicle camera(s).

Figure 12:
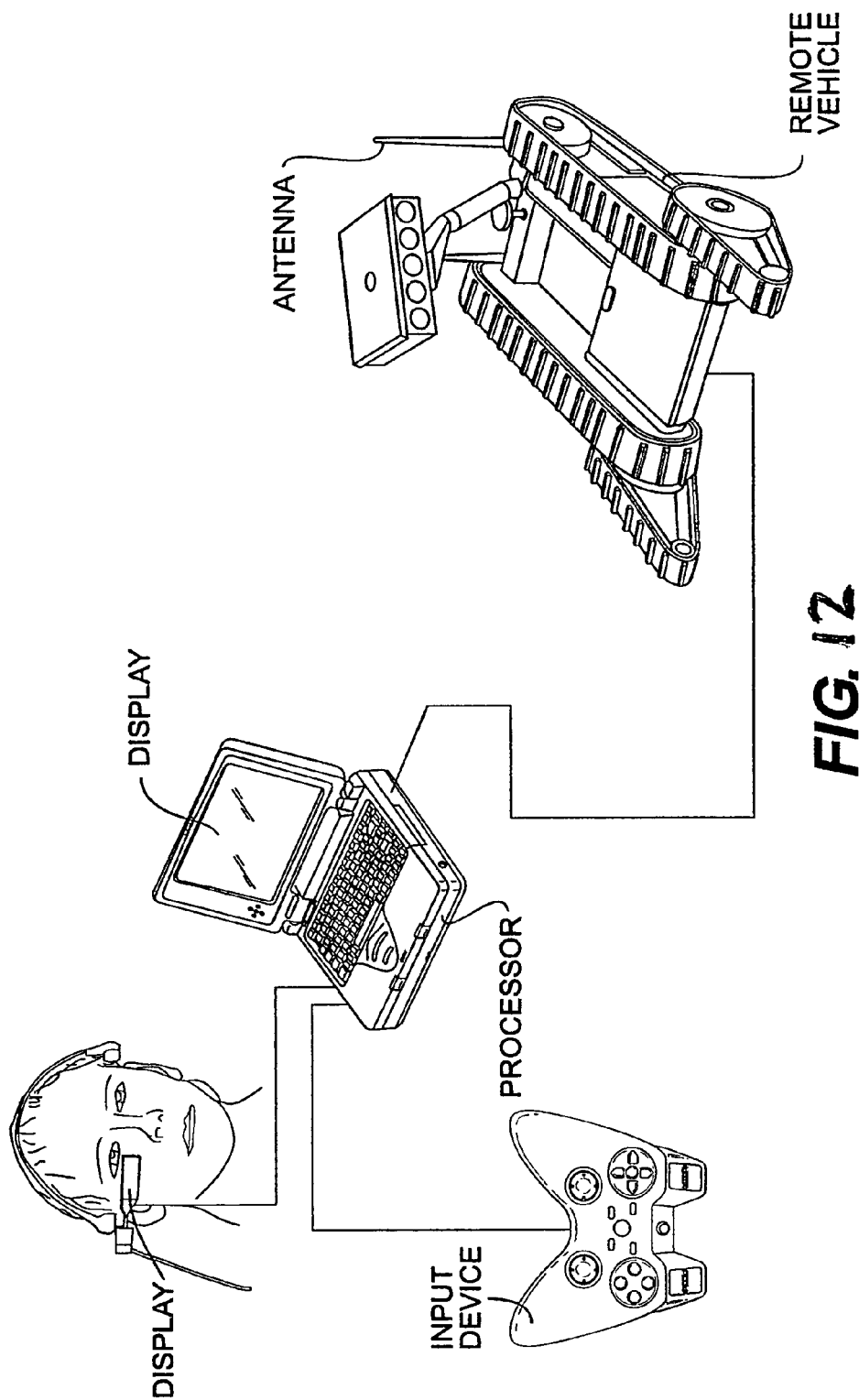
FIG. 12 illustrates yet another embodiment of an OCU in accordance with the present invention.

FIG. 12 illustrates yet another embodiment of an OCU for use with the present invention. Basic components include a display, a keyboard, an input device (other than the keyboard) such as a hand-held controller, a processor, and an antenna/radio (for wireless communication). In an embodiment of the invention, a head-mounted display provides additional and/or alternative data to the operator, such as video display from one or more remote vehicle cameras. The hand-held controller, preferably having a twin-grip design, includes controls to drive and manipulate the remote vehicle and its payloads. Audio may additionally be provided via the hand-held controller, the display, or dedicated listening devices such as, for example, Bluetooth headsets commonly used with mobile phones. In an embodiment of the invention, a microphone is provided on the hand-held controller, the processor, the display, or separately from these components, and can be used with a speaker on the remote vehicle to broadcast messages. A button on the hand-held controller or a soft button within the GUI can be used to activate the speaker and microphone for broadcasting a message.

The OCU of FIG. 12 is preferably compatible with MOLLE packs, ALICE packs, ILBEs, or OTVs commonly worn by military personnel. The system preferably has the following additional characteristics: lightweight (e.g., no more than 7 pounds total, and no more than 2 pounds for the hand-held controller); mobile; small form factor (e.g., able to integrate with existing user gear); wearable or capable of being carried in a backpack; easy to put on/take off; adequate computer processing power; minimal or no external cables; meets mission time thresholds (e.g., 5 hours); rugged to intended environment (e.g., temperature, shock, vibration, water, etc.); able to withstand being dropped (e.g., 3 feet).

The OCU embodiment illustrated in FIG. 12 includes a processor such as a rugged laptop computer. The processor could alternatively be any suitably powerful processor including, for example, a tablet PC such as an HP TC1100 running a SuSe 9.2 Linux operating system and 802.11 wireless capability and graphics with direct rendering and a touch-screen interface such as a stylus interface. In an embodiment of the invention, the processor can be mounted to the forearm of a user, freeing up both of the user's hands to perform teleoperation or other tasks. A tablet PC embodiment provides an effective hardware platform due to its small form factor, light weight, and ease of use due to a touch-screen interface. It allows the operator to remain mobile and maintain a degree of situational awareness due to the simple and intuitive interface. To maximize the utility of a touch screen-based platform, use can be made of layered windows to provide a desired level of information display for the operator's current situation, as well as clickable toolbars designating the current mode of interaction for the stylus or other touch screen indicator (e.g., the operator's fingers).

The processor communicates with the remote vehicle wirelessly or via a tether (e.g., a fiber optic cable). Although wireless communication may be preferable in some situations of remote vehicle use, potential for jamming and blocking wireless communications makes it preferable that the control system be adaptable to different communications solutions, in some cases determined by the end user at the time of use. A variety of radio frequencies (e.g., 802.11), optical fiber, and other types of tether may be used to provide communication between the processor and the remote vehicle.

The processor must additionally communicate with the hand-held controller and the display. In a preferred embodiment of the invention, the processor is capable of communicating with the hand-held controller and the display, illustrated in the present embodiment to be a head-mounted display, either wirelessly or using a tether. To facilitate wireless communication among the various elements of the system, the OCU includes a radio and an antenna.

The processor includes software capable of facilitating communication among the system elements, and controlling the remote vehicle. In an embodiment of the invention, the software is a proprietary software and architecture, including a behavioral system and common OCU software, which provide a collection of software frameworks that are integrated to form a basis for robotics development.

According to an embodiment of the invention, this software is built on a collection of base tools and the component framework, which provide a common foundation of domain-independent APIs and methods for creating interfaces, building encapsulated, reusable software components, process/module communications, execution monitoring, debugging, dynamic configuration and reconfiguration as well as operating system insulation and other low-level software foundations like instrument models, widget libraries, and networking code.

Figure 13:
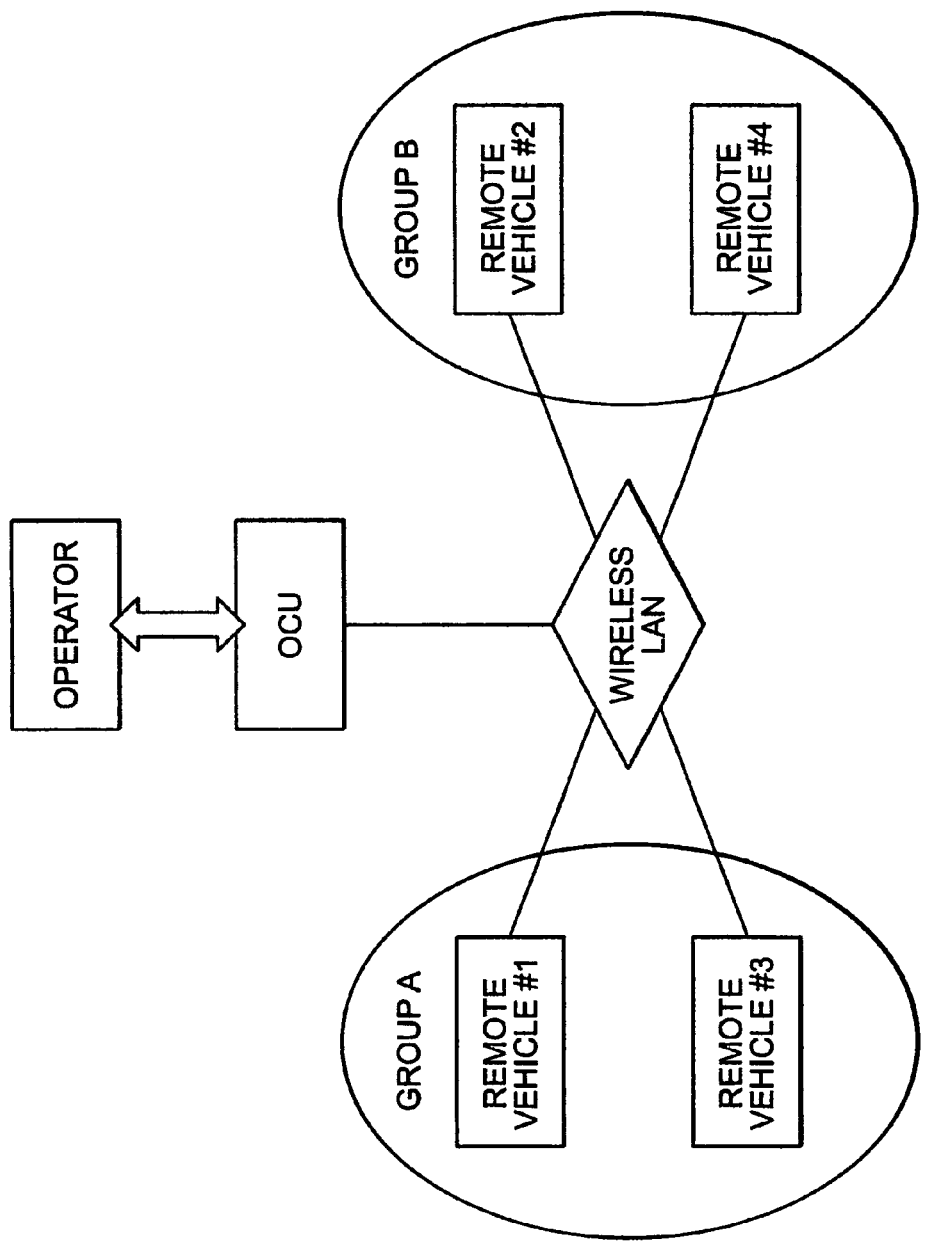
FIG. 13 illustrates an exemplary interaction among an operator, the OCU, and one or more remote vehicles in accordance with the present invention.

Interaction among an operator, the OCU, and one or more remote vehicles is illustrated in FIG. 13. The illustrated embodiment is for a wireless system wherein the operator issues commands for the remote vehicle(s) via an OCU that sends out data wirelessly to a processor on each of the remote vehicle(s). The processor of each remote vehicle uses data from the OCU to control one or more behaviors of that remote vehicle. The commands from the operator include three levels of control: (1) low-level teleoperation commands where the remote vehicle need not perform any autonomous behaviors; (2) intermediate level commands including a directed command in the remote vehicle's local area along with an autonomous behavior such as obstacle avoidance; and (3) high-level tasking requiring the remote vehicle to perform a complimentary autonomous behavior such as path planning. The present invention contemplates allowing the operator to control heterogeneous remote vehicles having different sensors, different capabilities, and different behavior programming.

In an embodiment of the invention, the software components are divided among the processors. The OCU has a processor and displays information and sends commands to the remote vehicle, performing no significant computation or decision making, except during map generation. In an embodiment of the invention, the remote vehicle includes 2 processors—the sensory processor and the primary processor—and computation is divided among these two processors with data (e.g., computation results, etc.) being passed back and forth as appropriate.

In an embodiment of the invention, the primary software components include a sensor processing server, a localization server, a video compression server, an obstacle avoidance server, a local perceptual space server, a low-level motor control server, a path planning server, and other behavior-specific servers as appropriate. The present invention contemplates the software components or servers having individual functionality as set forth in the above list, or combined functionality. The sensor processing server handles communication with each sensor and converts data output from each sensor, as needed. For example, for a 3D camera, the processing server converts output data to traversability range scans. In an embodiment of the invention, this server runs on the sensory processor.

In an embodiment of the invention, the localization server uses, for example, range data derived from the 3D camera, map data from a file, and odometry data to estimate the remote vehicle's position. The localization process is described in detail below. Odometry broadly refers to position estimation during vehicle navigation. The term also refers to the distance traveled by a wheeled vehicle. Odometry can be used by remote vehicles to estimate their position relative to a starting location, and includes the use of data from the rotation of wheels or tracks to estimate change in position over time. In an embodiment of the invention, this server also runs on the sensory processor, along with a video compression server that receives input from the video camera. In accordance with an embodiment of the invention, video compression and encoding is achieved via an open-source ffmpeg video compression library and the data is transmitted via User Datagram Protocol (UDP), an internet protocol.

In an embodiment of the invention, the behavior-specific and low-level motor control server run on the remote vehicle's primary processor. Additional software components may include an OCU graphical user interface, used for interaction between the operator and the remote vehicle, and a mapping component that generates maps from sensor data. In an embodiment of the invention, these additional software components run on the OCU processor.

In an embodiment of the invention where the OCU comprises a tablet PC with touch screen input, the system functionality is accessed using a stylus or other indicator on the tablet PC. This allows a user to control one or more remote vehicles via a single hand interacting with (touching) the OCU. The system functionality can alternatively or additionally be controlled using other input devices as would be understood by one skilled in the art upon reviewing the various embodiments of the OCU discussed above. Further, a tablet PC embodiment can additionally or alternatively use a mouse to control functionality. Touch screen activation or mouse clicking are referred to herein generally as "clicks."

Figure 14A:
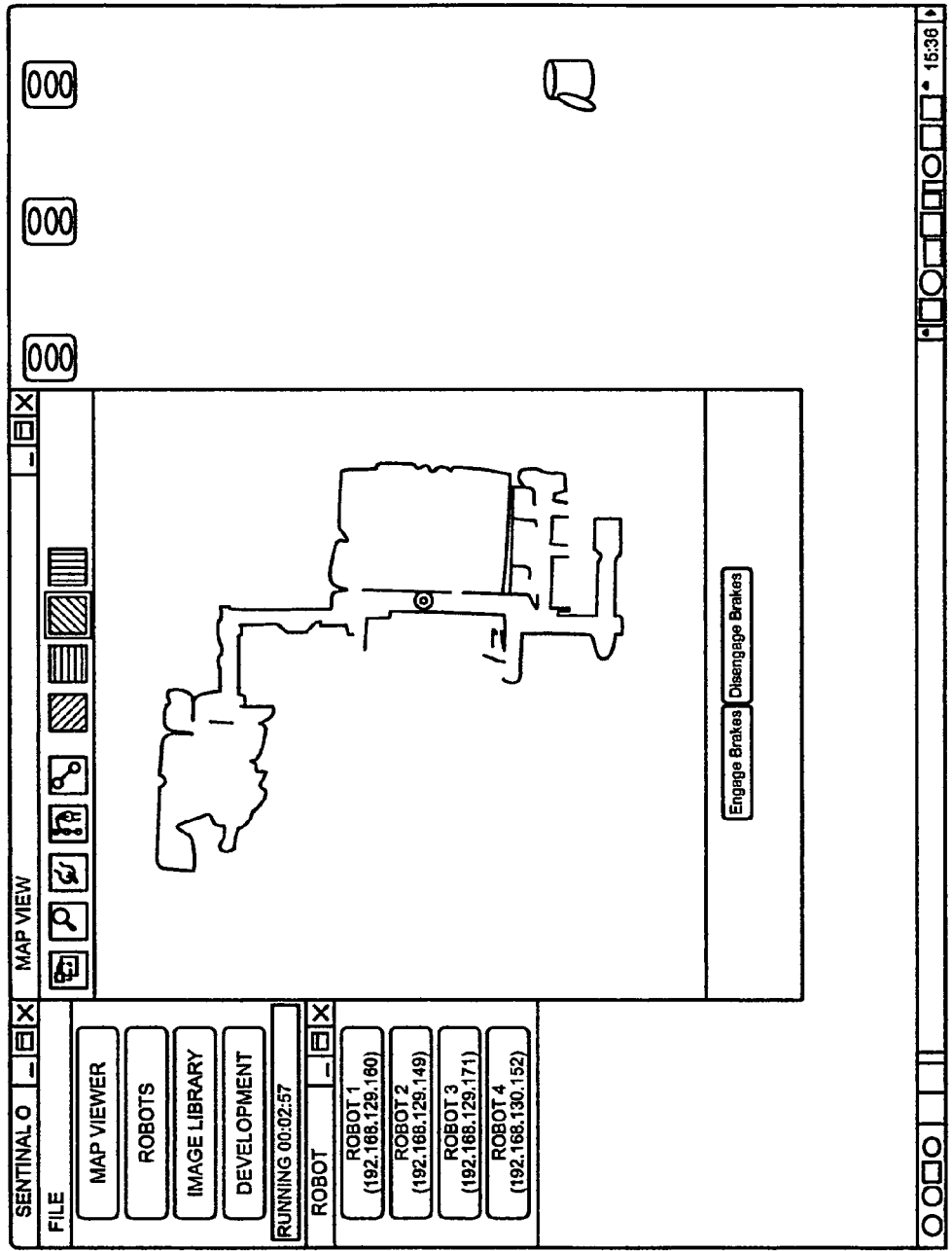
FIG. 14A illustrates an exemplary embodiment of an initial screen displayed by an OCU in accordance with the present invention.

In an embodiment of the invention, the OCU includes a button or icon that launches a control application having an initial screen. An exemplary initial screen, for example in an OCU utilizing a tablet PC, is illustrated in FIG. 14A. The initial screen, in the upper left, is labeled with name of the OCU, such as "Sentinel OCU" in this embodiment. In an embodiment of the invention, closing this window shuts down the OCU application. In the embodiment of FIG. 14A, a "map view" window is displayed in addition to/as part of the initial screen and can be used by an operator to issue high-level commands to multiple remote vehicles and monitor their progress. The map view window shows a map of the remote vehicles' environment. Issuance of high level commands can be made by touching the map. In this embodiment, there are two additional windows that can be displayed within the initial screen. Soft buttons presented in the initial screen can be used to bring up or navigate to another window, allowing an operator to effectively monitor and control one or more remote vehicles. In this illustrated exemplary embodiment, a window labeled "Robots" lists available remote vehicles as separate buttons. Available remote vehicles can be determined by detecting which remote vehicles are within range of, and controllable by, the OCU, and/or may be programmed into the application.

The illustrated window labeled "Robots" can list the IP addresses and a color code for each remote vehicle controllable by the OCU. The color code of the remote vehicle matches with the color of the vehicle on the map of the remote vehicles' environment. In an embodiment of the invention, when a remote vehicle controllable by the OCU is detected, for example via an intended communication link, its button may be distinguished from undetected remote vehicles by, for example, the button appearing to be raised and/or having a different color text. If the operator presses a button to select a detected remote vehicle, a detailed window is displayed (see FIG. 16, described in more detail below) that includes information, such as status information, regarding the remote vehicle, and may additionally allow the operator to perform low-level control (teleoperation) and/or view telemetry and video data from the selected remote vehicle. Pressing the button again can hide the detail. Detail can also be hidden by closing the window.

Figure 14B:
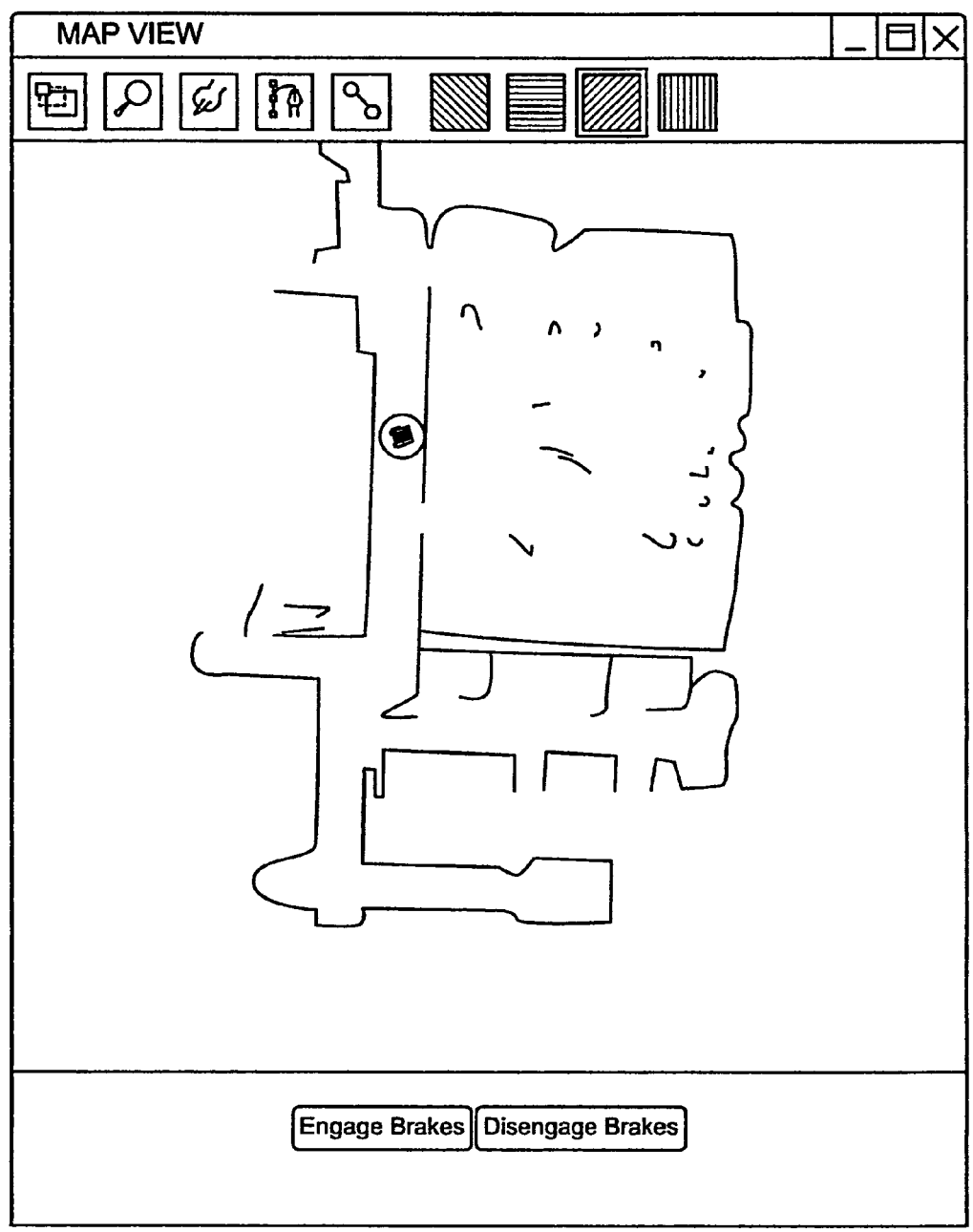
FIG. 14B illustrates an embodiment of an OCU display screen including map of the remote vehicles' environment.

FIG. 14B illustrates a close up of an embodiment of the map view window, which illustrates a map of the remote vehicles' environment. The button bar at the top of the window can be divided into two parts. The first part can be used by the operator to select a tool that controls how clicks (as explained above, via a touch screen indicator such as a stylus or a user's finger) are interpreted. The second part can be used by the operator to select a remote vehicle to control (here, by color). The selected tool and remote vehicle are indicated, for example, by the button appearing depressed or highlighted. Selecting another tool or remote vehicle can de-select any previously-selected choices, respectively. The present invention also contemplates selecting multiple remote vehicles at once, which would allow the operator to view their status or control certain aspects of their behavior simultaneously.

The tool selection part of the button bar at the top of the window embodiment of FIG. 14B includes, from left to right, view control, follow robot, set position, edit path, and link. Follow robot allows the operator to instruct one remote vehicle to follow another. Set position sets the remote vehicle's estimate of its position and lets the remote vehicle decide what orientation is correct. Edit path allows the operator to change a selected remote vehicle's path or add a segment to the selected remote vehicle's path. The link tool can be used to create a follow-the-leader arrangement where selected robot(s) will attempt to always be near the indicated leader robot.

The center of the display in FIG. 14B shows a map (the map can be preloaded on the OCU, the position of any detected remote vehicles (as reported by the remote vehicles after localization) on the map via color-coded icons, the path that each detected remote vehicle has been instructed to follow, and a status halo around the icon for each detected remote vehicle. In FIG. 14B, the a remote vehicle is detected and its position is shown along with a status halo. There is no path indicated. In an embodiment of the invention, when the remote vehicle's brake is on, the status halo can be red. When the remote vehicle's brake is off but it's not moving, the status halo can be yellow. When the remote vehicle's brake is off and the remote vehicle is moving, the status halo can be green. In an embodiment of the invention, buttons—for example located underneath the map—allow the user to engage or disengage the brakes for a selected remote vehicle. The remote vehicle can be selected/deselected via the color-coded button on the second (right) part of the button bar above the map.

Figure 15:
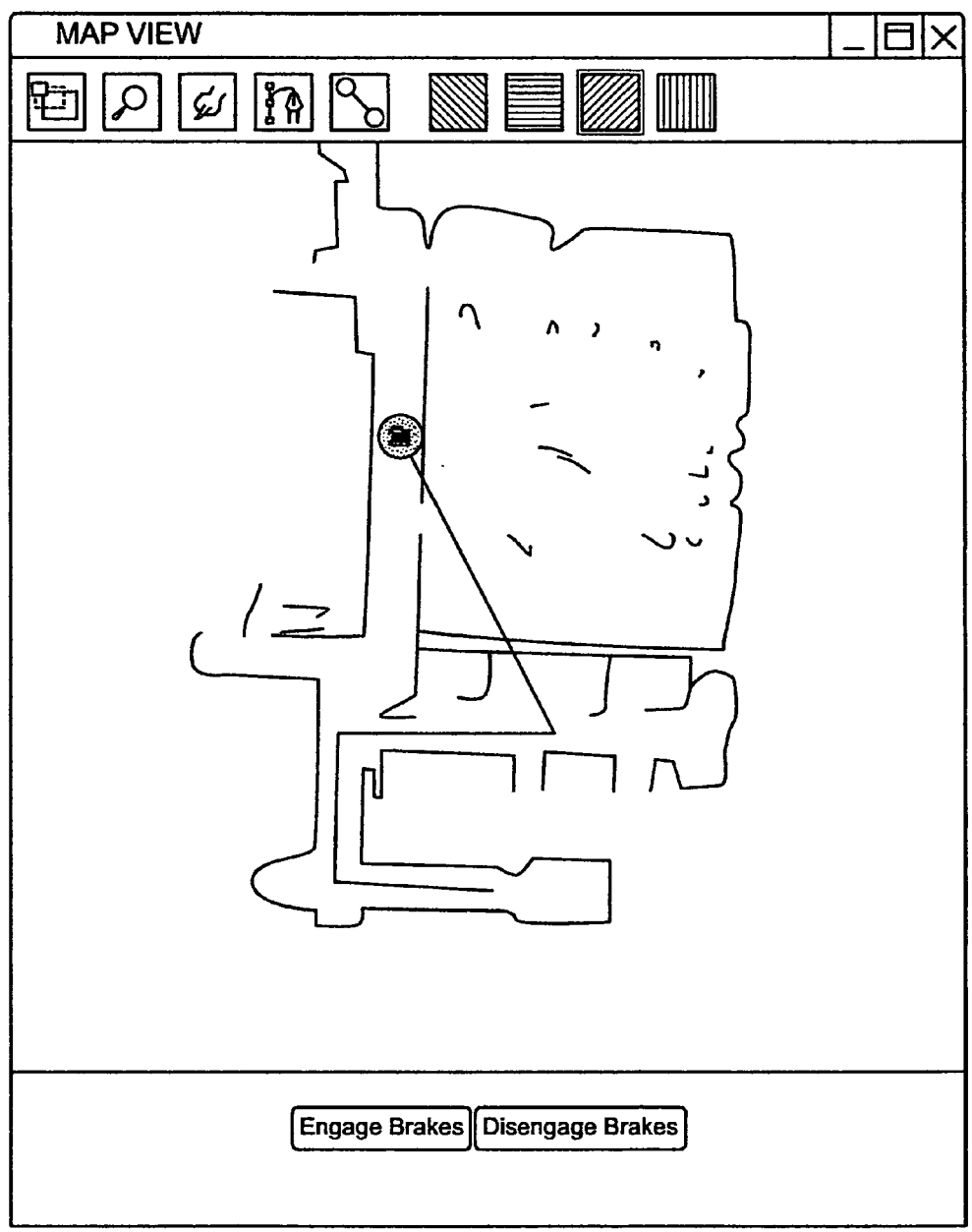
FIG. 15 illustrates an embodiment of the map of FIG. 14B, wherein a detected remote vehicle has been given a path to follow.

FIG. 15 illustrates an embodiment of the map of FIGS. 14A and 14B, wherein a detected remote vehicle has been given a path to follow. The path shown consists of a number a waypoints shown as dots. In an embodiment of the invention, the remote vehicle includes a path planning and obstacle detection/avoidance behavior allowing it to automatically plan a path to each waypoint that avoids detected obstacles and obstacles contained in the map. In an embodiment of the invention, a waypoint is considered reached once the remote vehicle arrives within a certain distance of that waypoint. If the path has a loop, the remote vehicle's path planning behavior may add waypoints from the loop to the end of the path as it reaches each waypoint, causing the remote vehicle to follow the loop until otherwise instructed.

Figure 16:
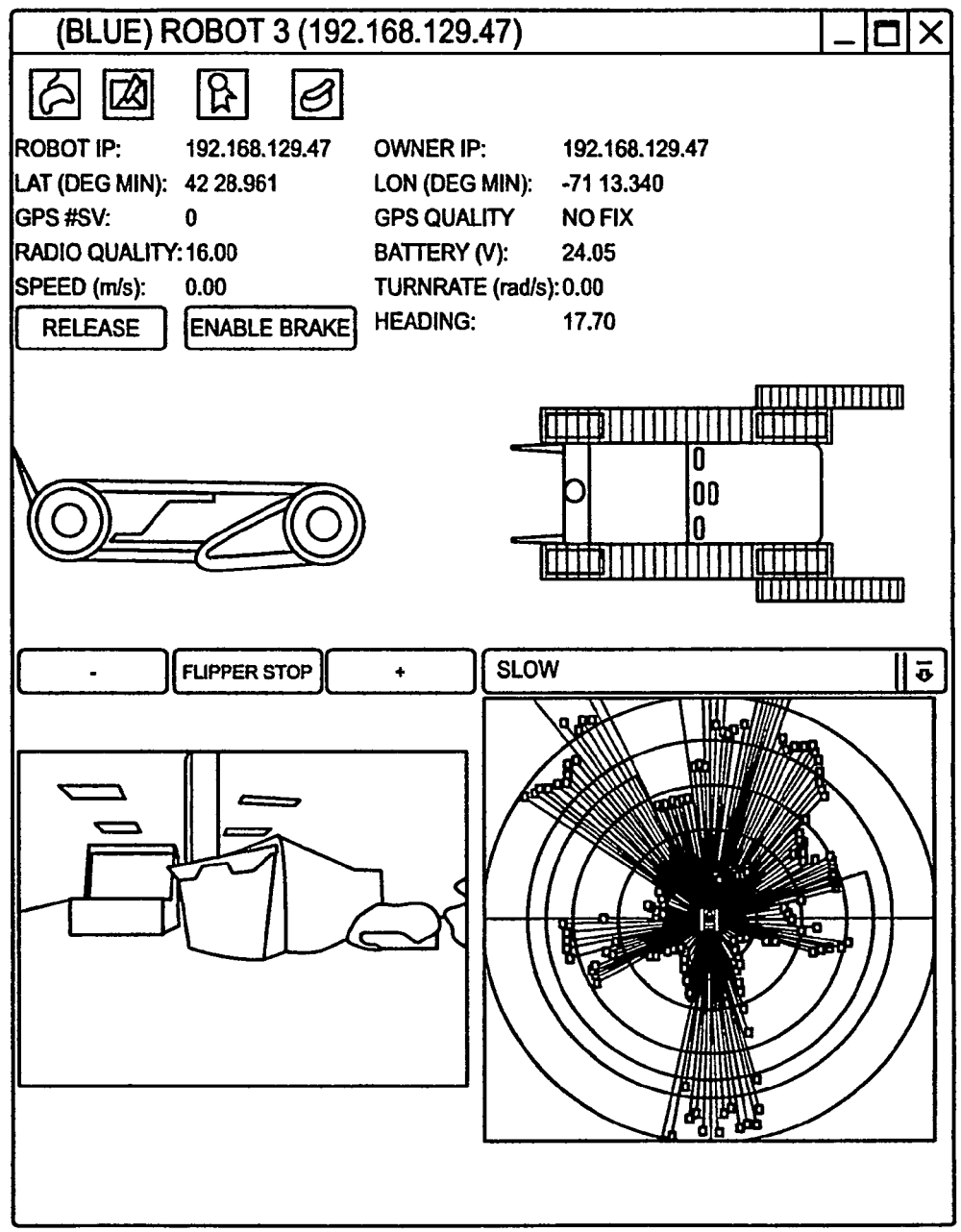
FIG. 16 illustrates an embodiment of a status window for a detected remote vehicle.

FIG. 16 illustrates an embodiment of a status window for a detected remote vehicle. In this embodiment, the top bar has four buttons. The left-most button shows a hand-held controller and allows the operator to perform low-level control of the remote vehicle, for example with a hand-held controller as illustrated in the OCU of FIG. 12. The right-most button turns a video camera display in the status window on and off. The tool in the top bar that is second from the left allows the operator to select waypoints for the selected remote vehicle's path. The tool in the top bar that is second from the right allows the operator to select a remote vehicle's position.

A text area below the top bar shows certain information regarding the remote vehicle. For example, the remote vehicle's IP address and the controlling OCU's IP address ("Owner IP"), the remote vehicle's latitude and longitude, GPS information, radio quality, battery information, speed, turn rate, and heading. Below the text area in this embodiment are two buttons. The first button is labeled "Release" and can be used to relinquish control of the selected remote vehicle so that another OCU can take control. According to an embodiment of the invention, OCUs automatically attempt to take control of all robots that they have detected, and each remote vehicle can only be controlled by one OCU at a time. The second button can be pressed to enable a brake on the remote vehicle, and can act as a toggle, enabling and disabling the brake. The remote vehicle will not move, or will have a predetermined limited motion, while its brake is on. If the brake button is a toggle, the color of the button can be used to display a current state of the brake, green indicating that the brake is off (ready to be activated), and red indicating that the brake is on. In addition, text on the button can be used to indicate what the result of pressing the button will be. In FIG. 16, as can be seen, the brake is off (ready to go) and therefore the button is green and labeled "Enable Brake."

Beneath the brake and release buttons are two views of the selected remote vehicle. The left view is a side view and can be used to indicate the current tilt of the remote vehicle and/or the orientation of its flippers. The right view is a bottom view highlighting the battery that is currently being used in green. As can be seen, the battery charge level is listed in the information above.

In an embodiment of the invention, below the remote vehicle side view are buttons for manual control of the selected remote vehicle's flippers. In this embodiment, the + and − buttons rotate the flippers and the central "Flipper Stop" button stops the flippers in their current orientation.

The bottom left corner of the status window embodiment includes a video display from the remote vehicle. The video display may be turned off to save bandwidth by pressing the camera button at the top right of the window. The bottom right corner includes the remote vehicle's view of its surrounding area as determined, for example, by a range finder (e.g., a SwissRanger) and 3D camera, with the remote vehicle being drawn to scale in the center of the display. The remote vehicle's orientation in the display remains upward and the world rotates around the remote vehicle as necessary to maintain consistency. The concentric circles surrounding the remote vehicle icon are spaced, for example, at one-meter intervals to give the operator a suitable a sense of scale. The lines and dots give a view of information received from a range finder and 3D camera, the lines representing an area that the sensor(s) believes to be clear. This display provides the operator with a quick way to see what is visibly clear. The dots show the position of detected obstacles. The green background behind the obstacles represents directions in which the remote vehicle believes it can. The farther the green extends from the remote vehicle, the faster the remote vehicle may determine it is safe to travel in that direction.

In an embodiment of the invention, the bottom right display can be manipulated by the operator to control the remote vehicle using a touch-screen interaction. If the left-most tool in the top bar is chosen, the operator can perform low-level control of the remote vehicle by touching buttons and other areas on the displayed screen. The y-axis on the screen can be manipulated by the operator to control the speed of the robot. The x-axis of the screen can be manipulated by the user to control the amount of turning compared to translation. According to an exemplary control scenario, a maximum forward speed is achieved in the top middle and a maximum reverse speed in the bottom middle. Maximum clockwise rotation is achieved in either the top right or bottom left corners and maximum counterclockwise rotation is achieved in the top left and bottom right corners. In an embodiment of the invention, the obstacle avoidance behavior is suspended while the operator has low-level control of the remote vehicle. A selection box above the display can be used to select a maximum translation speed of the remote vehicle while the operator has low-level control of the remote vehicle. The speed can be set in miles per hour or using designators such as "slow," "fast," etc.

If the tool in the top bar that is second from the left is chosen, the operator can select waypoints, commanding the remote vehicle to travel to that position relative to its current position while avoiding obstacles. If a path has been set for the remote vehicle when a waypoint is chosen, the new waypoint acts as a temporary override of an existing path. In an embodiment of this control scenario, an area such as the center of the display can be clicked to stop and clear an existing path for the selected remote vehicle.

To control one or more remote vehicles having autonomous behavior capability, the operator performs the following steps using an OCU, for example as described in the above embodiments: (1) start the OCU; (2) turn on the remote vehicle(s) to be controlled, and wait for boot process to complete; (3) use a "position set" tool to tell each remote vehicle where it is on the map; and (4) control the remote vehicles, for example using a path setting or path editing tool on the OCU, an example of which is described above.

The remote vehicle software can be started/stopped either via the OCU or directly on the remote vehicle. In an embodiment of the invention, the buttons or icons for turning on the remote vehicle software via the OCU can have background colors that match the remote vehicle they control. In addition, the software start/stop can be color coded (green for start and red for stop) and can utilize a toggle switch.

In an embodiment of the invention where the remote vehicle is capable of performing a mapping behavior, mapping can be done in a separate off-line phase from the normal vehicle control. To create a map, a row of icons can be provided on the OCU for map generation. In an embodiment of the invention employing a basic method of map generation, the remote vehicle is driven around to gather sensor data, grab a log file, process the log file to generate a map, and install the map as the current map. In this initial mapping action of the remote vehicle, it may not be possible to use some of the remote vehicle's other high-level functions because a map is not yet available for use by those function.

An embodiment of a map generation process includes the following steps:

Drive the remote vehicle around the environment to be mapped. At this time, the operator may choose to employ low-level teleoperation controls, for example via touch screen controls on a tablet PC or the hand-held controller of the OCU in FIG. 12, and avoid unnecessary rotations while covering each area as few times as possible. The conditions of the remote vehicle's tracks or wheels may affect accuracy of odometry and therefore are preferably in good condition. It is helpful if the remote vehicle has a good (sensor) view of connections by going all the way into an intersection when returning to the same intersection via a different path. It is also helpful if the operator is not visible to the sensors so that he or she does not register as an obstacle. If this is not possible, the operator preferably stands directly in front of a wall. The origin of the map becomes wherever the robot was when the log file was started.

Import the log file to the OCU when finished (or broadcast the log file to the OCU automatically in real time) by touching, for example, a "Grab Log" button (not shown) on the OCU. In an embodiment of the invention, a window can pop up on the OCU display, requesting the remote vehicle from which to grab the log file. The log file can end when the grab log function completes or the remote vehicle software stops. The remote vehicle software can be stopped then started to reset the beginning of the log file.

Generate a map by touching, for example, a "Gen Map" button (not shown). In an embodiment of the invention, this can bring up a list of available log files and allow the operator to choose which log file to generate a map from. The present invention contemplates allowing an operator to copy generated maps, or even log files, among OCUs either wirelessly or via hardware such as USB memory.

Select a map as the current map to be used by remote vehicles to be controlled by the OCU by touching, for example, a "Set Current Map" button (not shown) to copy the map to selected remote vehicles and set the map as the current map within the OCU itself. In an embodiment of the invention, the "Set Current Map" button prompts the operator for a generated map name and the devices on which to install the generated map. The operator may be provided with a list of generated maps and devices onto which the maps can be installed.

Once mapping has taken place, if needed to perform a mission using one or more remote vehicles, effective control and coordination of multiple autonomous remote vehicles can be accomplished (via the OCU) by employing a layered approach to controlling the remote vehicle(s), allowing the operator to monitor and control the remote vehicle(s) using high-level tasking of multiple vehicles, intermediate operational commands, all the way down to low-level teleoperation of each individual remote vehicle as necessary.

The operator begins a mission employing one or more remote vehicles by setting high-level goals for each team member, including the remote vehicle(s). In an embodiment where the mission is a reconnaissance mission, the high level goals for remote vehicles may include route reconnaissance (in which the remote vehicle is provided with one or more waypoints to be traversed while recording a map of its environment as it travels the path defined by the waypoints), perimeter reconnaissance (in which the remote vehicle circumnavigates a building or other structure by identifying and following the walls of the structure, while recording and/or transmitting a map of the terrain along the perimeter of the building), and street reconnaissance.

Figure 17:
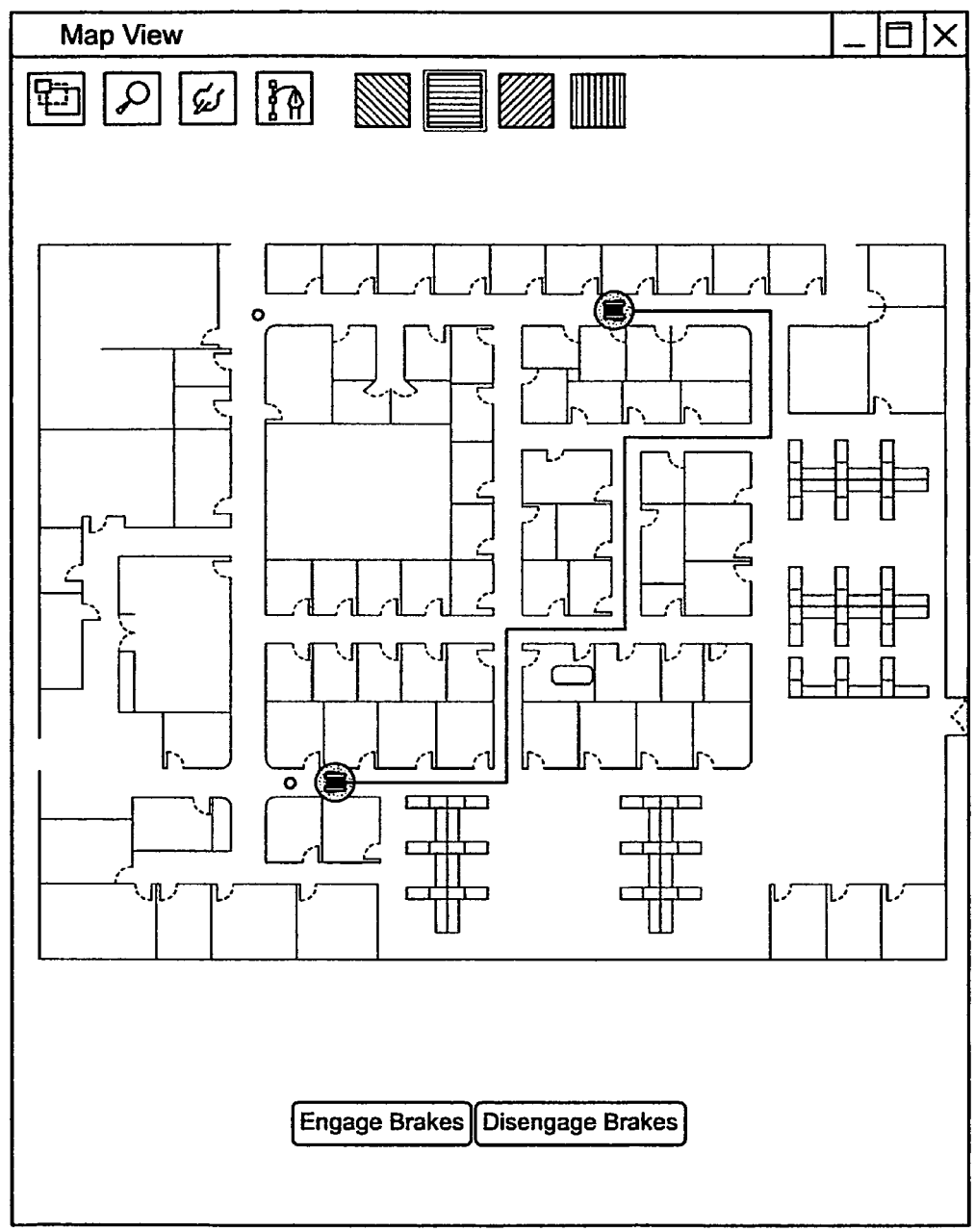
FIG. 17 illustrates an embodiment of an OCU display screen including map of the remote vehicles' environment along with two remote vehicles' respective positions.

To enhance an operator's situational awareness during mission planning and implementation, an embodiment of the invention can provide embedded information in the system-level view of the OCU, such as with an embodiment of a map view illustrated in FIG. 17. Here, each remote vehicle's position is indicated on an environment map, along with each remote vehicle's recent history of motion using a "tail" behind each remote vehicle. In addition, each remote vehicle's status (brake on, brake off but not moving, moving) can be indicated, for example by a colored halo around its icon on the map, and each remote vehicle's current navigational goal can also be displayed on the map. Using these and other representations, an operator can quickly gain an overview of the mission with only a quick glance. If an anomaly is detected, the operator can tunnel down to more detailed information, including full telemetry from each remote vehicle, to diagnose and respond to any issues.

An embodiment of the control system may additionally include an interface for designating a path for each remote vehicle, including for example a path defined via waypoints that are designated by the operator. The interface can use a single mode of operation for simplicity, requiring careful design that allows operation with only a touch screen indicator in the case of the above-describe tablet PC. Designation of waypoints to set a path is described above with respect to FIG. 16.

An additional behavior-specific interface can allow one remote vehicle to follow another, for example using the "link" button described with respect to FIG. 16. This behavior is useful when both remote vehicles know their current correct position, for example via localization. The following remote vehicle's path becomes getting or staying near the leading remote vehicle. Thus, no separate path needs to be specifically set for the following remote vehicle. Any number of remote vehicles can be chained together in this way to follow a single-file line.

Many of the behaviors programmed on the remote vehicle can choose a speed and heading for the robot. In an embodiment of the invention, the heading is specified in odometric coordinates. An odometric coordinate frame tracks the remote vehicle's position over time in a fixed coordinate frame where the remote vehicle's position is updated for odometry. Low-level motor control takes a translational and rotational velocity. The speed selected by the behaviors is passed along to the low-level motor control. A proportional control loop with latency compensation attempts to match the remote vehicle's actual heading to the requested heading. The commanded rotational velocity is defined as $r=k_p(d-(h+dh*t))$ where r is the rotational velocity commanded, $k_p$ is a proportional gain constant (e.g., 4.0), d is the desired heading, dh is the derivative of the remote vehicle's heading, and t is the estimate of the latency (e.g., 0.15 seconds).

Heading and speed control to achieve the desired location in odometry coordinates can be calculated at the same time. First, for every direction the robot may go (e.g., a maximum of +45 degrees away from goal), the maximum safe speed in that direction is calculated based on a distance to the closest obstacle in that direction that the robot would hit with an upper and lower bound. The closest obstacle can be determined via obstacle detection behavior, for example using an occupancy grid. The heading which results in the fastest speed in the direction of the goal can be chosen. For example, if the remote vehicle's intended direction of travel has been set (e.g., via path planning) but is blocked by an obstacle 3 feet in front of the remote vehicle, the remote vehicle must proceed in its intended direction of travel at a speed below it's maximum speed. If there is another direction in which the remote vehicle can more at a greater speed, it may be desirable for the remote vehicle to head in the alternate direction at a greater speed instead, and adjust its path at a later time, for example after passing the obstacle that lay in its original path. Whether it is desirable for the remote vehicle to head in the alternate direction at a greater speed is based on the degree of deviation of that direction from the remote vehicle's originally-intended direction and the increase in speed afforded by the directional change. The direction that gets the remote vehicle closest to its intended destination the fastest should be chosen.

In an embodiment of the invention, the location of and distance to the closest obstacle, and thus the heading and speed determinations, are based on the results of 3D camera data processing, which can be performed by the sensory processor of the remote vehicle according. A depth image from the 3D camera is converted into an equivalent range scan—giving ranges to obstacles to be input into an obstacle detection/avoidance behavior. The range scan then represents the range to the closest obstacle in each direction in the scan. The depth image is simply an image where every pixel has a depth instead of a color.

The first step in the conversion process uses an algorithm to convert the depth image to a range to the closest obstacle. In an embodiment of the invention, the processing assumes that the 3D camera is always parallel to the ground (that the remote vehicle is resting on/traversing). This assumption implies that a particular direction corresponds to a single pixel column. Each pixel column of the depth image is processed separately to get the range to the closest obstacle in the corresponding direction.

According to an embodiment of the invention, the conversion algorithm first checks for overhanging obstacles that might obstruct the top of the remote vehicle. A simple moving average of 5 pixels is used to get a range. Based on the geometry of the 3D camera and this range, a 3D point location for the 5-pixel patch is calculated. This location is checked for height to determine whether the top of the remote vehicle will be obstructed.

In accordance with an embodiment of the invention, the conversion algorithm is part of an obstacle classification system that analyzes a set of 3D points by converting depth map information generated from the stereo vision camera back into 3D point information. The 3D point information can then be projected onto a 2D grid where statistics are kept on all the points that "hit" each 2D grid cell. An algorithm keeps track of the minimum and maximum height of all points that hit a cell, and also counts the number of points that hit a cell. This quantized processing allows for efficient and low-latency handling of the 3D information that is suitable for OD/OA systems.

Once the statistics grid is computed to filter out spurious readings, a set of heuristic rules are used to classify grid cells as obstacles based on the properties of the remote vehicle system. The heuristic rules include: (1) a grid-to-grid slope threshold applied to detect obstacles too steep for the robot to climb. Surfaces that appear to change at a slope>45° are considered to be obstacles. This allows the stereo vision to report trees, walls, and posts as obstacles, but to omit curbs and gentle slopes from the obstacle map; (2) a grid minimum height threshold applied to detect "overhanging" obstacles that don't touch the ground. Thus, the system won't report a high truck body as an obstacle since it can pass under the truck, but the slope threshold will report the tires as obstacles to drive between.

The combination of these two heuristic classification approaches yield good 3D obstacle perception that is matched to the remote vehicle's mobility characteristics.

The conversion algorithm can then check the ground to determine a range to the closest insurmountable obstacle. An obstacle is considered surmountable if the angle (slant) of the ground is less than a threshold value. The slant is calculated based on a linear fit. First the data can be filtered using a median of 3 filters on the pixel column, which replaces each pixel with the median of its value and its two immediate neighbors. Filtering helps rejects outliers in the data. The filtered pixel ranges can then be passed into a linear fit routine in chunks of 15 neighboring pixels at a time. The linear fit routine can use summary statistics to avoid repeating calculations, and can use a parametric form to avoid degeneracies on vertical lines. If the slope threshold is exceeded, the distance is calculated and the minimum distance to an obstacle in that direction is updated. The current obstacle slope threshold is 0.5 which corresponds to a rise/fall of 0.5 m per meter of run. The resulting map from angle to distance to closest obstacle can be downsampled to get a range scan that can be used in the same way as a SICK LIDAR scan. Downsampling refers to the process of reducing the sampling rate of a signal, usually to reduce the data rate or the size of the data.

Once a path has been set for the remote vehicle, including heading and speed, an obstacle detection/avoidance behavior detecting an obstacle can assert control of the remote vehicle's actuators to perform an obstacle avoidance routine. The operator may or may not have to engage the obstacle detection/avoidance behavior upon initiating a mission. In an embodiment of the invention, the routine inputs video data from the obstacle detected and uses the video camera's resolution to determine the dimensions of the obstacle. To ensure proper clearance, the routine can bloat the obstacle by a predetermined value so that an avoidance vector can be calculated. The avoidance vector allows the remote vehicle to drive along a path that avoids the obstacle. As the remote vehicle drives forward, the routine continues t check for obstacles. If another obstacle is detected, the remote vehicle inputs the video image of the obstacle and determines its dimensions, bloats the obstacle and calculates a new avoidance vector. These steps occur until no obstacle is detected, at which point the obstacle avoidance routine is exited and the remote vehicle continues on its path or calculates proper return to its path.

In an embodiment of the invention, the obstacle detection/avoidance behavior includes a memory of nearby obstacles that persists even when the obstacles cannot be seen. This memory can be represented as an occupancy grid map (see bottom right of FIG. 16) that is roughly centered on the remote vehicle. An occupancy grid mapping is used for environment modeling in remote vehicles. Occupancy grid maps are spatial representations of robot environments. They represent environments by fine-grained, metric grids of variables that reflect the occupancy of the environment. Once acquired, they enable various key functions necessary for remote vehicle navigation, such as localization, path planning, obstacle detection and avoidance, and people finding.

In an embodiment of the invention, the occupancy grid map is generated from a time-of-flight sensor such as a Swiss- Ranger or a flash LIDAR, or a stereo vision camera. A SwissRanger sensor emits a continuous wave of light with a non-zero vertical field of view and about a 60° horizontal field of view. A SwissRanger sensor sends out light of a given wave and measures the sine of a returned (reflected) wave to determine a distance to the object from which the wave was reflected (time-of-flight, indirectly determined by phase shift, determines distance). Flash LIDAR measures wave time-of-flight directly. One embodiment of the present invention contemplates physically scanning the SwissRanger back and forth about 20° to the left and to the right (for example via a pan/tilt), giving it an overall horizontal field of view of 100°. Generally, the greater the panning distance, the less frequently data is updated. Flash LIDAR is a pulse range sensor with a non-zero vertical field of view that can also be physically scanned back and forth to a desired field of view. Stereo vision utilizes a discrepancy between two cameras to determine depth of obstacles. Essentially, pixel displacement is measured between left and right images of the same object.

In the image generated by the sensors, every pixel has a depth value (or no value if not available). Availability of a depth value depends on the sensor type. For example, a SwissRanger or a flash LIDAR would probably not return a depth value for black or mirrored surfaces, and a stereo vision camera would probably not return a depth value for a surface without texture. An embodiment of the invention contemplates utilizing data from more than one type of sensor to maximize the pixels for which depth values are available.

Presently-available SwissRanger sensors may be limited to indoor use because they utilize LEDs for light pulses. In an outdoor environment, the signal returned from such low-power LEDs can be overwhelmed by ambient light. Flash LIDAR includes a higher-power light source and thus can be suitable for outdoor use.

Based on the field of view of the sensor and its pan angle, the direction of each pixel is determined. Thus, the direction and depth of each pixel is known. In an embodiment of the invention employing a SwissRanger sensor, a 160×124 pixel (two-dimensional) image is created, each cell in the two-dimensional image including a depth to the nearest detected potential obstacle. A vertical column in the two-dimensional image corresponds to a vertical slice of the sensor's field of view. Points are plotted for each column of the two-dimensional image output from the SwissRanger, the plotted points representing distance from the remote vehicle and height. From the plotted points, one or more best-fit lines are created by sampling a predetermined number of sequential point. In an embodiment of the invention, a best-fit line can be created for 15 sequential points, incrementing the 15-point range one point at a time. The best-fit line can be determined using a least squares regression or a least squares minimization of distance from fit line to data points.

Once one or more best-fit lines have been determined, the slope of each line is compared to a predetermined threshold slope. If the slope of the best-fit line is greater than the predetermined threshold, the line is considered to represent an obstacle. The predetermined threshold slope can depend, for example, on the capabilities of the remote vehicle and/or on certain other physical characteristics of the remote vehicle (e.g., its pose or tilt) that determine whether it can traverse an obstacle of a given slope. Using this method, every column in the SwissRanger two-dimensional image is translated into a single value representing a distance to the closest obstacle. Thus the two-dimensional pixel grid is transformed into a single row of values or "bins," e.g., 160 for a SwissRanger with a 160×124 pixel image. The distance may be infinity when no obstacle is detected. Slope measurement is used to filter out the ground.

In an embodiment of the invention, the 160 values can be downsampled to a desired number of bins. A greater number of bins provides a finer resolution for determining obstacle position, but a lesser number of bins simplifies subsequent processing. The downsampled bins are then utilized as input to the obstacle detection and avoidance software. Indeed, existing obstacle detection and avoidance software created to utilize laser scan input can utilize SwissRanger input by downsampling the bins to the number of bins produced by a laser scan previously employed as input to the software. The SwissRanger data is more robust than laser scan data because laser scan data is a single plane detection whereas SwissRanger provides a scan with a non-zero vertical field of view (the field of view of the SwissRanger is cone-shaped).

The bins containing obstacle distances are used to create the occupancy grid representing the remote vehicle within its environment. In an embodiment of the invention, the occupancy grid is updated periodically to add the remote vehicle's locale and the location of detected obstacles. When an obstacle is detected within a cell during a scan, the bin is incremented. Based on distances to obstacles, an obstacle-free area is detected. According to an embodiment of the invention, every cell in the obstacle-free area can be decremented to provide more robust obstacle detection data.

As the remote vehicle's position is updated, for example via GPS or odometry, so is its position within the occupancy grid. In an embodiment of the invention, updates to the remote vehicle's position and the position of obstacles are performed independently and consecutively.

According to an embodiment of the invention, more recent information is weighted to represent its greater importance. An exponential average can be used to properly weight new information over old information. Exponential averaging is computationally efficient and handles moving object detection suitable well. The weight afforded newer information can vary, with current values in the grid being made to decay exponentially over time. For example, a negative value (indicating no obstacle) can be made to switch to a positive value (indicating the existence of an obstacle) within three frames. Noise from the sensor should be balanced with accuracy in weighting and decaying values within the grid.

Whether or not the remote vehicle can proceed under a detected obstacle is determined by analyzing a range of data representing the vertical field of view between straight ahead and the height of the robot. Linear fits need not be utilized. Minimum distances are calculated and filtering is employed.

As the remote vehicle moves, parts of the local memory that are far from the remote vehicle can be forgotten and new areas can be added near the remote vehicle. The grid can remain fixed in the environment and the remote vehicles location within the fixed grid is tracked as it moves and the grid wraps around in both directions as necessary to keep the remote vehicle roughly centered. This is accomplished using a modulus on the index. In computing, the modulo operation finds the remainder of division of one number by another. Given two numbers, a (the dividend) and n (the divisor), a modulo (abbreviated as a mod n) is the remainder, on division of a by n. For instance, the expression "7 mod 3" would evaluate to 1, while "9 mod 3" would evaluate to 0. Practically speaking for this application, using a modulus causes the program to wrap around to the beginning of the grid if addition locations of the remote vehicle or detected obstacles go past a grid end point.

In an embodiment of the invention, as the remote vehicle's location crosses a cell boundary within the occupancy grid, data opposite the remote vehicle is cleared so that those cells are available to receive new data. However, despite clearing data opposite the remote vehicle, some detected obstacle data beside and behind the remote vehicle continues to be updated—if sensor data is available—and is available if needed until cleared.

The local perceptual space (LPS) stores a representation of obstacles in the immediate vicinity of the remote vehicle. The LPS can be stored as an occupancy grid and can cover, for example, a 4 m×4 m area with 0.12 m×0.12 m cells. Each grid cell stores a weighted sum of evidence for/against an obstacle in that grid cell. The data in the grid cells can decay exponentially with a half life of, for example, 0.4 seconds.

In an embodiment of the invention, as stated above, the grid remains centered on the remote vehicle and is oriented in a fixed direction, which can be aligned with the axes of odometric coordinates (a fixed coordinate frame in which the platform's position is updated based on odometry). The remote vehicle's current position and orientation in odometric coordinates is also stored. Each grid cell covers a range of odometric coordinates. The exact coordinates covered are not fixed, however, but can change occasionally as the robot moves. The grid acts like a window into the world in the vicinity of the robot. Everything beyond the grid edges is treated as unknown. As the robot moves, the area covered by the grid also moves. The position of the robot has an associated grid cell that the robot is currently inside. This cell acts as the center of the LPS. The grid is wrapped around in both x and y directions (giving the grid a toroidal topology) to provide a space of grid cells that moves with the robot (whenever the robot crosses a cell boundary) and stays centered on the robot. Cells directly opposite from the position of the robot in this grid can be ambiguous as to which direction from the robot they represent. These cells are actively cleared to erase old information and are dormant until they are no longer directly opposite from the robot. This structure provides for a fast, efficient, and constant memory space LPS.

To use LPS in behaviors, a virtual range scan is computed to the nearest obstacles. This virtual range scan represents what a range scanner would return based on the contents of the LPS. Converting to this form allows the same behaviors that were developed with SICK LIDAR data to also be used with data that originates from a 3D camera such as a Swiss-Ranger, which has a significantly smaller field of view.

The following detailed description addresses exemplary semi- and fully-autonomous behaviors that may be available in a remote vehicle in accordance with embodiments of the present invention.

Localization and Mapping

For controlling multiple remote vehicles, it is important that the operator be able to communicate instructions to the remote vehicle as easily as possible. For communication to be effective, the operator and the remote vehicles should share a common reference frame to which commands and instructions can be related. The most obvious common reference frame is the physical world. Humans naturally build an internal map with a notion of places and the ways in which they are connected. Remote vehicles can be programmed to have this ability. The process of determining the position of a remote vehicle within a map is known as localization. When location and mapping are done at the same time, the process is known as Simultaneous Localization and Mapping (SLAM).

By having a shared notion of a map of the environment, the operator can more easily communicate intent in a language that the remote vehicles can understand. For example, by having a shared map, the operator can direct a remote vehicle to go to a particular location by clicking where on the map the robot should go. Having a shared map also makes it easy to express instructions such as explore this area, patrol this area, follow this path, take pictures from these locations, etc.

An embodiment of the present invention utilizes a Monte Carlo Localization algorithm for localization, which works by maintaining a probability distribution over remote vehicle positions. Monte Carlo Localization is described in: (1) Dieter Fox, *Markov Localization: A Probabilistic Framework for Mobile Robot Localization, and Navigation*, Ph.D. Thesis, Department of Computer Science, University of Bonn, Germany, December 1998; and (2) Thrun, et al., *Probabilistic Robotics*, MIT Press, September 2005, the disclosures of which are incorporated herein by reference.

At any point in time, the remote vehicle has a notion of the probability of being at a particular location and orientation. For computational efficiency reasons, the probability distribution is represented as a set of discrete guesses of possible remote vehicle locations. These guesses are commonly called particles or samples. Each particle represents a single, exact possible position of the remote vehicle. For example, a particle might represent the hypothesis that the remote vehicle is at exactly (23.452, 10.024) with an angle of −45.32 degrees relative to its origin. As the remote vehicle moves, the particles are moved in the same fashion. If the remote vehicle moves forward 1 meter, each particle moves forward approximately 1 meter with some error introduced to represent error in the remote vehicle's motion. As sensor readings become available, each particle is evaluated to determine how likely it is that the remote vehicle would have seen those sensor readings from the position at which the particle is located. This evaluation requires that the remote vehicle have a map of its environment. The particles are then weighted based on those likelihoods. Based on the weights, some particles are duplicated and others are removed to produce a new set of samples with uniform weights. Particles with higher weights are more likely to be duplicated and particles with lower weights are more likely to be dropped. All of these updates are done based on a probabilistic foundation which provides proof that the algorithm behaves properly under a set of assumptions, although not all of these assumptions are met in practice.

Figure 18:
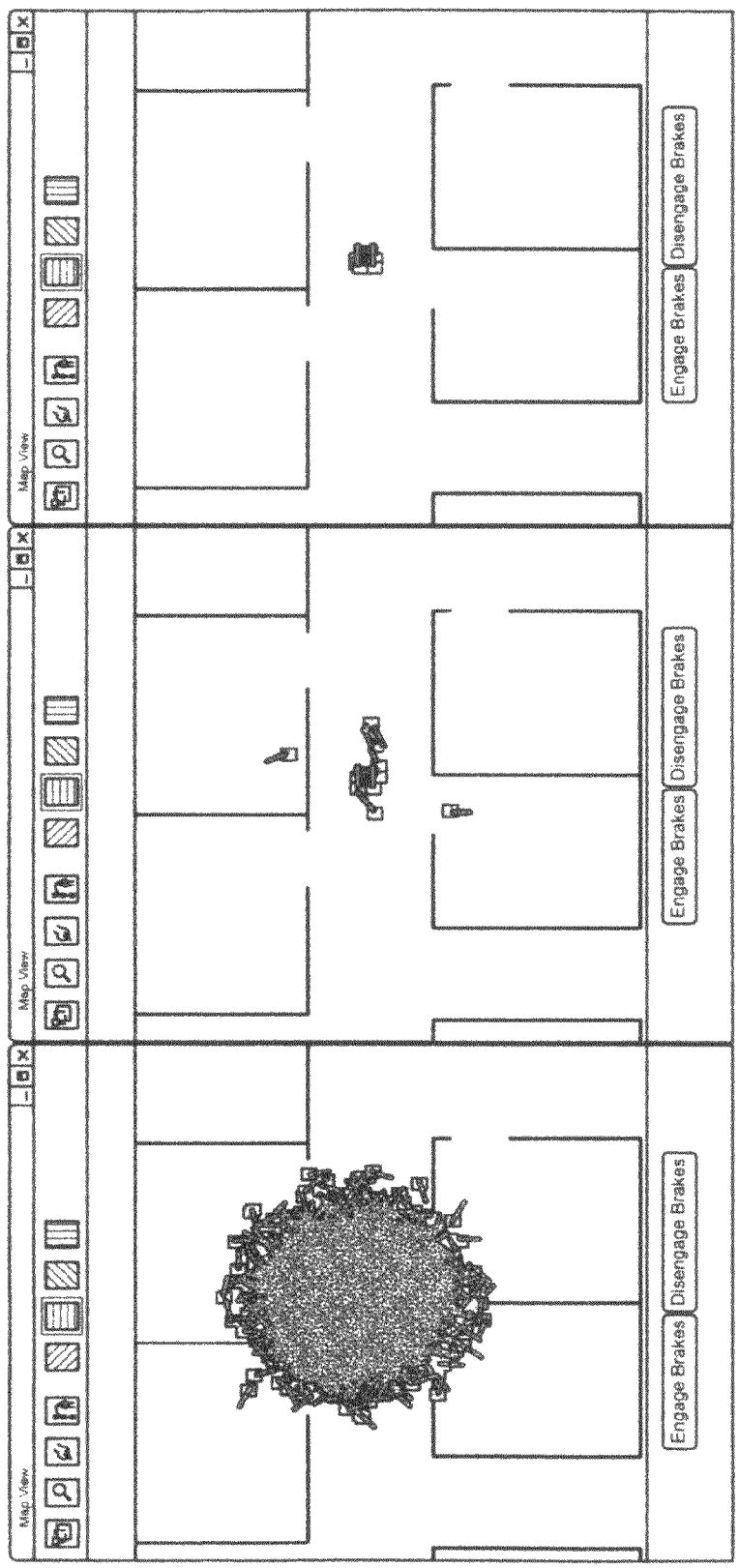
FIG. 18 illustrates a pictorial representation of the workings of an embodiment of a localization algorithm.

A pictorial representation of the workings of the algorithm is shown in FIG. 18. In the left figure, the robot's position is initialized to an unknown position near an office. Each square shows one possible location of the robot (the location of a particle). The line drawn from the center of each square shows the orientation of the particle. Toward the edge of the circular region you can see the individual particles. In the center figure, the robot has received more information, primarily about a wall to the robot's left. At this point, you can see that the remote vehicle has been able to eliminate many positions as possibilities, but multiple distinct possibilities remain. In the figure on the right, the remote vehicle has obtained additional information and has converged to the correct position of the remote vehicle.

Because the Monte Carlo Localization algorithm cannot represent events that are outside of its model and uses approximations, there may be events that will be missing from the model and occasional failures. For this reason, an embodiment of the present invention contemplates having the localization notice when it is having a problem and perform appropriate recovery actions. Thus, a limited recovery system has been implemented to allow the robot to recover from some errors and interference. Algorithms for performing a simple recovery can be integrated into the system. The recovery system can be based on a Hybrid Markov Chain Monte Carlo (Hybrid MCMC) algorithm. This algorithm is a method to efficiently generate samples (particles) distributed according to an arbitrary probability density and under very mild requirements on the probability density. When a potential problem is detected, some of the particles in the localization representation are picked to represent the chance that an error occurred. Each of these samples is replaced with a new sample that incorporates several factors. The first factor biases the new samples to be near the old samples.

The bias represents the belief that most problems are local in nature and the remote vehicle is likely to be in the vicinity of where it thinks it is. The other factors incorporate information from the sensor readings that are currently available. The combination of these factors creates a probability density. The Hybrid MCMC algorithm is then used to generate samples from this density. Both the local bias factor and the sensor readings can be incorporated into the probability density. The net result is a local search constrained by the current sensor readings which tends to act to correct the position estimate.

In order to localize itself, the remote vehicle needs an accurate map of the environment. To build an accurate map of the environment, the remote vehicle needs to know its position. These needs can create a chicken and egg problem. To solve this problem, the position of the remote vehicle must be estimated at the same time that the map is being constructed. An embodiment of the present invention contemplates using Simultaneous Localization and Mapping (SLAM).

Figure 19:
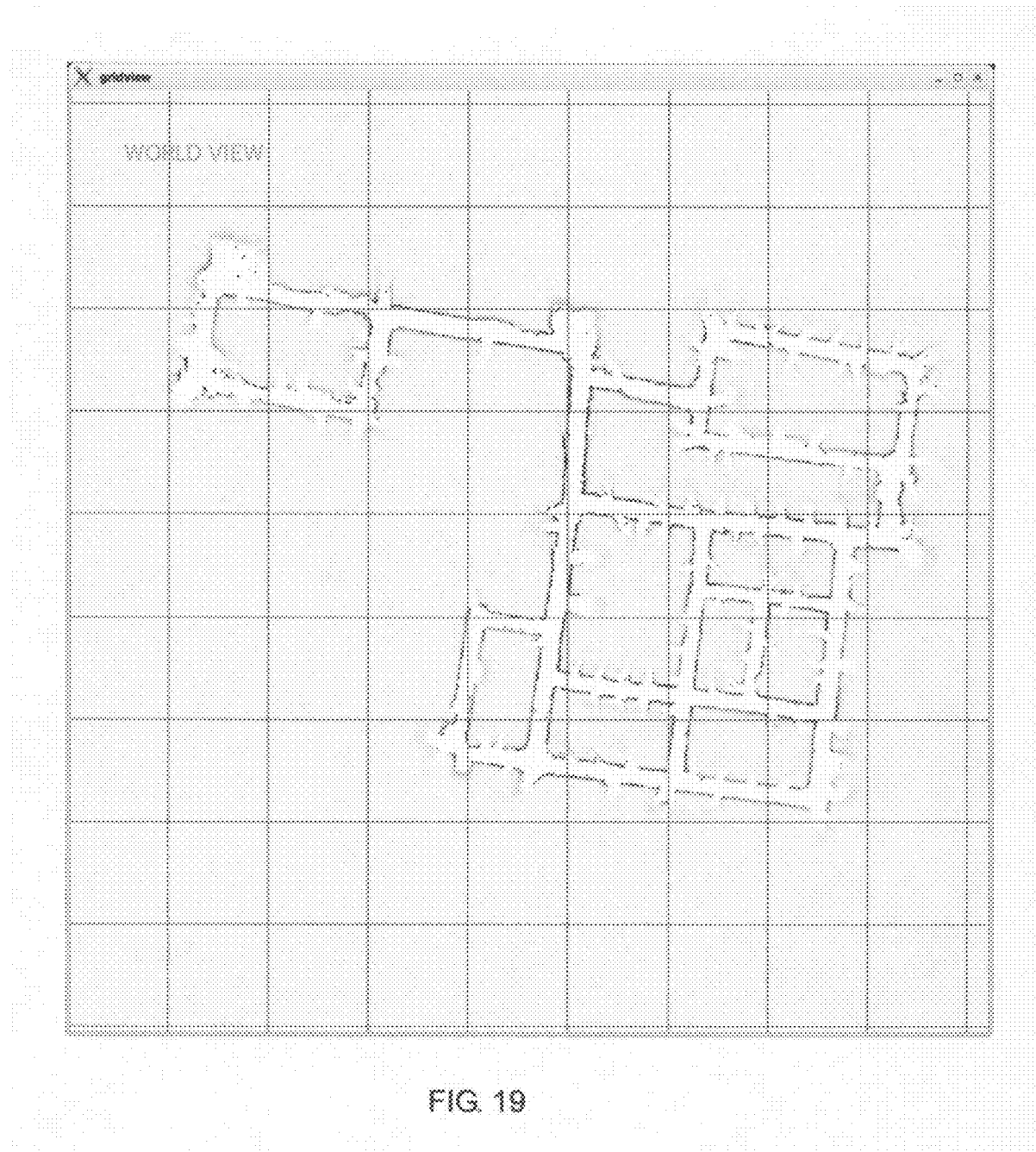
FIG. 19 illustrates is an example of a building map generated using position information estimated from odometry and sensor information during simultaneous localization and mapping (SLAM)

FIG. 19 is a building map generated using position information estimated from odometry and sensor information during SLAM. An embodiment of the present invention utilizes a SLAM system having two modes in the map building process. As the remote vehicle moves, it generates a rough map sufficient for localization and presentation to the user. Another process refines the map to make a detailed map (such as that shown in FIG. 19, preferably with fast but slightly less than real time performance.

In an embodiment of the invention, the mapping technique is based on an incremental strategy for building a map. As the remote vehicle moves and receives new range scans, the position of the remote vehicle is updated based on odometry and corrected based on the sensor information. The new range scan is then added to the map and the process is repeated. The addition of a range-finding system such as SICK LIDAR can assist with the map building process because it provides a greater range, better accuracy, and larger field of view than a 3D camera. A hill climbing approach can be employed, using a representation based on geometric primitives to add each scan to the map. The representation based on geometric primitives stores the range scans directly and processes them in that form. The representation has two geometric primitives, a point representing a location at which an obstacle was detected and a triangle representing an area that is believed to be clear. The consistency of the scans can be compared directly by looking for point obstacles from one scan that are inside clear triangles from another scan.

An example map produced using this technique is shown in FIG. 19, which captures the structure of the building and is a functional map with substantially no inconsistencies and only minor metric errors.

Localization to an existing map, when available, can be used to update the remote vehicle's position based on odometry and range data by comparing to a reference map. With an existing map, the localization algorithm can alternatively be a variant of an Adaptive—Monte Carlo Localization, performing a local search near the remote vehicle's current estimated position using the Hybrid MCMC algorithm to search over a probability density to generate new samples. To detect problems in the localization and attempt to perform a recovery action, this variant can use the failure detection metric used by Adaptive—MCL with sensor values normalized based on their expected likelihood.

When a likely failure of the localization system is detected, the system attempts to automatically recover. The failure recovery replaces some of the samples in the probability density representing the remote vehicle's position with new samples based on the current sensor readings. The number of samples replaced can depend on a level of failure of the localization system. Samples are generated according to a probability density that has two components. The first component makes positions near the robot's previous estimate of its position more likely and constrains the search to prefer solutions that are near where the robot thought it was. The second component calculates the probability of the current sensor measurements and constrains the search to prefer solutions that match the current sensor readings. The overall system is a local recovery system and will not recover from global errors. In an embodiment of the invention, the sampling algorithm used is Hybrid MCMC. Each sample is generated separately and is simulated for 10 MCMC steps each consisting of 5 leapfrog iterations.

In an embodiment of the invention, the SLAM algorithm is an incremental algorithm based on scan matching. The SLAM algorithm proceeds as follows: (1) acquire a new scan from the SICK LIDAR after a predetermined distance of travel; (2) select a number of previous scans to match against; (3) find the position for the new scan that best matches the selected scans; (4) add the new scan to the map at the calculated position; and (5) repeat steps 1-4 until no more scans are available. The resulting map consisting of scans with positions can then be converted into an occupancy grid for easy viewing, storage, and localization.

The scan matching algorithm can have three main components: scan selection, alignment scoring, and alignment search. In the scan selection algorithm, the scans to match against are selected for relevance and coverage, closer scans being more relevant. Scans that overlap less provide better coverage. These goals are achieved by matching against close scans in different directions. The space around the scan to match is divided into 8 equal sized angular spans (pie wedges). In each span, the closest four scans are used in the matching process. If this results in more than 20 valid scans to match against, the total can be cut down to 20 by using less than four scans from each angular span (wedge).

Using scans from different directions enhances global consistency in the map. Scans from the direction of travel can provide a look ahead to what existing map the new scans must integrate into. This process allows the algorithm to make small corrections to make the pieces fit together.

Using an alignment scoring algorithm, scan alignment can be scored based on a total inconsistency between the scans. Scans are represented as clear polygons with point obstacles and inconsistencies are point obstacles from one scan that are inside clear polygons of another scan. For each such inconsistency, the magnitude of the inconsistency depends on the distance that the point obstacle would have to be moved to be outside the clear area of the other scan. Assuming a Gaussian error model for obstacle measurements, the probability of the inconsistency being observed can be calculated. The total likelihood of all of the inconsistencies combined can then be calculated (assuming that the inconsistencies are independent). The negative log of this likelihood is the alignment score used. The overall calculation can be expedited by using several spatial data structures to speed up the calculation of closest points.

In an embodiment of the invention, an alignment search algorithm is employed and uses a simple hill climbing algorithm. A seed alignment is provided based on odometry information. The algorithm then tries an alignment perturbed by a constant amount along each axis from this starting point. The best perturbation becomes the current alignment and the process is repeated. Once no perturbation improves the alignment, the scale is halved and the process is repeated. Once a minimum scale is reached the process stops and the best alignment is returned.

An additional search can be performed when there is a large rotation by the remote vehicle, for example when the remote vehicle going around corners. To improve the seed alignment given to the hill climbing algorithm, when a large rotation is detected, a global search over a range of orientations is performed (all at the same position). The best alignment from this limited global search becomes the seed to the hill climbing search.

In an embodiment of the invention an occupancy grid creation algorithm coverts the scan-based map into an occupancy grid by projecting the rays from the scans into an occupancy grid. The occupancy grid is updated based on the sensed range of each ray given the position the reading was taken from and taking into account the current contents of the occupancy grid map.

In an embodiment of the invention, a hybrid compass/odometry localization technique may be used with or instead of the above-described localization technique, in which the compass is used to determine the remote vehicle's orientation, and odometry is used to determine the distance translated between updates. The remote vehicle's new position may be determined using the following equations:

$$\Delta_t = \sqrt{(x_t-x_{t-1})^2+(y_t-y_{t-1})^2}$$

$$x'_t = \Delta_t \cos \theta_t$$

$$y'_t = \Delta_t \sin \theta_t$$

where $(x_t, y_t)$ is the odometry position at time t, $\theta_t$ is the compass heading at time t, $\Delta_t$ is the distance traversed between time t−1 and time t, and $(x'_t, y_t)$ is the hybrid compass/odometry position estimate for time t.

Pure odometry may tend to rapidly accumulate error in the estimate of the remote vehicle's orientation, while hybrid data integrated from multiple localization systems (such as a GPS, INS, or compass-tracking system) can provide highly accurate maps because of the significant improvement in localization precision.

In contrast, use of a compass can enable the remote vehicle to reliably determine its position to within a few degrees, and a hybrid compass/odometry localization method can determine the remote vehicle's position accurately to within a few meters.

Dynamic Path Planning

After a suitable map is generated and localization has taken place, dynamic path planning can occur. In an embodiment of the invention, each remote vehicle has dynamic path planning capability. A graph-based path planning approach can be used to plan the shortest path between any two locations in the environment using a map (graph) that can be generated automatically based on the map created by the mapping module. The path planning process can be executed several times per second, permitting a dynamic re-planning capability if local changes in the environment necessitate a different route to the goal.

The planning graph is generated using a virtual grid overlaid on the map created by the mapping module. The grid spacing is chosen to be small relative to the space that the remote vehicle needs to be able to turn around in place. The points forming this virtual grid become nodes in the planning graph after going through a multi-step filtering process. The first step determines the distance to the closest obstacle for every point in the originally-generated map (from the mapping module). The second step determines, for each point in the virtual planning grid, whether the remote vehicle can turn around in place in that location without hitting anything. If the remote vehicle cannot turn around in place, a search is started for a nearby point where the remote vehicle can safely turn around. If a close enough point is found, this point on the virtual grid is shifted to the safe location resulting in a distortion of the virtual grid. If no point is found, this point is removed from the planning graph. In the next step, each point from the virtual grid is connected to any remaining neighbors from the virtual grid (4-connected neighbors). These points and connections form the graph that the robot uses for planning paths.

Using the OCU, the operator can independently give each robot a navigational goal that is designated, for example, by clicking on the map of the environment in the OCU. Once the goal is assigned, the remote vehicle plans a path from its current location (as determined through via localization) to the goal and proceeds to autonomously navigate to the goal following this path. In an embodiment of the invention, during navigation, the remote vehicle will avoid local obstacles in the environment and continuously re-plan its path to the goal. Using an OCU map view such as the embodiments illustrated in FIGS. 15 and 17, the operator can monitor the status of each remote vehicle and be alerted if a remote vehicle encounters problems.

For the path planning algorithm to work, the occupancy grid map must be converted into a planning graph giving connections between locations. This conversion can be done in several steps: (1) for each point in the occupancy grid map, the distance to the nearest obstacle is calculated; (2) for each point in the occupancy grid map, the distance to the nearest obstacle is used to calculate whether the remote vehicle can turn in place at that location; (3) a virtual grid of planning nodes is laid over the occupancy grid map; and (4) added neighboring nodes in the virtual grid are connected. When a virtual grid of planning nodes is laid over the occupancy grid map, nodes lying at a free point are added to the planning graph while nodes that lie very close to an obstacle are removed and nodes that lie at points outside the obstacles but are too close to obstacles to allow turning in place receive additional processing as follows: (a) search alternative locations that are not in the responsibility region for neighboring nodes; (b) if a free location is found, move the node to that location and add it to the planning graph; (c) otherwise, remove the node.

In an embodiment of the invention, the path planning algorithm uses a standard A* search over the planning graph. Before the search can proceed, a link is added from the remote vehicle's position to the closest node in the planning graph and another link is added from the goal position to the closest node in the planning graph. These extra links are removed once the search is completed.

In an embodiment of the invention, a path following algorithm can be used to set, as an intermediate waypoint, a waypoint that is 1.7 meters along the desired path. This can allow a degree of path smoothing, attempting to round corners. In an embodiment of the invention where obstacle detection/avoidance is employed, this behavior can limit what the robot is allowed to do with respect to path smoothing.

Reconnaissance Operation "Leash" Constraints

In order to ensure that the mobile robot 10 does not stray too far from its intended reconnaissance target or continue indefinitely, a "leash" constraint may be established for the robot operations, which ensures that the missions performed by the mobile robot have clearly defined limits or parameters. For example, a distance leash of 200 meters may be specified by the operator prior to initiating a follow-street operation, such that the mobile robot will halt its outgoing autonomous navigation down a street once it has traveled 200 meters away from its starting position, and return to the starting point (see, for example, the distance leash method illustrated in FIG. 20). Alternatively, the leash may be a time leash, in which the robot proceeds with an operation for the duration of a period of time specified by the operator, and then halts and returns once the period of time has elapsed (see, for example, the time leash method illustrated in FIG. 21).

By defining mission parameters using a leash, the operator knows that the remote vehicle 10 will return to its starting position regardless of whether other "end conditions" trigger the conclusion of its mission. In accordance with embodiments of the invention, the operator may elect not to specify a leash, or even to override an inherent leash included in the control software.

Follow-Street Behavior

Figure 22:
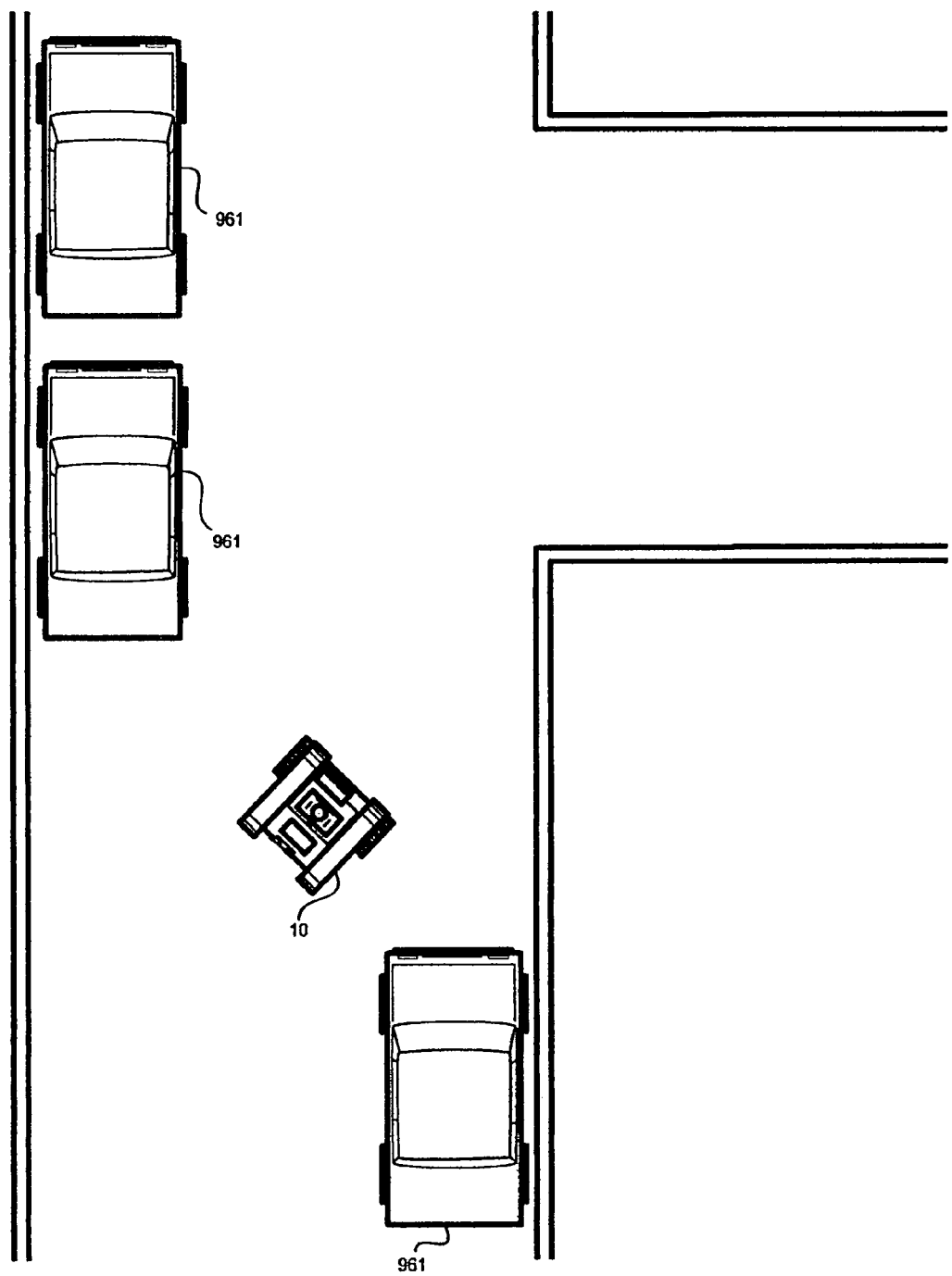
FIG. 22 illustrates a remote vehicle performing a follow-street behavior in accordance with the present invention.

FIG. 22 illustrates a remote vehicle 10 performing a follow-street behavior on a roadway having parked cars 961 on the side of the road. In an embodiment of the invention, the remote vehicle 10 uses a range finder such as LIDAR to detect the parked cars 961 and the right and left edges of the roadway, and then selects a linear path corresponding to the direction of the road by performing Hough Transform analysis of the range finder data. The follow-street behavior attempts to find a respective Hough line on both the right and left sides of the street, and selects a heading for the remote vehicle 10 corresponding to an average of the detected right and left Hough lines.

Figure 23:
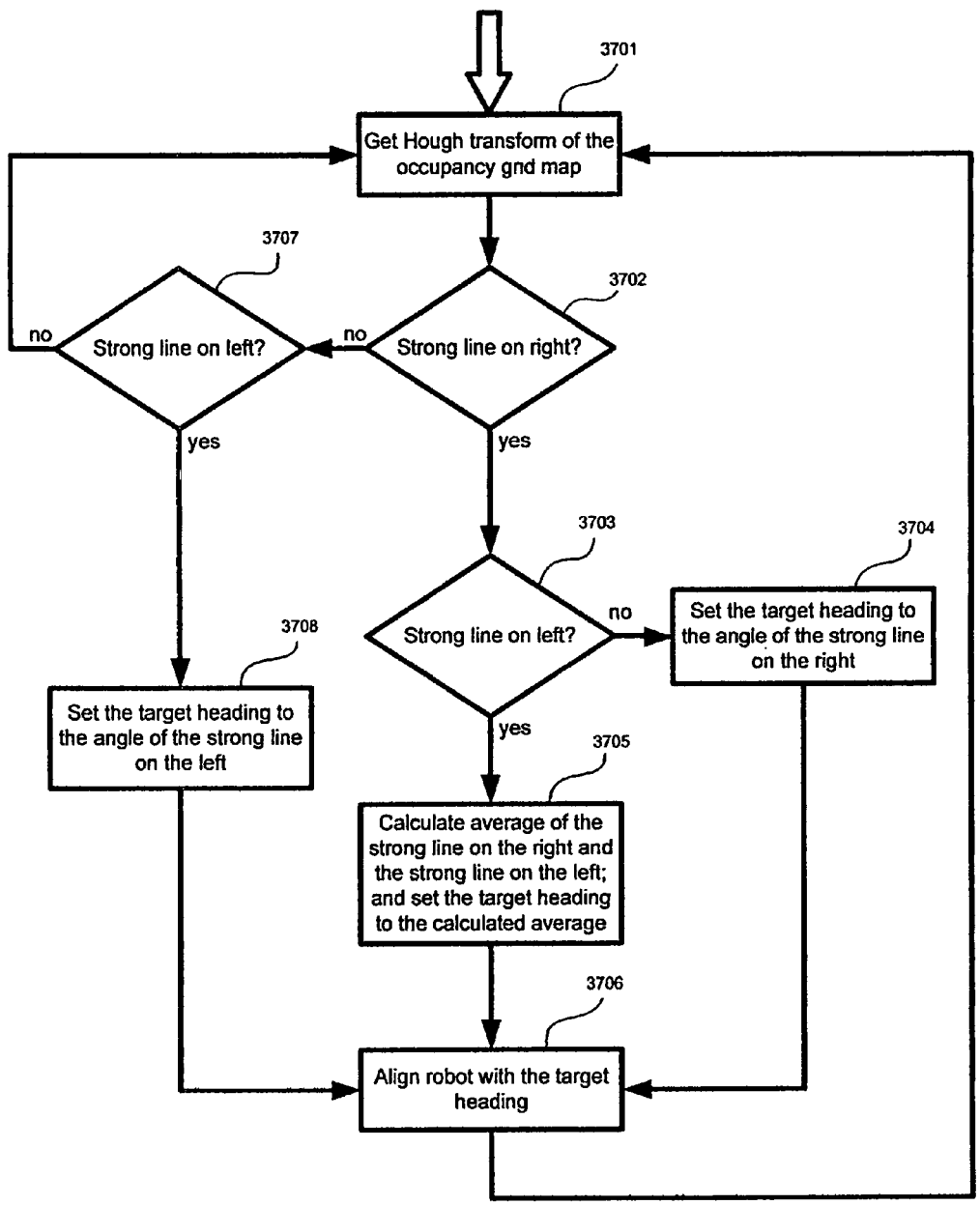
FIG. 23 illustrates an embodiment of a method for performing the follow-street behavior.

FIG. 23 illustrates a method for performing the follow-street routine, in which an initial step 3701 performs a Hough transform on the data provided from the remote vehicle's range finder to identify two Hough strongest lines one on the right side and one on the left side of the remote vehicle 10. At step 3702 the routine determines whether a Hough strongest line has been identified on the right side; if so, the routine proceeds to step 3702, while if not, the routine proceeds to step 3707. Both steps 3703 and 3707 then make a similar determination whether a Hough strongest line has been identified on the left side.

If the results of steps 3702 and 3707 are both "no"—that is, no Hough strongest line was identified for either the left or the right side—then the routine loops back to initial step 3701 without altering the heading or velocity of the remote vehicle 10 (and resultingly, the remote vehicle 10 continues forward at whatever velocity and heading it had before that iteration of the follow-street routine). On the other hand, if a Hough strongest line was identified for only the left side, then step 3708 sets the target heading for the remote vehicle 10 to the strongest line on the left side; while if only the right side had a Hough strongest line, step 3704 sets the target heading to the strongest line on the right side. If respective strongest lines were identified for both the right and left sides, then step 3705 calculates an average vector based on the right and left Hough strongest lines and establishes this average as the target heading for the remote vehicle 10. Then, after any of steps 3704, 3708 or 3706, the routine steers the remote vehicle 10 toward alignment with the target heading at step 3706 before looping back to step 3701.

Figure 20:
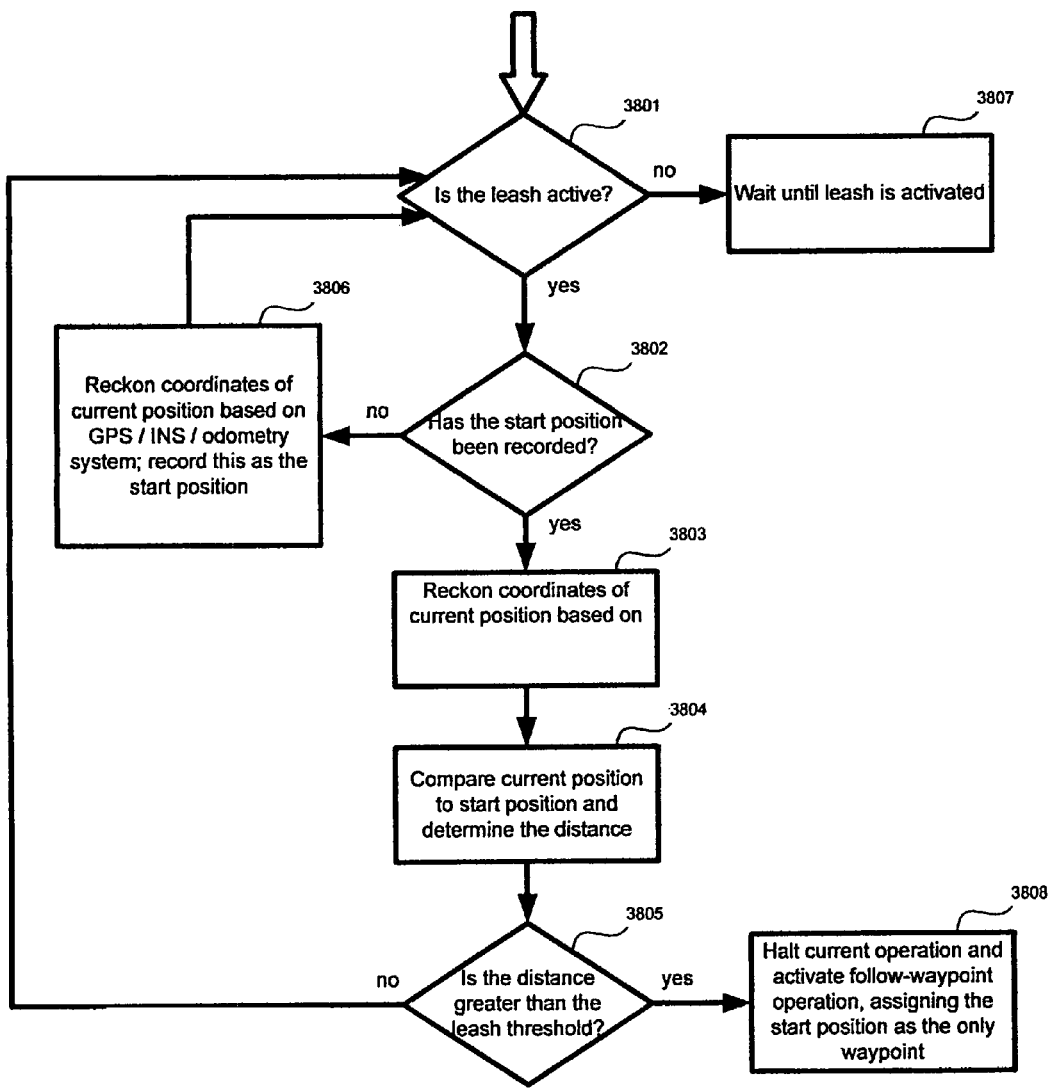
FIG. 20 is a flow chart illustrating an embodiment of a method for imposing a distance "leash" constraint on a remote vehicle in accordance with the present invention.

The follow-street operation can be performed in combination with a distance leash routine that specifies the threshold distance to which the robot should continue down the street. As illustrated in FIG. 20, the distance leash routine may execute on the remote vehicle's primary processor 140 concurrently with the follow-street operation. At an initial step 3801, the distance leash routine checks whether the leash routine is active (by, for example, checking a Boolean flag in the memory store of the processor 140) and, if not, enters a waiting state at step 3807. If the distance leash routine is active, however, the routine proceeds to check whether the start position has been recorded at step 3802—if not, then this is the first iteration of the distance leash routine, and the routine records the remote vehicle's current position as the starting position at step 3806 before returning to step 3801.

The distance leash routine then reckons the current position of the remote vehicle 10 at step 3803 based on localization or positional data supplied from appropriate remote vehicle sensors, calculates the remote vehicle's distance from the starting position at step 3804, and determines whether the remote vehicle 10 has traveled beyond the threshold distance at step 3805. If the remote vehicle's distance from the starting position is less than the distance threshold, the routine returns to step 3801. On the other hand, when the remote vehicle 10 reaches the threshold distance away from the starting position, the distance leash routine terminates the follow-street operation and returns the remote vehicle 10 back to the starting position by automatically activating a follow-waypoints operation using the coordinates of the starting position as the sole waypoint at step 3808.

Figure 21:
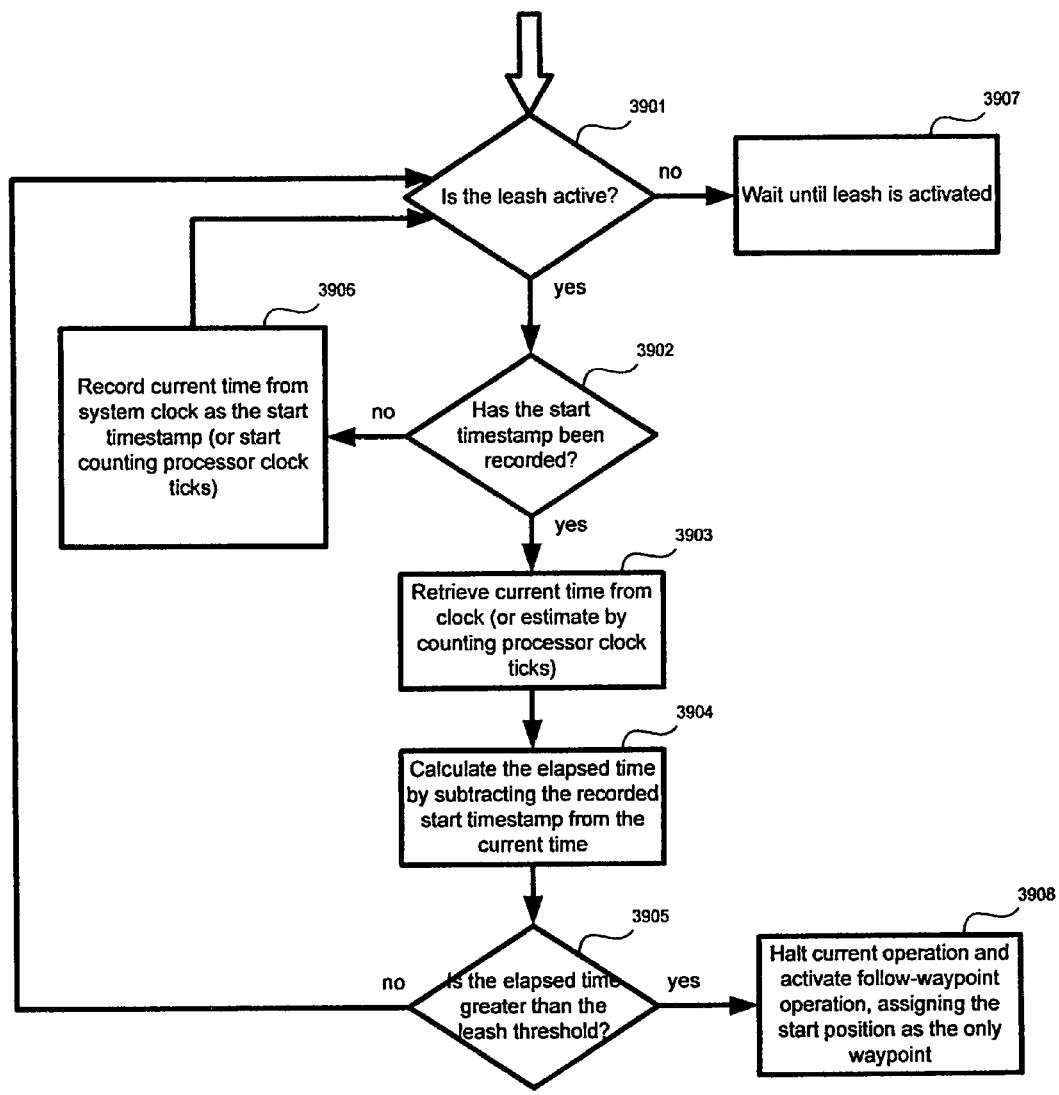
FIG. 21 is a flow chart illustrating an embodiment of a method for imposing a time "leash" constraint on a remote vehicle in accordance with the present invention.

Similarly, a time leash may be used that operates similarly to the distance leash, but which tracks the time elapsed since a starting time of the operation, instead of distance traversed by the remote vehicle 10. As illustrated in FIG. 21, each of steps 3901 through 3908 may be substantially similar to the corresponding steps exemplified in the distance leash method of FIG. 20, with timestamps being substituted for positional coordinates.

In an embodiment of the invention, the follow-street behavior uses the Hough transform to detect linear features in the range data (e.g., LIDAR). Each line hypothesis with at least a minimum number of points is then classified based on whether it is on the right or left side of the remote vehicle 10, in which $$\text{side}(L) = \begin{cases} \text{left} & \text{if } \theta_{left\,min} < \theta_L < \theta_{left\,max} \\ \text{right} & \text{if } \theta_{right\,min} < \theta_L < \theta_{right\,max} \\ \text{none} & \text{otherwise,} \end{cases}$$

where L is a line, side(L) is the side of line L, $\theta_L$, is the orientation of line L, $\theta_{left\,min}$ and $\theta_{left\,max}$ bracket the region of interest on the left side and $\theta_{right\,min}$ and $\theta_{right\,max}$ bracket the region of interest on the left side. Currently, $\theta_{left\,min}=0$, $\theta_{left\,max}=\theta_{right\,min}=\pi$, and $\theta_{right\,max}=2\pi$, so all lines except those orthogonal to the remote vehicle's current heading are classified as being on the left or right.

The line headings are used to update separate accumulator arrays for the left and right sides of the remote vehicle. As before, these accumulator arrays are used to filter out transient lines generated by the Hough transform and produce a more stable desired heading.

The value of the accumulator bins at time t is given by:

$$a_{left,i,t} = (1-\lambda)a_{left,i,t-1} + \lambda \sum_{\forall j: i\beta<\theta(H_j)<(i+1)\beta, side(H_j)=left} v(H_j)$$

$$a_{right,i,t} = (1-\lambda)a_{right,i,t-1} + \lambda \sum_{\forall j: i\beta<\theta(H_j)<(i+1)\beta, side(H_j)=right} v(H_j),$$

where $a_{left,i,t-1}$ is the left accumulator bin value at the previous timestep, $a_{right,i,t-1}$ is the right accumulator bin value at the previous timestep, k is the decay rate (between 0 and 1), H is the set of lines detected by the Hough transform, $H_j$ is the jth line from this set, $v(H_j)$ is the number of points voting for this line, $\theta(H_j)$ is the orientation of the line, and $\beta$ is the bin size. In an embodiment of the invention, these orientations are in world coordinates, not remote vehicle-relative coordinates, although any suitable alternative coordinate system may be utilized, such as compartmentalized regions, polar coordinates, or any other such coordinate scheme, for example.

The selected heading corresponding to the maximum bin in each accumulator is given by:

$$\theta_{left}=(i+0.5)\beta: \forall j: a_{left,i,t} \geq a_{left,j,t}$$

$$\theta_{right}=(i+0.5)\beta: \forall j: a_{right,i,t} \geq a_{right,j,t}$$

The behavior then computes the average of the left and right headings as defined by:

$$\theta_{desired} = \theta_{left} + \frac{\Delta(\theta_{left}, \theta_{right})}{2}$$

$$\Delta(\theta_{left}, \theta_{right}) = \begin{cases} \theta_{right} - \theta_{left} & \text{if } -\pi < \theta_{right} - \theta_{left} \leq \pi \\ \theta_{left} - \theta_{right} & \text{otherwise.} \end{cases}$$

The follow-street behavior then sends $\theta_{desired}$ as the desired heading to the obstacle detection/avoidance behavior. If the follow-street behavior is only able to detect strong lines (with at least a minimum number of points) on one side of the remote vehicle, it attempts to align itself with the strongest line. If the follow-street behavior is unable to detect any lines on either side of the remote vehicle, it sends a command to move straight forward. In all cases, the follow-street behavior attempts to drive the remote vehicle along the closest open direction to the desired heading, preferably while detecting and avoiding obstacles.

Follow-Perimeter Behavior

Figure 24:
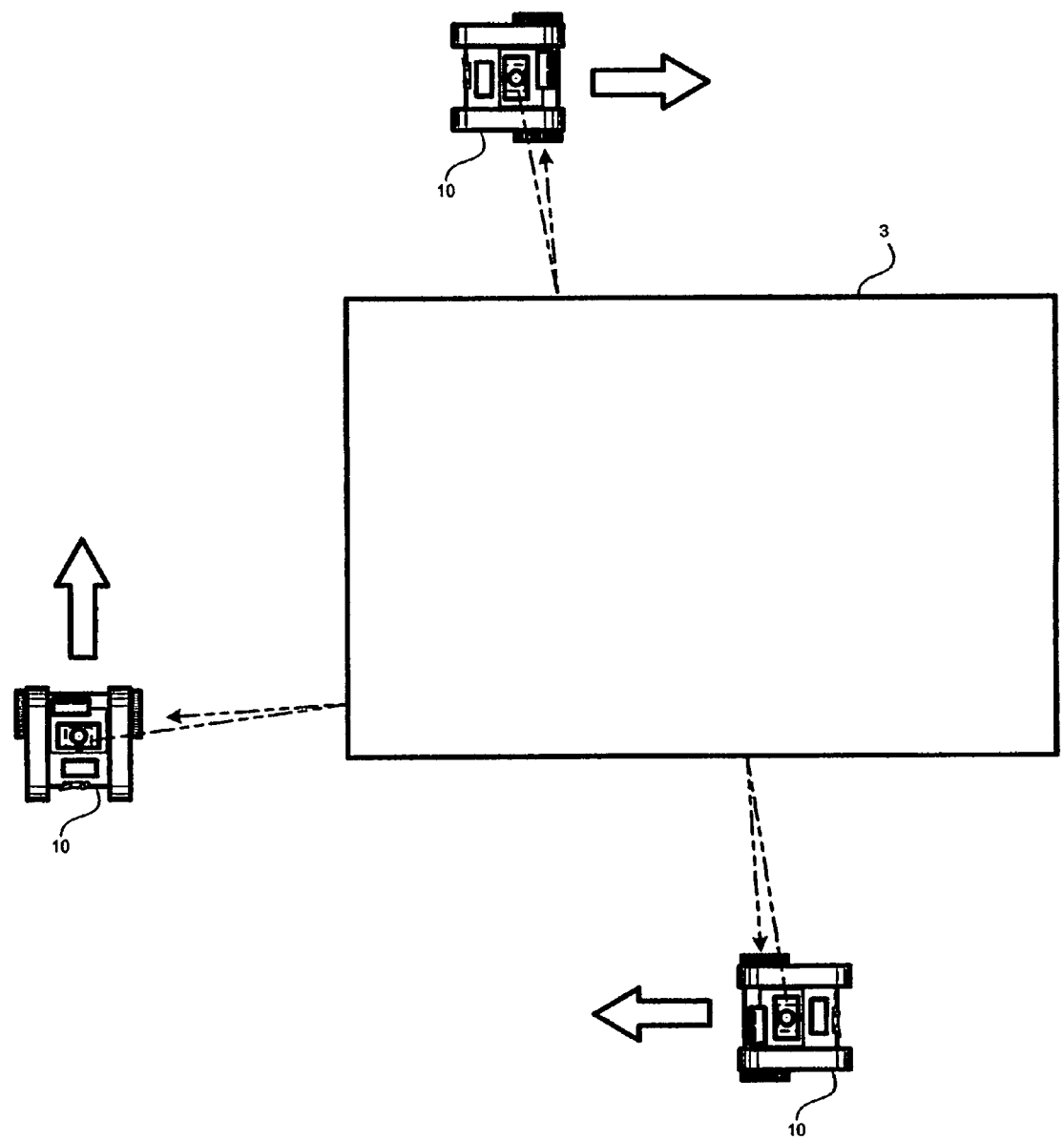
FIG. 24 illustrates a remote vehicle performing a follow-perimeter behavior in accordance with the present invention.

FIG. 24 illustrates a remote vehicle 10 performing a follow-perimeter operation around a rectangular building 3, the remote vehicle 10 being shown at three locations along the traversed path around the building 3. During a follow-perimeter operation, the remote vehicle uses Hough transform analysis of the range finder data (e.g., LIDAR) in a method similar to the follow-street behavior, but in a embodiment of the invention also employs a heading-voting method to smoothly and correctly navigate around corners, avoiding unstable turning behavior that could otherwise occur when the remote vehicle 10 encounters a sharp corner. Furthermore, the follow-perimeter behavior may record the coordinates of its starting position when a perimeter-following operation is initiated, and determine whether the remote vehicle 10 has completed a circuit around the navigation target by periodically comparing the current position of the remote vehicle 10 to the starting position.

Figure 25:
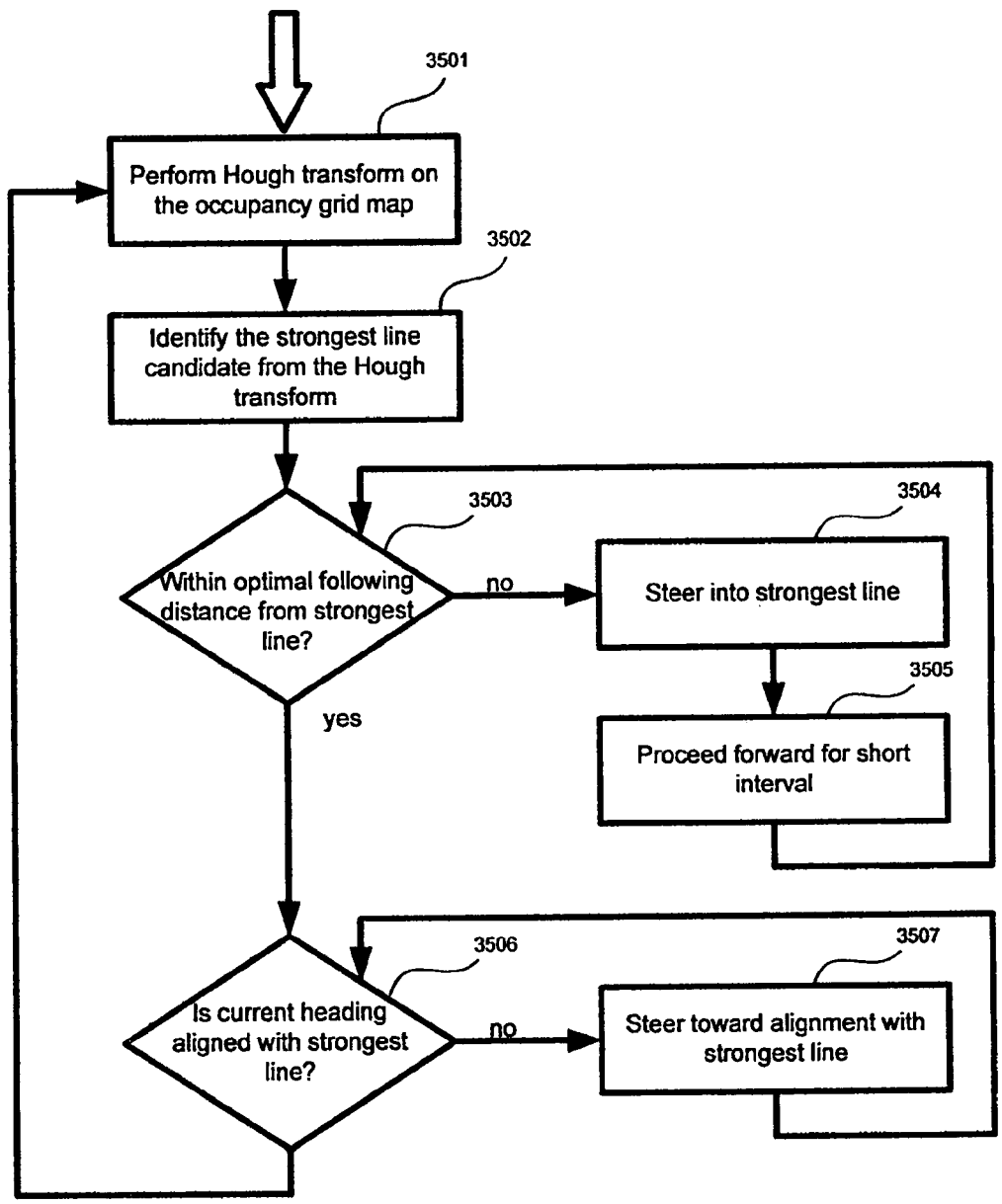
FIG. 25 illustrates an embodiment of a method for performing one aspect of the follow-perimeter behavior.

FIG. 25 illustrates a method for performing one aspect of a follow-perimeter routine, in which the remote vehicle 10 approaches the Hough strongest line until it reaches a specified distance, at which point the remote vehicle 10 proceeds in alignment with the Hough strongest line. At step 3501, the Hough transform is performed to identify the strongest line based on the data provided by the remote vehicle's range finder at step 3502. At step 3503, it is determined whether the current distance from the Hough strongest line is within an optimal following distance from the strongest line; if not, the routine steers toward the Hough strongest line at step 3504, proceeds forward for a distance at step 3505, and then loops back to step 3501. Otherwise, at step 3506, the routine determines whether the remote vehicle's current heading is aligned with the Hough strongest line. If so, the routine returns to step 3501. If not, the routine steers the remote vehicle toward alignment with the Hough strongest line at step 3507 before looping back to step 3506.

Figure 26:
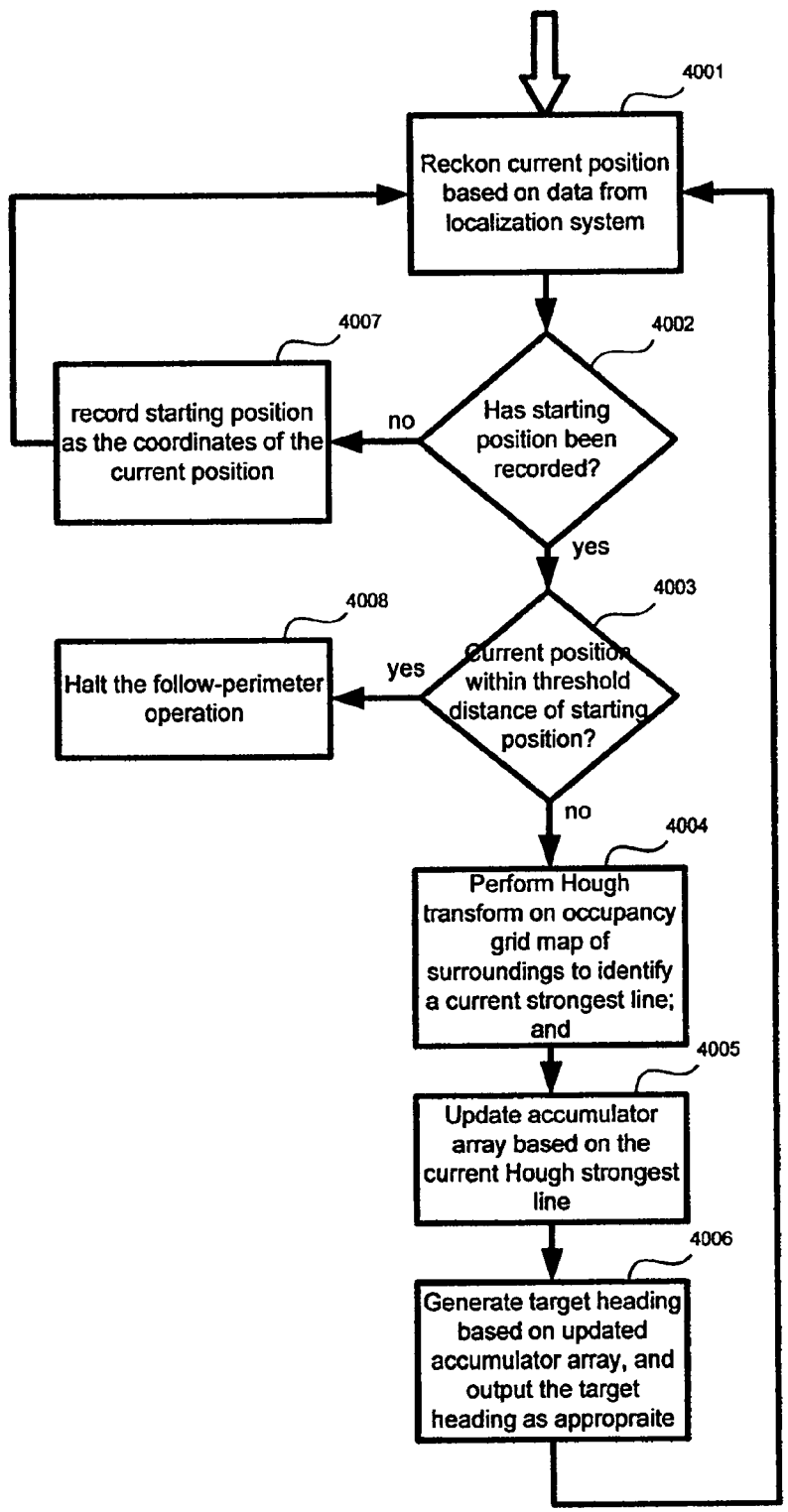
FIG. 26 illustrates an embodiment of a method for performing additional aspects of the follow-perimeter behavior.

Also, with regard to additional aspects of the follow-perimeter behavior,

FIG. 26 illustrates a method in which the follow-perimeter behavior reckons the remote vehicle's current position at step 4001, and determines whether a starting position has already been recorded at step 4002. If not, step 4007 records the coordinates of the remote vehicle's current position as the starting position, and loops back to step 4001. Otherwise, step 4003 checks whether the current position is within the threshold distance of the starting position; and, if so, halts the follow-perimeter behavior at step 4008, determining that the remote vehicle has completed a circuit around the perimeter of the navigation target.

If, in the embodiment of FIG. 26, the result of step 4003 is the follow-perimeter behavior then performs a Hough transform on the occupancy grid map at step 4004 to ascertain a strongest line to follow, and updates the accumulator array with the current Hough strongest line at step 4005. Then, step 4006 outputs a target heading based on the updated accumulator array before returning to step 4001.

In an embodiment of the invention, to ensure smooth following around the perimeter of a navigation target, the follow-perimeter behavior generates and continuously updates an accumulator array of target headings over time, wherein at each iteration of the routine, the effect of older target headings to the accumulator array decays until they no longer affect the currently generated target heading. Nonetheless, the hysteresis effect of more recent previous headings on the accumulator array dampen any sudden shifts in the current target heading relative to the immediately previous target heading, so that unstable steering caused by oscillation is avoided even when the remote vehicle 10 encounters a sharp corner along the perimeter being traversed.

As an example, the follow-perimeter behavior may select one of 72 bins, each corresponding to 5 degrees, among the full possible range of 360 degrees of orientation. The value of an accumulator bin $a_i$ at time t is then given by:

$$a_{i,t} = (1-\lambda)a_{i,t-1} + \lambda \Sigma_{\forall j: i\beta < \theta(H_j) < (i+1)\beta} v(H_j)$$

in which $a_{i,t-1}$ is the accumulator bin value at the previous timestep, $\lambda$ is the decay rate (between 0 and 1), H is the set of lines detected by the Hough transform, $H_j$ is the jth line from this set, $v(H_j)$ is the number of points voting for this line, $\theta(H_j)$ is the orientation of the line, and $\beta$ is the bin size, and in which the coordinates are all provided as global coordinates. By continuously updating the accumulator bins using an algorithm based on this equation, steering and perimeter tracking is improved, while steering oscillation is reduced.

In an embodiment of the invention, the follow-perimeter behavior generates a desired heading based on the relative orientation and desired range to the tracked wall. For example, for left wall following:

$$\theta = \theta_w + k(r_w - r_d) \text{ if } k(r_w - r_d) < \frac{\pi}{4},$$

$$\theta = \theta_w + \frac{\pi}{4} \text{ if } k(r_w - r_d) \geq \frac{\pi}{4}.$$

For right wall following:

$$\theta = \theta_w - k(r_w - r_d) \text{ if } k(r_w - r_d) < \frac{\pi}{4},$$

$$\theta = \theta_w - \frac{\pi}{4} \text{ if } k(r_w - r_d) \geq \frac{\pi}{4},$$

where $\theta$ is the behavior's desired heading in radians (relative to the remote vehicle's current heading), $\theta_w$ is the orientation of the wall in radians (relative to the remote vehicle's current heading), $r_w$ is the range to the wall in meters, $r_d$ is the desired range to the wall in meters, and k is a constant (for example, $\pi/8$).

In an embodiment of the invention, the desired heading is passed to the obstacle detection/avoidance behavior. The obstacle detection/avoidance behavior then selects an obstacle-free heading that is closest to the desired heading output by follow-perimeter behavior. This allows the remote vehicle 10 to reactively steer around obstacles that are located next to walls (in its path), and then resume wall-following automatically when the obstacle is no longer present.

Follow-Waypoints Behavior

Figure 27:
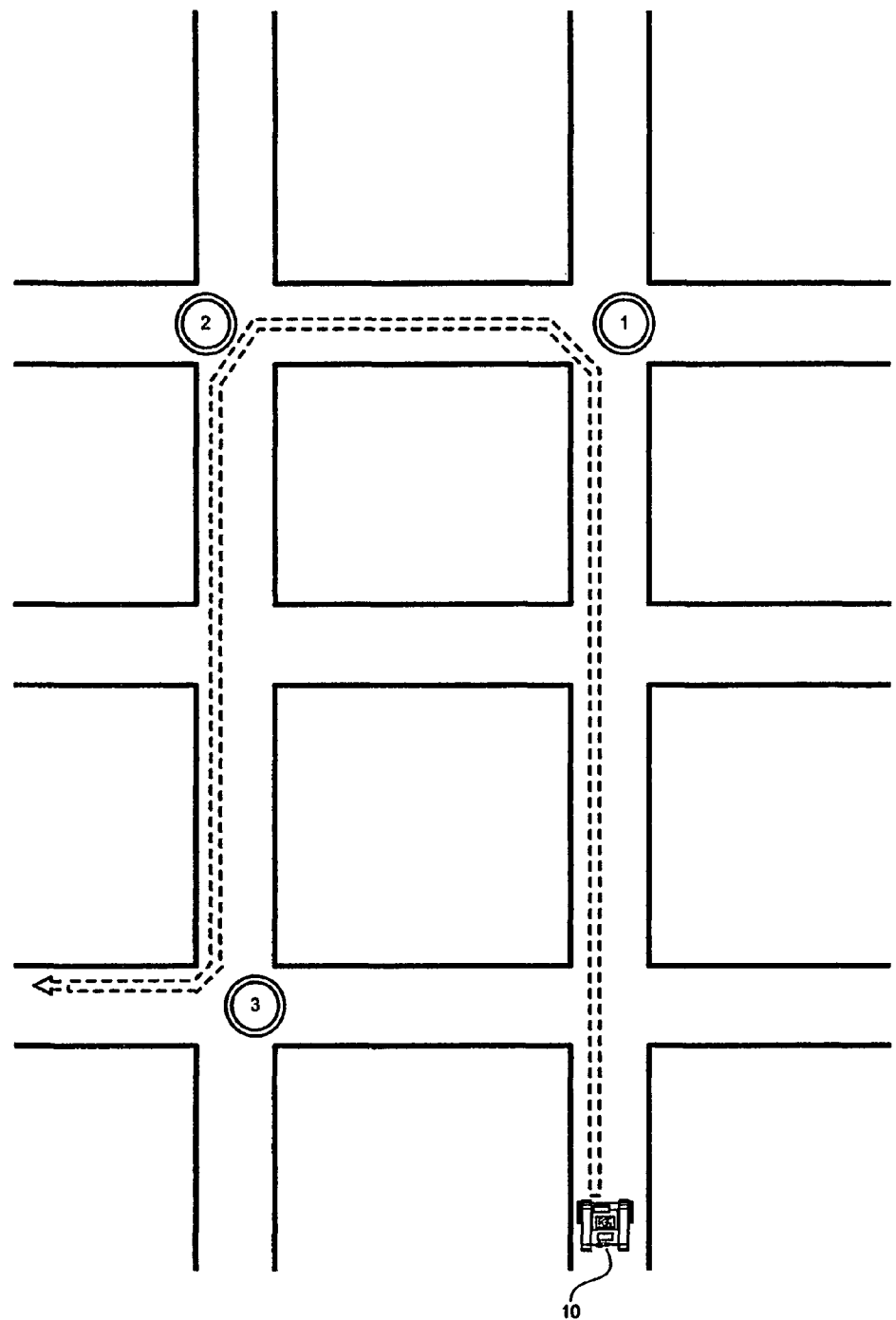
FIG. 27 illustrates a network of streets and intersections being traversed by a remote vehicle performing a follow-waypoints operation.

FIG. 27 illustrates a network of streets and intersections being traversed by a mobile robot 10 performing a follow-waypoints operation. Three waypoints 1, 2 and 3 are located at three different street intersections, and the path the remote vehicle will traverse to reach each waypoint in succession is shown by the double dotted arrow.

Figure 28:
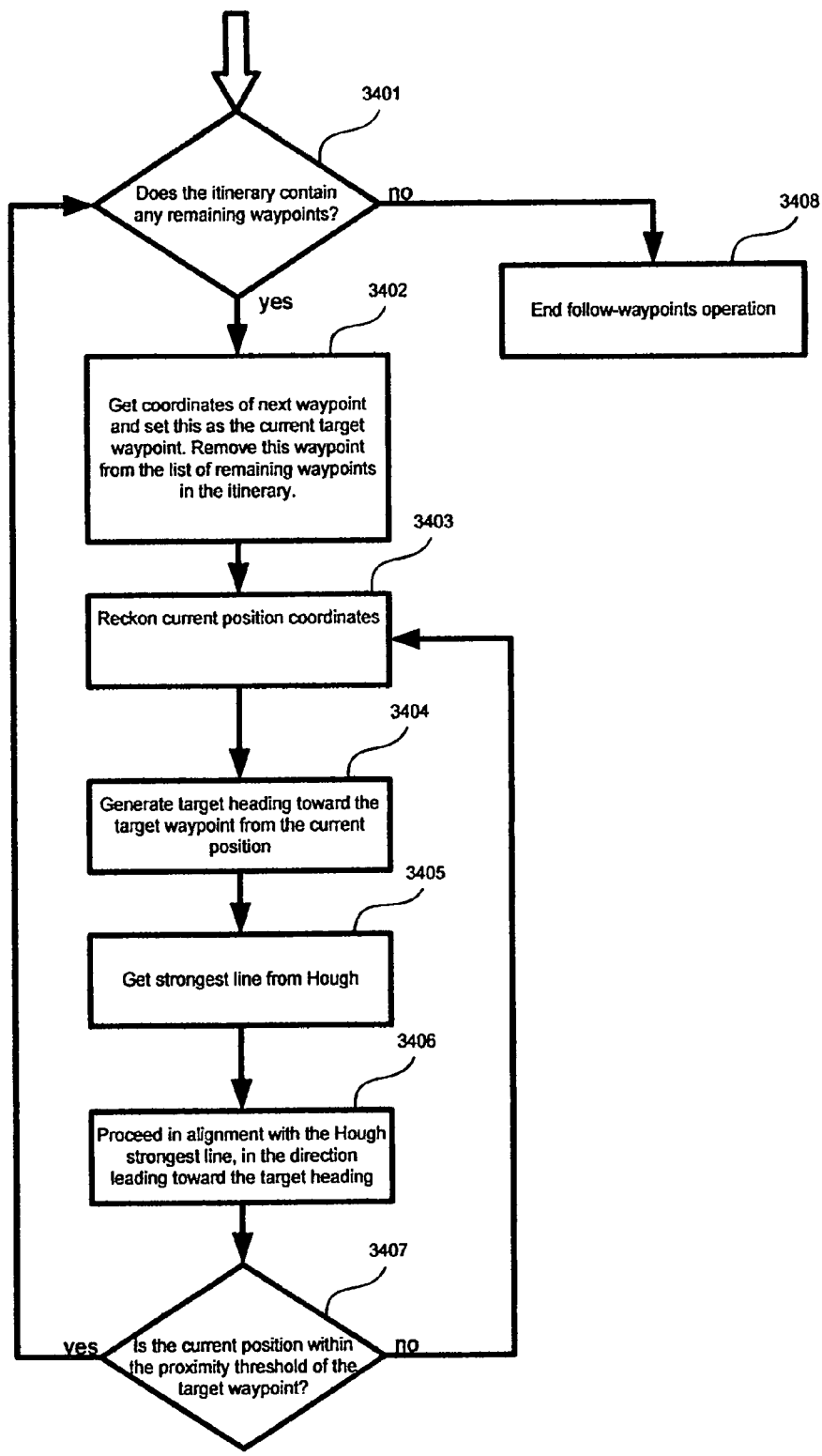
FIG. 28 illustrates an embodiment of a method for performing a follow-waypoints behavior.

Further, FIG. 28 illustrates an exemplary method for performing a follow-waypoints navigation routine, in which one or more waypoints defining an itinerary are supplied to the routine (e.g., by the operator via an OCU). In the illustrated example, data representing the coordinates of each waypoint along the itinerary are stored sequentially in an array or other suitable data structure in a memory of the remote vehicle's primary processor 140, such as a queue or linked list, which the follow-waypoints routine can then access. As the waypoints are each retrieved from memory and processed by the follow-waypoints routine in the appropriate order, they are removed from the set of remaining waypoints one by one until the remote vehicle reaches the final waypoint in the itinerary, at which time the remote vehicle halts the follow-waypoints operation or, for example, returns to its origin.

When navigating toward each waypoint, the remote vehicle 10 may identify linear features in its environment, such as streets or buildings, and follow them toward the waypoint. In a embodiment of the invention, the remote vehicle 10 may consider a waypoint as "reached" when the remote vehicle 10 moves within a threshold distance (e.g., a radius of ten meters around the precise coordinates of the waypoint) of the waypoint, improving operational efficiency and minimizing the possible effects of mapping or localization errors.

In the embodiment of FIG. 28, when an iteration of the routine is executed, step 3401 initially checks whether any waypoints remain to be processed and, if not, the routine has achieved its purpose (there being no further waypoints left to process) and the follow-waypoints operation halts at step 3408. Otherwise, the coordinates of the next remaining waypoint are retrieved, removed from the set of remaining waypoints, and used as the current target waypoint at step 3402. Step 3403 determines the coordinates of the current position of the remote vehicle 10 based on data from the localization system, and step 3404 correspondingly generates a target heading toward the target waypoint from the current position of the remote vehicle 10 (using, e.g., the path planning behavior described above). At step 3405 a Hough transform is performed on the data from the range finder to identify a strongest line to be used as a path to follow toward the target waypoint at step 3406. Step 3407 determines whether the distance from the remote vehicle 10 to the target waypoint is less than the threshold distance. If so, the current target waypoint is considered "achieved" and the routine loops back to step 3401. If not, the routine instead loops back to step 3403 to continue seeking the current target waypoint.

Mapping Behavior

In an embodiment of the invention, while the remote vehicle 10 navigates through terrain in order to perform reconnaissance, the mapping behavior automatically runs concurrently with other behaviors to generate and transmit a map of the traversed terrain.

Figure 29:
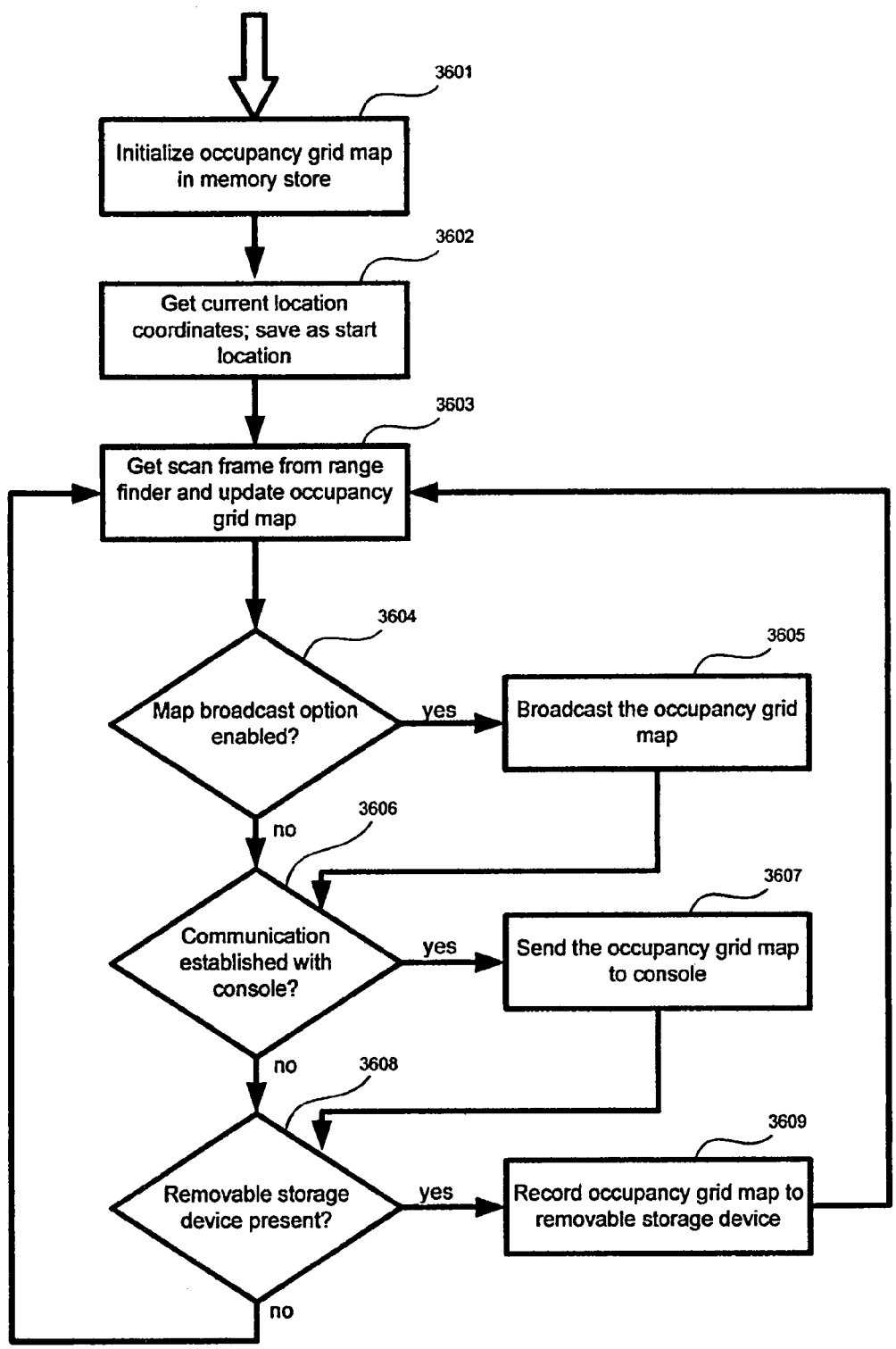
FIG. 29 illustrates an embodiment of a mapping method for causing a remote vehicle to generate and transmit maps of terrain in accordance with the present invention.

FIG. 29 illustrates a mapping method for controlling the remote vehicle 10 to generate and transmit maps of terrain the remote vehicle 10 passes through based on data from sensors including, for example, a range finder. At step 3601, an occupancy grid map is initialized and established in the memory of the remote vehicle's primary processor 140. At step 3602, the remote vehicle's current location is ascertained. At step 3603 a frame of range finder data is used to update the occupancy grid map.

At step 3604, the mapping routine determines whether the map should be transmitted in a broadcast manner. If so, step 3605 broadcasts the map data to the OCU 21 and proceeds to step 3606, which determines whether communication with the OCU is currently possible via any method (e.g., by a secure wireless link or a USB cable connection). If communication is possible, step 3607 sends the map to the OCU before proceeding to step 3608. At step 3608 the routine determines whether a detachable storage medium is accessible. If so, the routine records the map to the storage medium at step 3609 before returning to step 3603.

The above-listed autonomous navigation behaviors, other than the follow-waypoints behavior, do not necessarily rely on an estimate of the remote vehicle's absolute position to navigate through their environments. Rather, the reactive follow-perimeter behavior may operate directly from the Hough transform estimates of the position of nearby walls relative to the remote vehicle, without the use of any absolute position information. However, more accurate localization information can be obtained and used to build more accurate maps of the environment.

Obstacle Detection/Avoidance and SVFH

Various obstacles may be encountered lying along the path of the remote vehicle 10 as it operates autonomously (or as it is teleoperated). In an embodiment of the invention, the remote vehicle 10 includes an obstacle detection and avoidance behavior for identifying and avoiding obstacles. As noted above, in accordance with an embodiment of the invention, the remote vehicle 10 includes a 3D stereo vision system 125 employing binocular cameras and machine vision methods for generating a depth map that is used together with the data from a range-finder 121 to detect obstacles. A depth map can also be produced by a 3D camera (e.g., a SwissRanger) and an additional camera. Obstacles detected from 3D stereo vision data can be converted into a range/bearing scan format for use in obstacle avoidance. The present invention also contemplates using another suitable range-detecting system, such as an optical, sonar, electrostatic or magnetic sensor, for example. The remote vehicle 10 may employ a scaled vector field histogram (SVFH) technique to integrate the obstacle data from the stereo vision system 125 and range-finder 121, to identify clear headings and blocked paths, and to select an appropriate heading for steering the remote vehicle 10 around obstacles and toward the desired navigation target.

According to one embodiment of the invention, the target heading generated by one or more navigation behaviors (e.g., follow-street or follow-perimeter) is first passed to the SVFH obstacle avoidance behavior, which may modify the target heading in response to an obstacle detected along the target heading.

In a standard VFH analysis, an occupancy grid is created in which each "square" or "cell" of the grid is filled with a probability that an obstacle exists at that point, and a polar histogram of the obstacle locations is created relative to the remote vehicle's current location. Individual occupancy cells are mapped to a corresponding wedge or "sector" of space in the polar histogram. Each sector corresponds to a histogram bin, and the value for each bin is equally to the sum of all the occupancy grid cell values within the sector.

The polar histogram bin values are mapped to their bearings relative to the remote vehicle's heading. A bin value threshold is used to determine whether the bearing corresponding to a specific bin is open or blocked. If the bin value is under the threshold, the corresponding direction is considered clear. If the bin value meets or exceeds the threshold, the corresponding direction is considered blocked. Once the VFH has determined which headings are open and which are blocked, the remote vehicle chooses a heading closest to its desired heading toward its target/waypoint and moves in that direction.

FIGS. 37-40 illustrate an embodiment of a remote vehicle 10 navigating through a hallway using SVFH analysis. The remote vehicle 10 is facing a direction indicated by the arrow in FIG. 37. The walls 401 and a closed door 402 on either side of the remote vehicle are detected by the remote vehicle's range finder 121 and show up as a distinctive pattern of SVFH blocked-path bins 1641 (see FIG. 40) extending toward the blocked directions, while SVFH clear-path bins 1640 (see FIG. 38) extend toward the obstacle-free path directions.

Once the VFH has determined which headings (bins) are open and which are blocked, the remote vehicle 10 picks an open heading closest to its desired heading toward its target/waypoint and moves in that direction.

SVFH extends the VFH analysis such that the occupancy values are spread across neighboring bins. That is, because an obstacle that may be easily avoided at long range may require more drastic avoidance maneuvers at short range, the bin values of the SVFH technique are updated to reflect this increased importance.

The extent of the spread is given by:

$$\theta = k/r,$$

where k is the spread factor (0.4 in the current SVFH), r is the range reading, and θ is the spread angle in radians. For example: if k=0.4 and r=1 meter, then the spread angle is 0.4 radians (23 degrees). So a range reading at 1 meter for a bearing of 45 degrees will increment the bins from 45−23=22 degrees to 45+23=68 degrees. For a range reading of 0.5 degrees, the spread angle would be 0.8 radians (46 degrees), so a range reading at 0.5 meters will increment the bins from 45−46=−1 degrees to 45+46=91 degrees. In this way, SVFH analysis causes the remote vehicle to turn more sharply to avoid nearby obstacles than to avoid more distant obstacles.

In an embodiment of the invention, the SVFH analysis includes an algorithm that may be implemented on a remote vehicle using 360° range data from the range finder 121. The range finder preferably provides a 360° range scan with 2 degree resolution at 5 Hz, for example. The range values from each scan are used to compute a new SVFH. The range finder may provide range data out to, for example, 12 meters, but truncated range values (for example, out to 2 meters instead of the available 12 meters) may be used to compute the SVFH, in order to reduce complexity and computational requirements.

Figure 41:
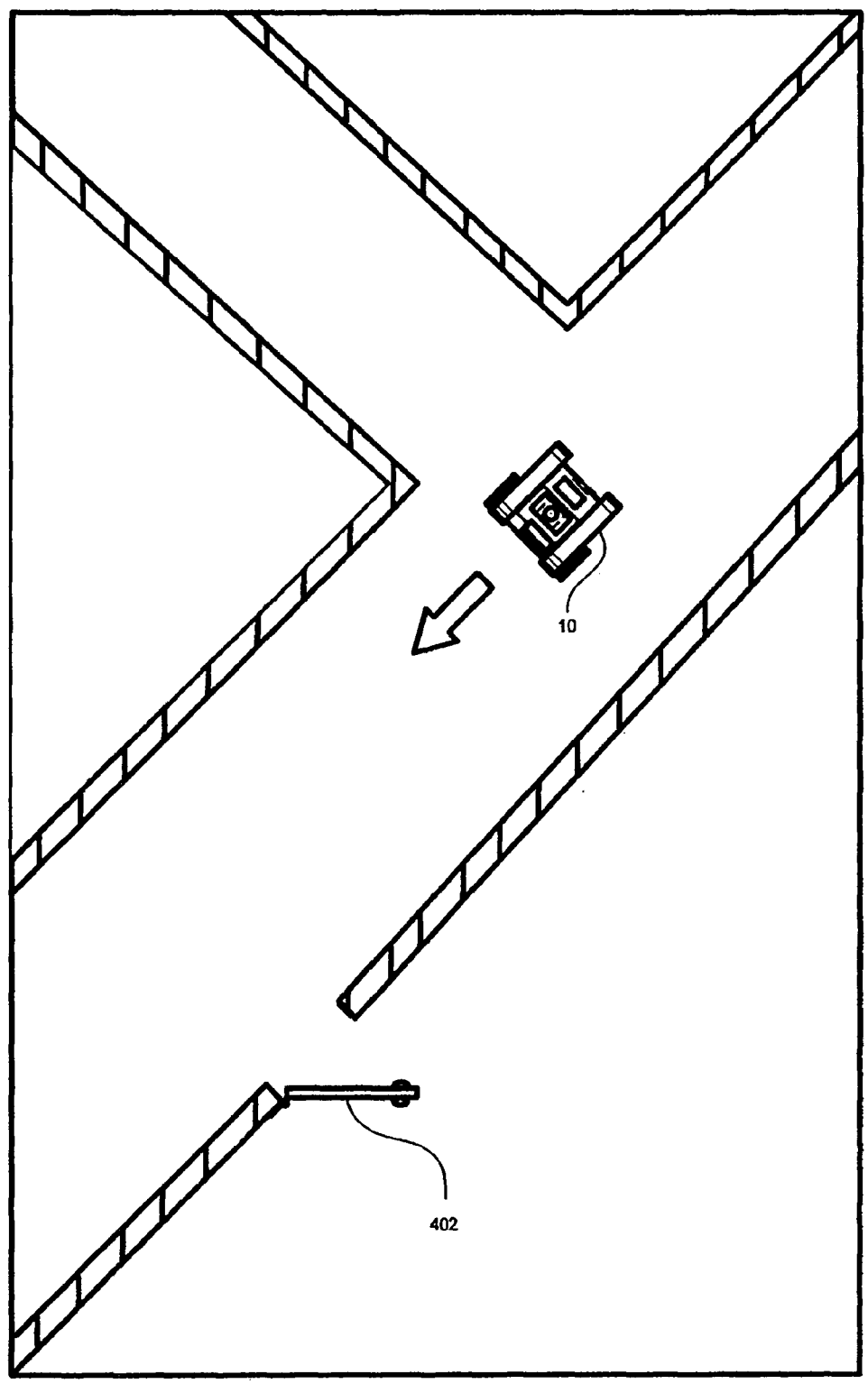
FIG. 41 illustrates a remote vehicle positioned at an intersection of two hallways.
Figure 42:
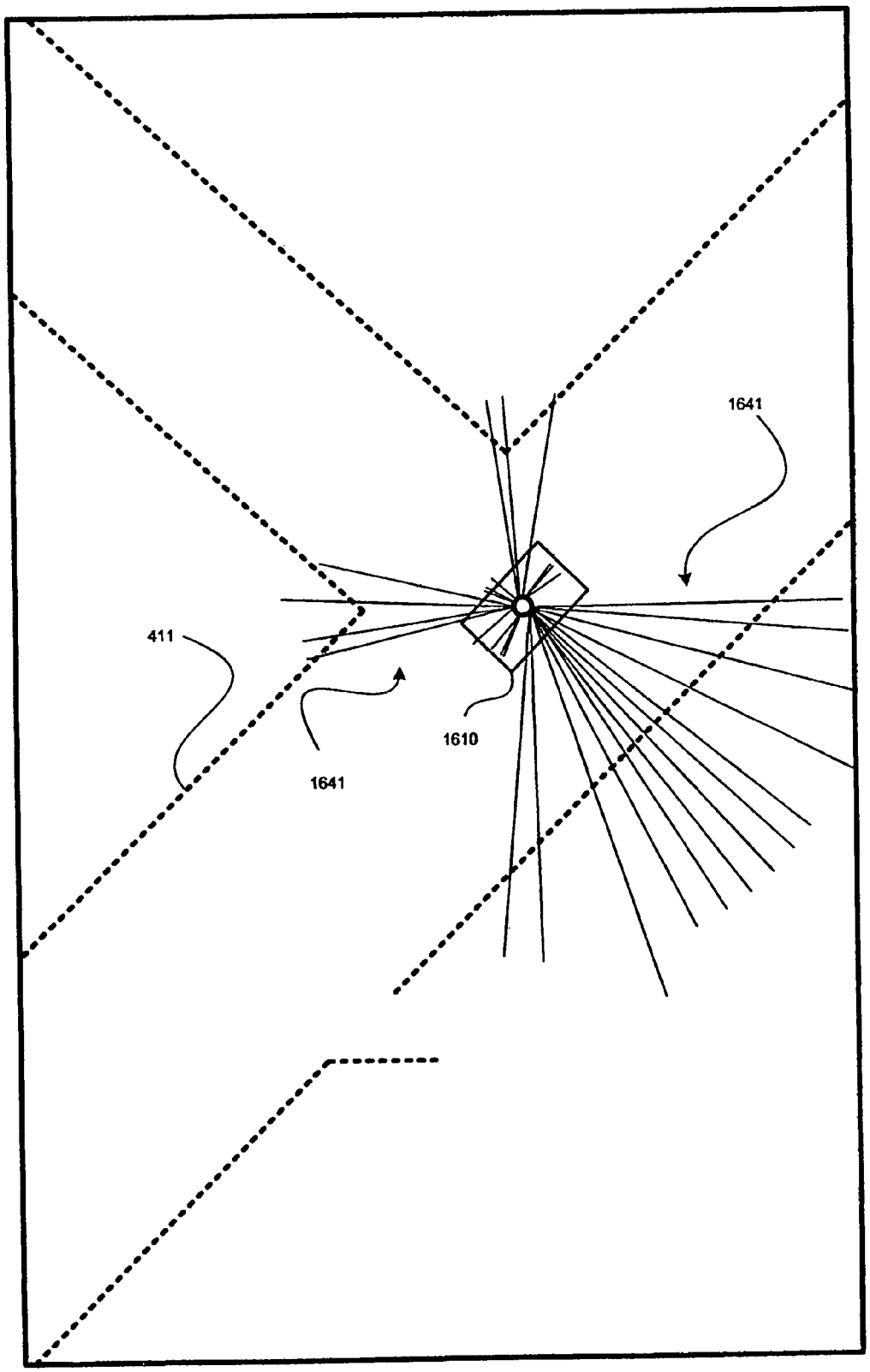
FIG. 42 illustrates an example of SVFH blocked-path bins when the remote vehicle arrives at the hallway intersection of FIG. 41.

FIG. 41 illustrates a remote vehicle 10 positioned at an intersection of two hallways, and FIG. 42 shows example of SVFH blocked-path bins when the remote vehicle arrives at the hallway intersection, as may be shown on an OCU 21 in accordance with an embodiment of the invention. Vectors 1641, representing SVFH blocked-path bin values, have lengths proportional to the value of the bin associated with the corresponding direction. Long vectors correspond to a large number of nearby range readings within the bin sector. Short vectors correspond to a small number of range readings near the limit of the range window (2 meters). If no vector 1641 is present in a given direction, this means that no obstacles are within the range window in that direction.

Figure 43:
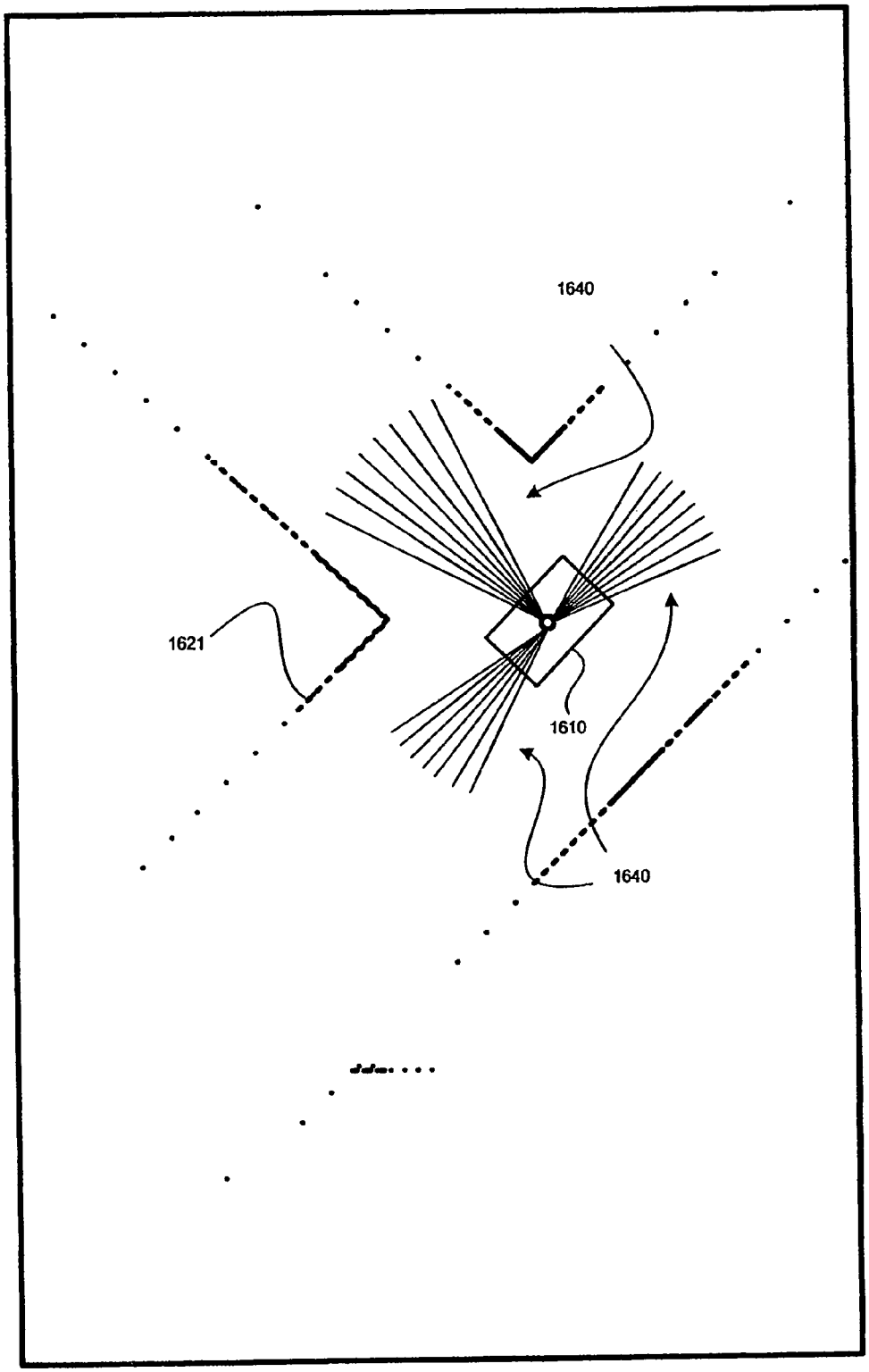
FIG. 43 illustrates clear directions at the intersection of FIG. 41 using SVFH clear-path bin vectors.

FIG. 43 illustrates the corresponding clear directions at the intersection. SVFH clear-path bin vectors 1640 point toward clear directions. If no vector 1640 is present in a given direction, this means that this direction is blocked. The SVFH detects all four of the open passages meeting at the intersection. Wider passages allow a wider range of orientations for the remote vehicle, while narrower passages allow a more limited range of orientations.

In an embodiment of the invention, the range finder and the stereo vision system are mounted on the remote vehicle such that they detect obstacles that the remote vehicle 10 is not able of climbing. Lower obstacles such as curbs, which the remote vehicle can climb, are preferably excluded from the range of these sensors so that they are not included in the obstacle avoidance map. Thus, the remote vehicle 10 can proceed over climbable obstacles and avoid insurmountable obstacles, while conserving computational and/or memory resources because of the reduced amount of sensor information that must be processed by the obstacle avoidance behavior.

In an embodiment of the invention, a sonar sensor is utilized for detecting obstacles such as glass and/or narrow metal wires, which are not readily detected by other sensory devices. A combination of a range finder, stereo vision, and sonar, for example, may provide the capability to detect virtually all of the obstacles a remote vehicle 10 might encounter in an urban environment.

Enhanced Obstacle Detection/Avoidance

Obstacle detection and avoidance can be enhanced using UWB sensors, which provide enhanced solid-object detection in poor weather and foliage. An embodiment of the invention provides such enhance obstacle detection.

In an embodiment of the invention, polarimetric (dual polarization) radar is used to distinguish foliage from solid objects. For certain types of foliage, such as tall grass, open fields, and crop fields, mot of the vegetation (e.g., stalks and blades) are substantially vertically oriented. These types of foliage provide strong radar returns for vertically-polarized radar pulses and weak radar returns for horizontally-polarized radar pulses. In contrast, objects such as rocks will tend to reflect radar roughly equally regardless of pulse orientation. By computing the differential reflectivity of the target object, the remote vehicle can distinguish vertically-oriented vegetation from other solid (non-passable) objects. Differential reflectivity can be defined with the equation:

$$Z_{DR} = 10 \log\left(\frac{P_h}{P_v}\right)$$

Where $Z_{DR}$ is the differential reflectivity in dB, $P_h$ is the returned backscattered power received from the horizontally-polarized radar pulse, and $P_v$ is the returned backscattered power received from the vertically-polarized radar pulse.

A positive value for $Z_{DR}$ indicates that the objects reflecting the radar pulse are horizontally-aligned, while a negative value for $Z_{DR}$ indicates that the objects reflecting the radar pulse are vertically-aligned. A value of $Z_{DR}$ near zero indicates that the reflecting objects have horizontal and vertical axes that are roughly equal.

In a case where foliage may be so dense that it registers as a solid object, such foliage may not be passable by the remote vehicle.

Figure 30A:
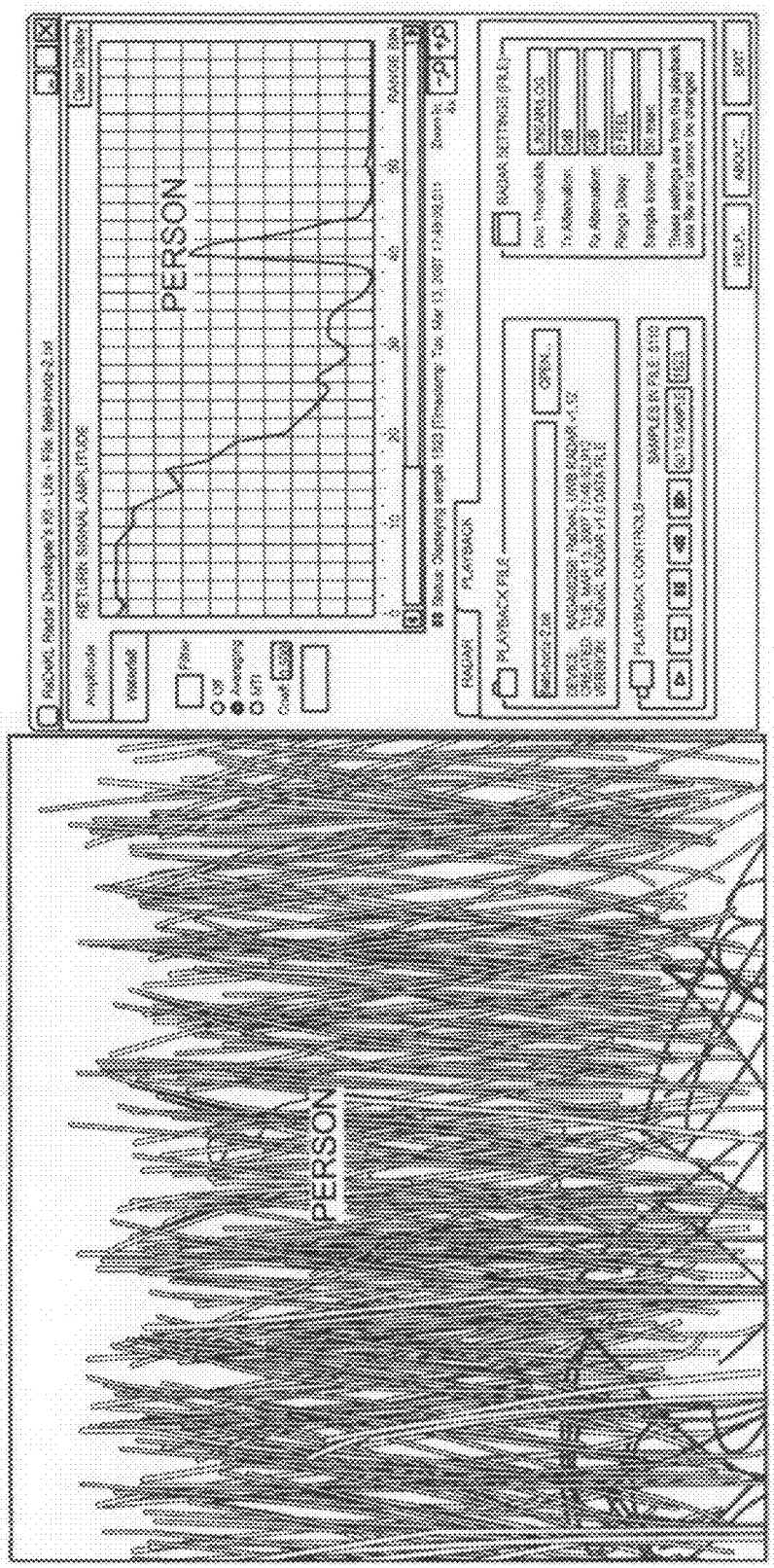
FIGS. 30A and 30B illustrate the ability of a remote vehicle equipped with ultra wide band (UWB) sensors and an enhanced obstacle detection behavior to detect a solid object in a tall grass (passable foliage)
Figure 30B:
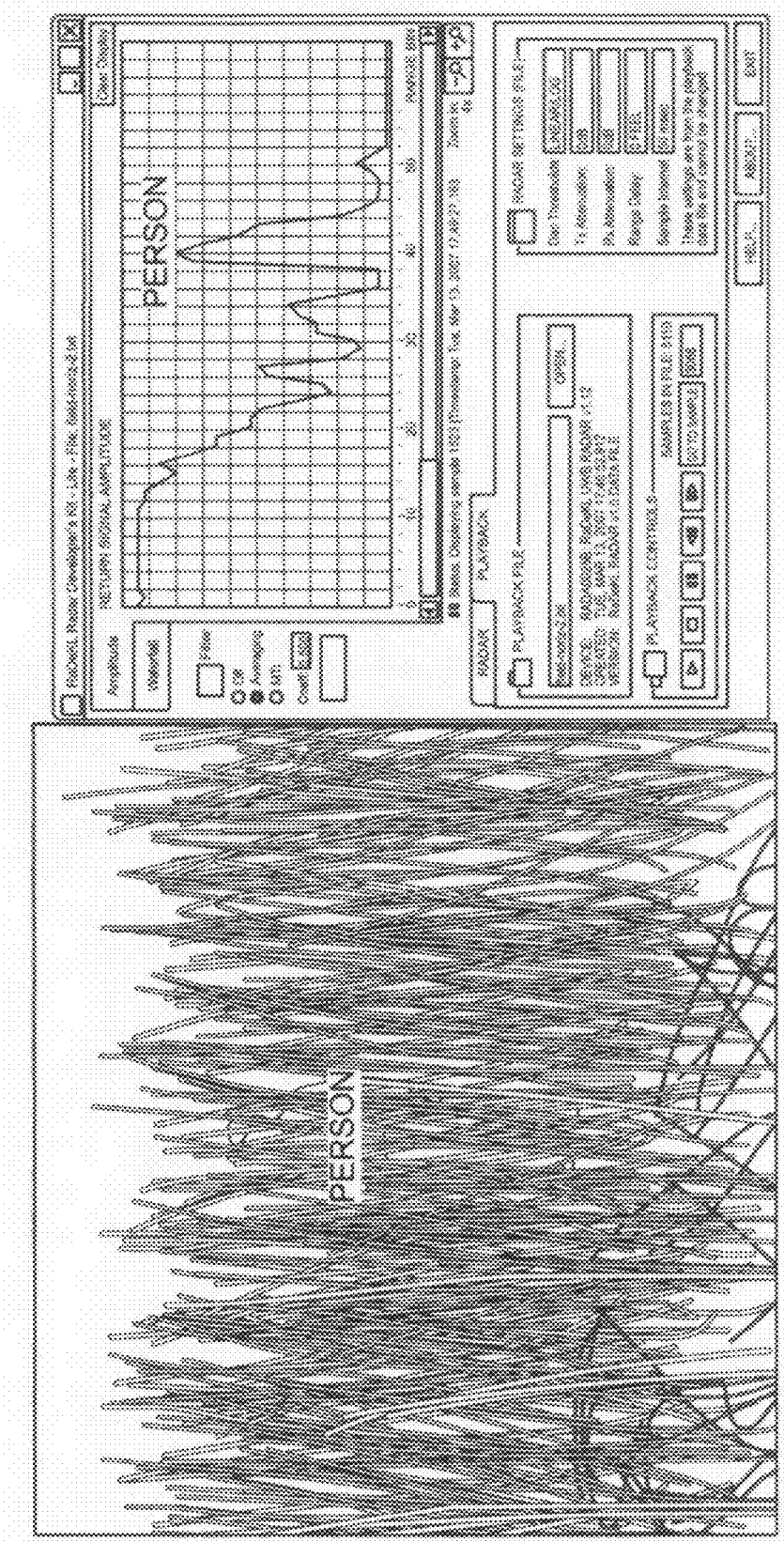

FIGS. 30A and 30B illustrate the ability of a remote vehicle equipped with UWB sensors and an enhanced obstacle detection behavior to detect a person (solid, impassable object) in a tall grass (passable foliage) using the embodiment described above. In FIG. 30A, on the left, a person is shown standing in a field of tall grass. Some of the grass is taller than the person. The person illustrated is standing approximately 40 feet from the remote vehicle. The picture view is from human eye level whereas the sensors are located approximately one foot above the ground. On the right, the radar return from UWB radar is plotted, and an amplitude peak corresponding to the person at a 40-foot range is clearly visible in the plot.

In FIG. 30B, on the left, a person is shown kneeling in the same field of tall grass. More of the grass is therefore taller than the person. The person is again approximately 40 feet from the remote vehicle, and the picture view is from human eye level whereas the sensors are located approximately one foot above the ground. On the right, the radar return from UWB radar shows a well-defined amplitude peak corresponding to the kneeling person at a 40-foot range.

Figure 31:
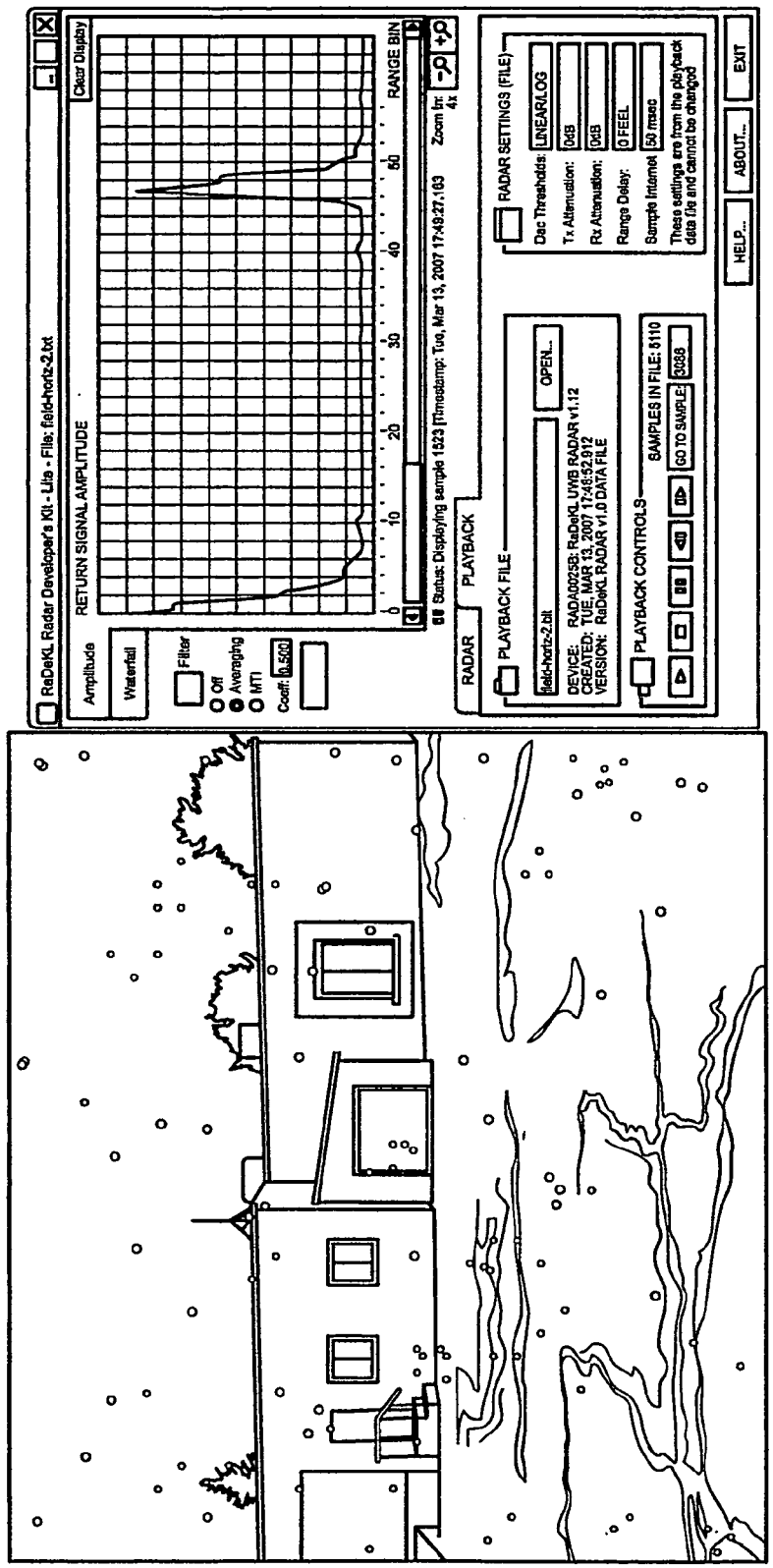
FIG. 31 illustrates the ability of a remote vehicle equipped with UWB sensors to detect a building during a moderately heavy snow storm.

FIG. 31 illustrates the ability of a remote vehicle equipped with UWB sensors to detect a building during a moderately heavy snow storm. On the left, a building is shown in the snow storm at a distance of approximately 90 feet from the remote vehicle. The snow fall is moderately heavy. The picture view is from human eye level whereas the sensors are located approximately one foot above the ground. On the right, the radar return from UWB radar is plotted and an amplitude peak corresponding to the building at a 90-foot range is clearly visible in the plot. Indeed, the snowfall appears to have little or no effect on the radar return.

Figure 32:
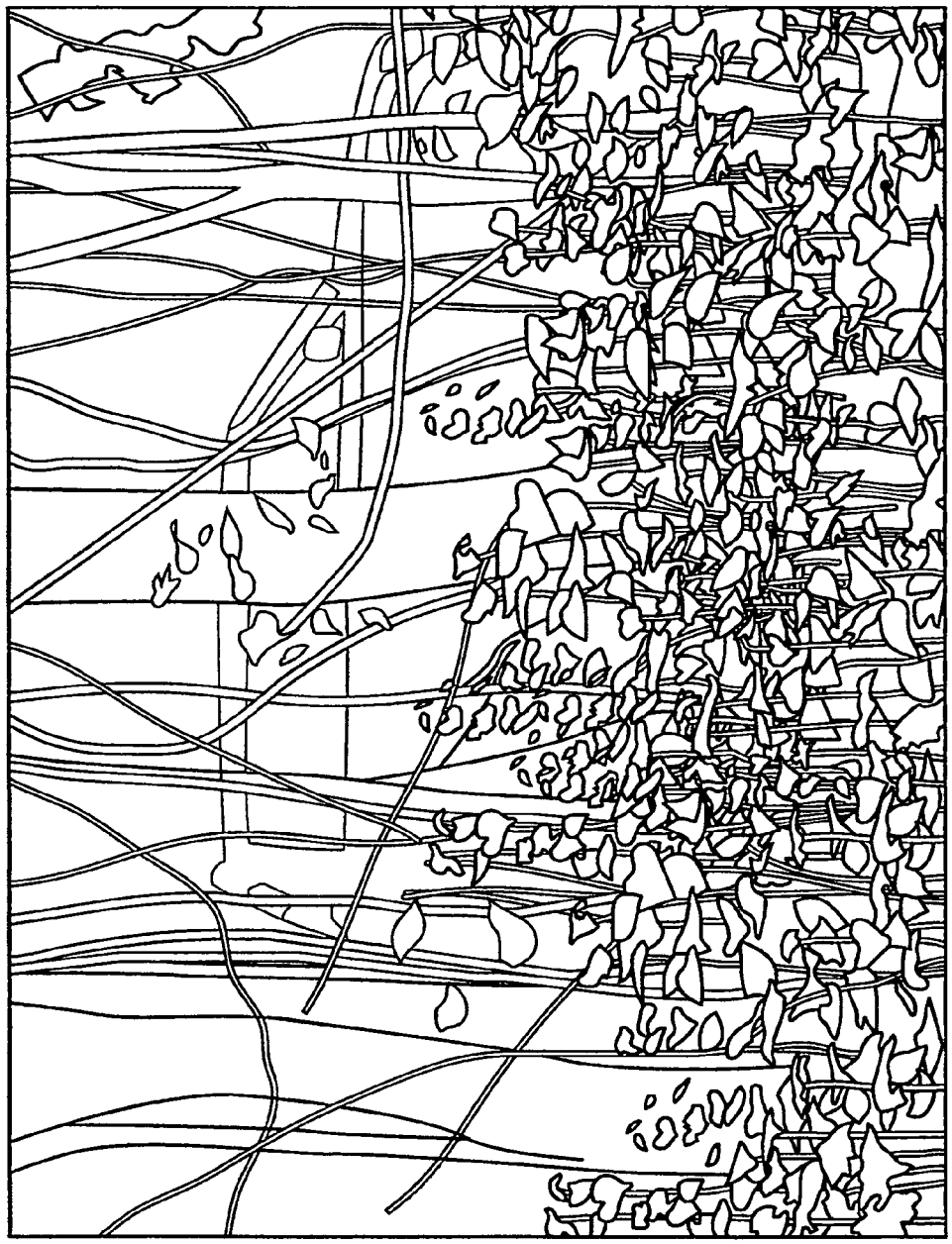
FIG. 32 illustrates an SUV within foliage having some degree of horizontal orientation.

The depth of accurate detection decreases in foliage having some degree of horizontal orientation, as well as in foliage that is wet. For example, in a test conducted in foliage having some degree of horizontal orientation as illustrated in FIG. 32, an SUV was detected at 10 feet from the remote vehicle but not at 60 feet from the remote vehicle.

A similar analysis can be use for seeing through poor weather, based on know characteristics of rain and hail. Large raindrops tend to fall in an oblate configuration, wider along the horizontal axis than the vertical. In contrast, hailstones are approximately spherical, with similar horizontal and vertical axis lengths. As a result, large raindrops tend to have a large positive $Z_{DR}$ while hailstones tend to have a near-zero $Z_{DR}$.

In an embodiment of the invention, UWB sensor output is with output from the range finding system (e.g., SICK LIDAR). For foliage that is not vertically-oriented, such as certain bushes or underbrush, vegetation is distinguished from solid objects using a density metric from the range finding system output. The range finding system provides sparse returns from vegetation and dense returns from solid objects. A sparse return from the range finding system in a direction indicates that the objects detected in that direction are likely to be vegetation and therefore passable for the remote vehicle.

In an embodiment of the invention, the UWB sensors have a separate processor (e.g., a Pentium M processor) running the sensor drivers and interfacing with the remote vehicle's primary processor and/or the remote vehicle's sensory processor when available. The present invention alternatively contemplates utilizing the primary processor and/or the sensory processor of the remote vehicle for processing for the UWB sensor output. The need for a separate operating system (e.g., Windows as opposed to Linux) for the UWB sensors may dictate use of a separate processor. In an embodiment of the invention, the UWB processor configures the UWB sensors, receives range data from the sensors, and transmits the UWB sensor output data to the sensory processor and/or the primary processor.

The UWB sensor data is integrated with other data, such as data from the range finding system (e.g., SICK LIDAR). In an embodiment of the invention, an occupancy grid representation is used for integration, combining multiple readings from multiple sensors at multiple locations into a single grid-based representation where the value of each cell represents the probability that the corresponding location in space is occupied.

In an embodiment of the invention, two occupancy grids are created. One grid is for solid objects and the other grid is for foliage. The value of each cell in the solid-object grid will represent the probability that the corresponding location is occupied by a solid object. The value of each cell in the foliage grid will represent the probability that the corresponding location is occupied by foliage.

Occupancy grids rely on statistical sensor models (e.g., based on Bayesian probability) to update the corresponding cell probabilities for each sensor reading. For example, since LIDAR is very precise, a single LIDAR reading would increase the probability of the corresponding target cell to near 100% while reducing the probability of the cells between the sensor and the target to nearly 0%. In contrast, sonar readings tend to be very imprecise, so a single sonar reading would increase the probability for all cells along the arc of the sonar cone, while reducing the probability for all cells within the cone—but not with the high confidence of a LIDAR sensor model.

Bayesian sensor models for the polarimetric radar array indicate how to increase or decrease the occupancy probabilities for cells within the radar field-of-view based on the particular range readings received. Bayesian reasoning can be employed to resolve conflicts created when high-dimensional mapping problems are decomposed into binary estimation problems that are solved independently of one another for creation of the occupancy grid map. The solid-object radar model specifies how to update cell probabilities in the solid-object grid based on radar returns. The foliage radar model specifies how to update cell probabilities in the foliage grid based on radar returns. By accumulating multiple readings over time, occupancy grids can produce high-resolution maps, even from low-resolution sonar data. In an embodiment of the invention, the occupancy grids can produce high-accuracy maps from low-resolution radar data, while combining this data with high-resolution LIDAR data.

In an embodiment of the invention utilizing a LIDAR sensor model, density-based metrics are used to differentiate foliage from solid objects, as set forth in Macedo, et al., "Ladar-Based Discrimination of Grass from Obstacles for Autonomous Navigation," in *Proceedings of ISER '00 (Seventh International Symposium on Experimental Robotics)*, Honolulu, Hi., 2000, the entire contents of which is incorporated herein by reference. Regions with a low density of LIDAR returns are treated as foliage, and regions with a high density of LIDAR returns are treated as solid objects. This allows the remote vehicle to navigate robustly through foliage while avoiding solid obstacles such as rocks, tree trunks, etc.

Automatic Flipper Deployment

Figure 33A:
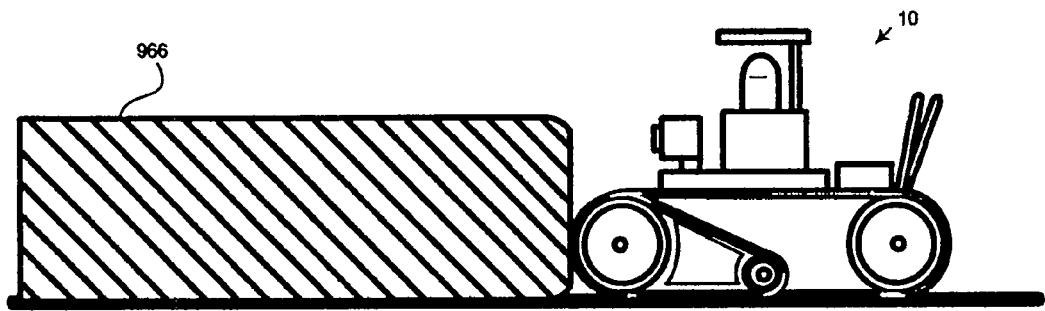
FIGS. 33A-C illustrate a remote vehicle climbing over an obstacles using an embodiment of an automatic flipper deployment behavior.

A remote vehicle 10 may encounter obstacles that are not detected, for example because they are below the plane of the range finder 121 and difficult to detect using the vision system 125 (black asphalt curbs, for example). To assist the remote vehicle in climbing over such obstacles, an automatic flipper deployment behavior may be utilized. In an embodiment of the invention, the remote vehicle 10 (see FIGS. 1-4, 5A and 5B) includes a pair of treaded flippers 115 positioned adjacent the main treads 110 of the remote vehicle's drive system. The treaded flippers 115 can assist the remote vehicle in surmounting low-lying obstacles. The current supplied to drive motors (not shown in FIGS. 1-4, 5A and 5B) propelling the treads 110 are monitored by an ammeter, which reports the drive motor current to the remote vehicle's primary processor 140 (see FIG. 7). When the remote vehicle 10 encounters an obstacle 966 such as a sidewalk curb that prevents forward movement (as illustrated in FIG. 33A), the drive motor current will rise as the drive motors attempt to drive the treads 110 although the remote vehicle 10 cannot proceed because of the obstacle.

Figure 33B:
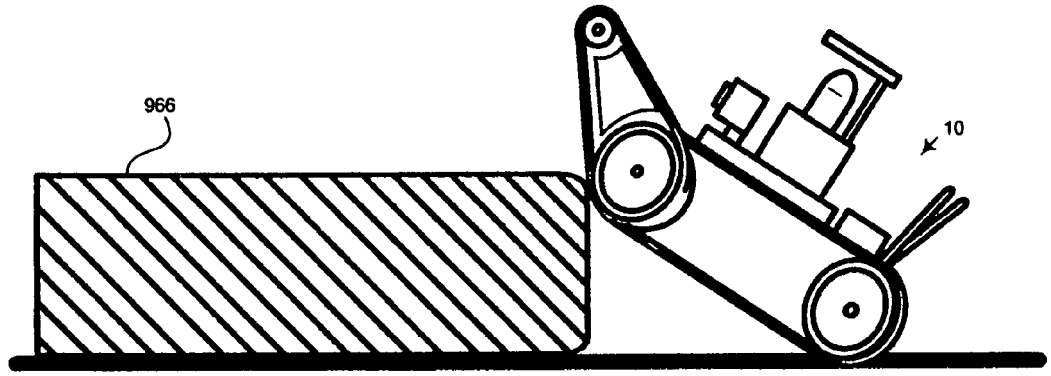
Figure 33C:
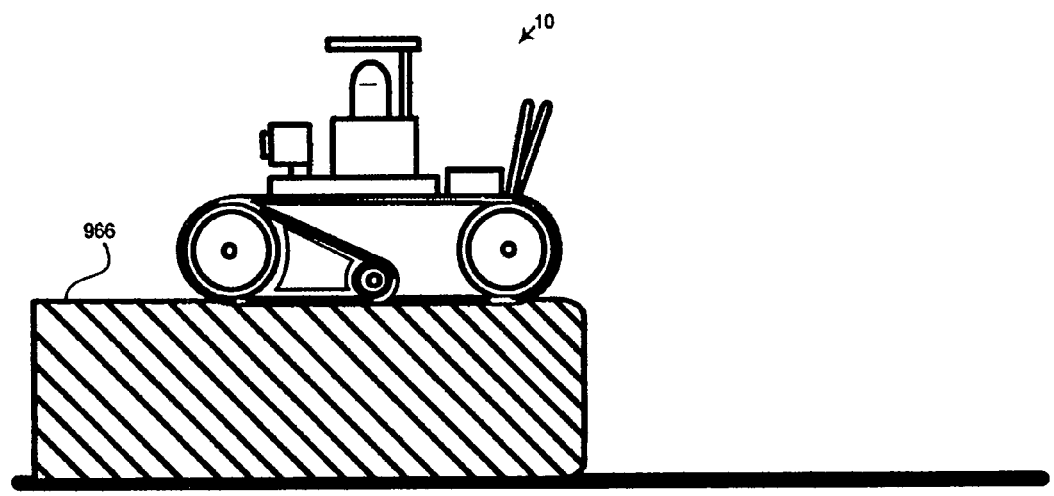

The flippers 115 may be automatically deployed (see FIG. 33B) by a stasis detection behavior (explained in more detail below) running concurrently on the remote vehicle's primary processor 140, which monitors the drive motor current and drives a flipper motor to engage the flippers 115 when the drive current exceeds a particular threshold (e.g., 15 amps). Once the flippers 115 have lifted the treads 110 above the curb, the remote vehicle 10 can proceed over the obstacle (see FIG. 33C). In an embodiment of the invention, the flippers remain deployed for a minimum period of time (such as, for example, 10 to 15 seconds). When the drive motor currents drop below a second, lower threshold (e.g., 2 amps), the flippers are retracted back to their home position.

Cul-De-Sac/Stasis Detection and Avoidance

A remote vehicle 10 may become trapped in cul-de-sacs or other dead-end paths, for example by following a wall into a cul-de-sac or dead end, turning around and starting to emerge, but ending up following the same wall back into the cul-de-sac or dead end.

To prevent this, an embodiment of the invention provides a stasis detection and avoidance behavior that remembers recent locations of the remote vehicle and prevents the remote vehicle from getting trapped in a loop. The behavior maintains a trace of the remote vehicle's recent positions and treats each point in the trace as an obstacle, which may then be passed to the SVFH obstacle avoidance system (which regards the traced path as any other obstacle). The remote vehicle steers away from its recent path toward unexplored space.

If a remote vehicle is navigating down a long and narrow cul-de-sac, for example, the cul-de-sac/statis detection behavior could prevent the remote vehicle from initially turning around. In such a case, the remote vehicle can wait until the path history memory has expired (in an embodiment of the invention where the path-history memory is implemented as a continuously rolling, finite-capacity memory in which previously recorded memories are removed from the memory after a period of time has passed and as newer memories are recorded). When the remote vehicle emerges, the cul-de-sac/statis detection and avoidance behavior would prevent it from going back into the cul-de-sac.

It is also possible for a remote vehicle 10 operating in a cluttered environment to get stuck on a low obstacle adjacent the rear treads 110, for example when the remote vehicle 10 attempts to turn and abuts an obstacle that was: (1) too low to be detected by the remote vehicle's ranger finder and vision systems; and (2) too high for the tracks 110 to simply slide over during the remote vehicle's rotation. Remote vehicles may become stuck based on other problems as well. The cul-de-sac/statis detection and avoidance behavior detects when a remote vehicle is stuck and attempts random (or, e.g., semi-random or pre-programmed) motions until the remote vehicle becomes unstuck.

In an embodiment of the invention, the cul-de-sac/statis detection and avoidance behavior maintains a stasis level variable that is increased whenever the cul-de-sac/statis detection and avoidance behavior system is sending a translation or rotation command and the remote vehicle's treads are not moving (as determined, e.g., by odometry). Conversely, the stasis level is reduced when the remote vehicle is moving. When the stasis level exceeds a threshold, an escape action is triggered. The escape action may command the remote vehicle to move at a random speed (for example, −0.25 to +0.25 msec) and a random rotation (for example, −1.0 to +1.0 radians/sec).

Alternatively, for example, the behavior may command the remote vehicle to move such that its speed (or direction of rotation of the wheels, treads, or other drive system) and/or steering may be caused to alternate in a rhythmic pattern, such as in a manner similar to "rocking" a quagrnired automobile out of a snowy parking spot or mud pit (in which the driver rhythmically alternates the automobile transmission from forward to reverse and back). In such an embodiment, the remote vehicle may take advantage of self-reinforcing oscillation such that each successive cycle "rocks" the remote vehicle further and further out of its stuck position. Sensors and/or analysis routines may be employed to detect whether a certain rhythm or motion pattern is producing self-reinforcing oscillation, for example, and may alter the cul-de-sac/statis detection and avoidance behavior to another method if no progress is detected after a particular number of attempts.

If the remote vehicle 10 starts moving, the stasis level begins to fall. If the statis level falls below a threshold, the escape action is terminated and control is returned to the remote vehicle's previously-running behavior(s). If the remote vehicle does not start moving after a specified period of time (e.g., 2 seconds), another random escape action is generated and new translation and rotation commands are sent to the robot. The cul-de-sac/statis detection and avoidance behavior may repeat this process until the remote vehicle starts moving. According to an embodiment of the invention, if the remote vehicle remains stuck for a predetermined period of time, the operator is notified.

Hardware/Software Organization

For one or more autonomous behaviors to function properly alone and in combination with other autonomous behaviors during operation of a remote vehicle, data flow among system components must be facilitated and the control software must have a suitable defined organization.

Figure 34:
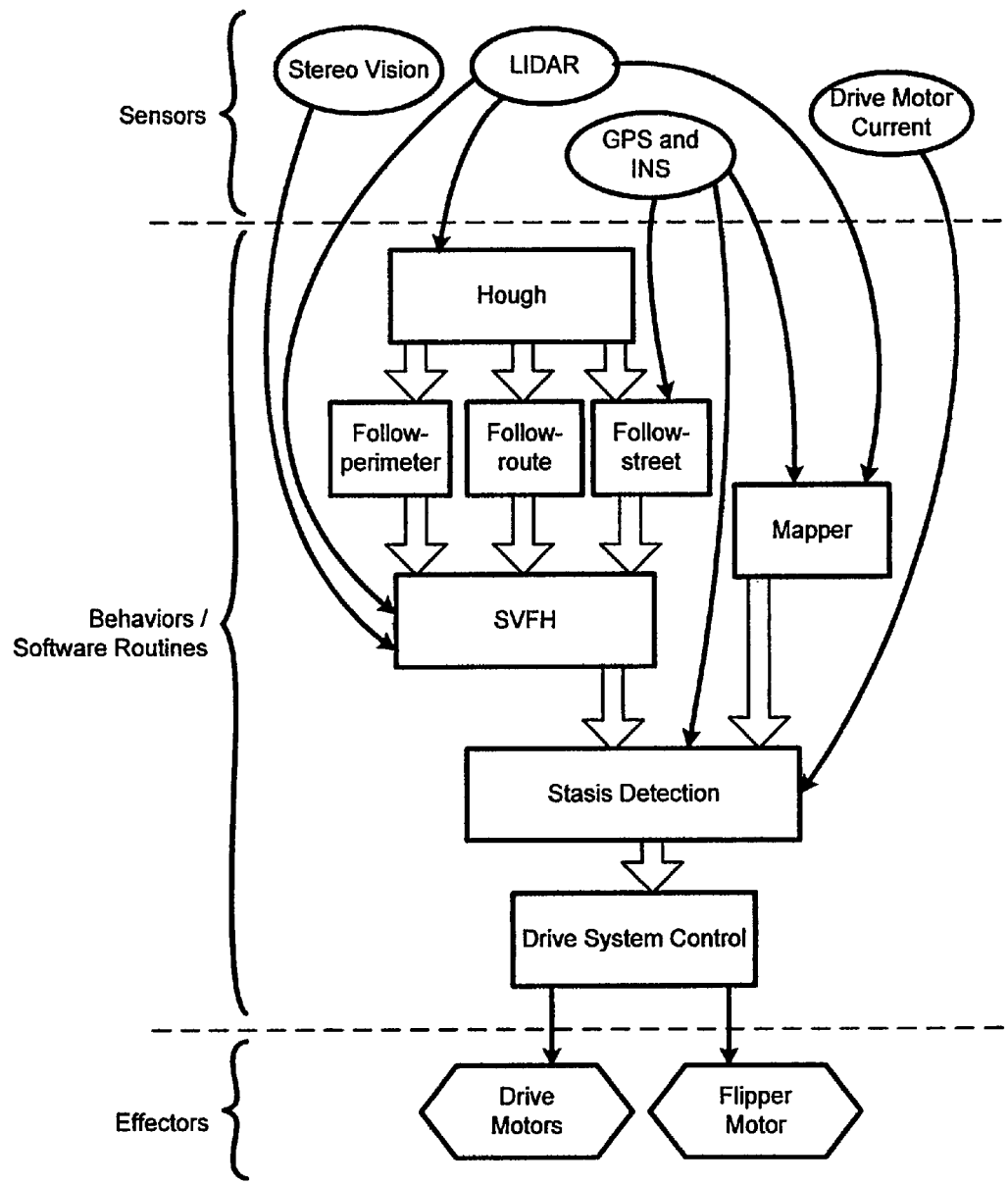
FIG. 34 illustrates an embodiment of data flow among system components segregated into functional groups.

FIG. 34 illustrates an embodiment of data flow among system components segregated into functional groups. At the top of FIG. 34, the sensors of the remote vehicle 10, such as the stereo vision, range finder, GPS and/or INS systems supply information to behaviors and routines executing on the remote vehicle's primary processor 140. The drive motor current sensor, which may include an ammeter on the remote vehicle's chassis 101, supplies appropriate information to the stasis detector so that the stasis detector routine can deploy the flippers automatically when the drive motor current indicates collision with an obstacle.

Figure 35:
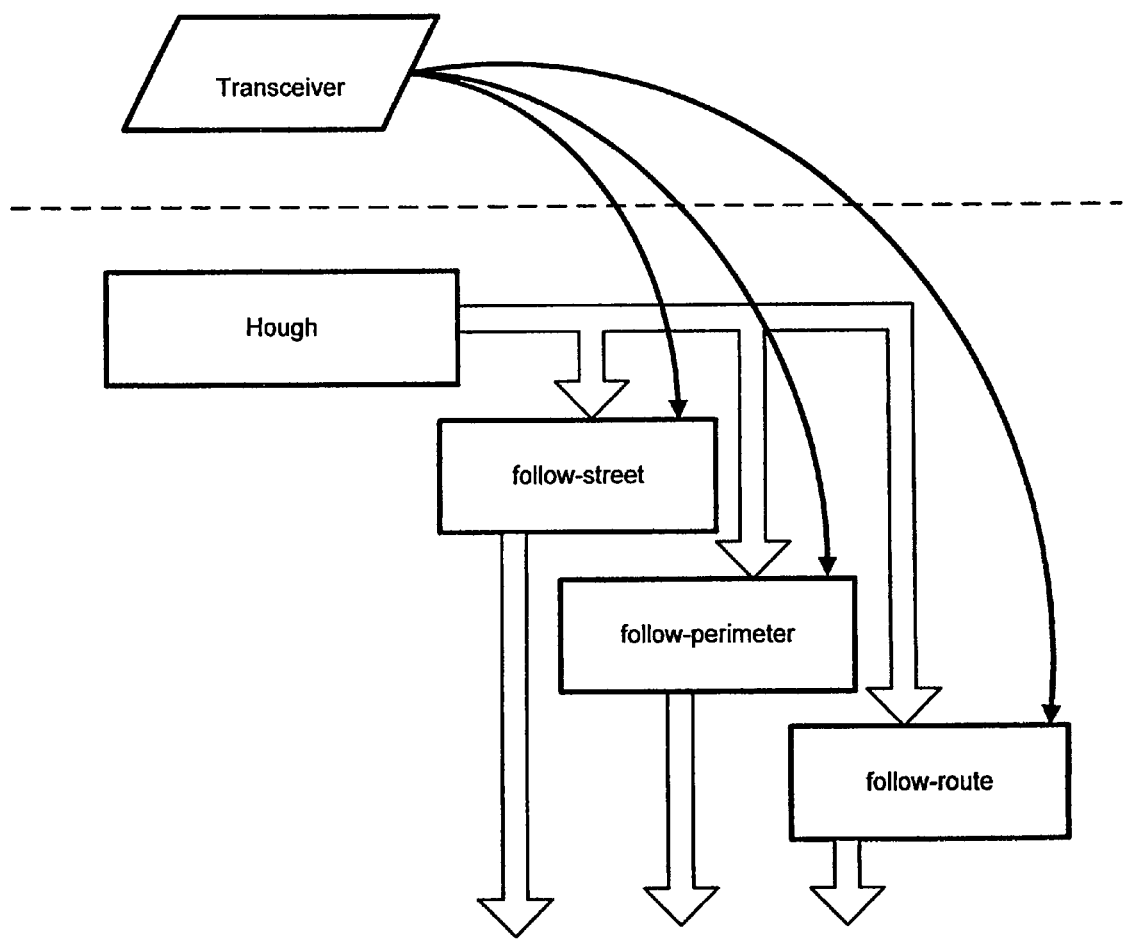
FIG. 35 illustrates an embodiment of information flow between a Hough transform routine and three exemplary mission behaviors.

FIG. 35 illustrates an embodiment of information flow between a Hough transform routine and three exemplary mission behaviors (the follow-street, follow-perimeter and follow-waypoints behaviors). In addition to Hough transform information, the OCU transceiver (see FIG. 7) may provide instructions to the mission behaviors, such as a distance leash to be used during a follow-street mission, a command to abort a mission, and/or other commands from the operator.

Figure 36:
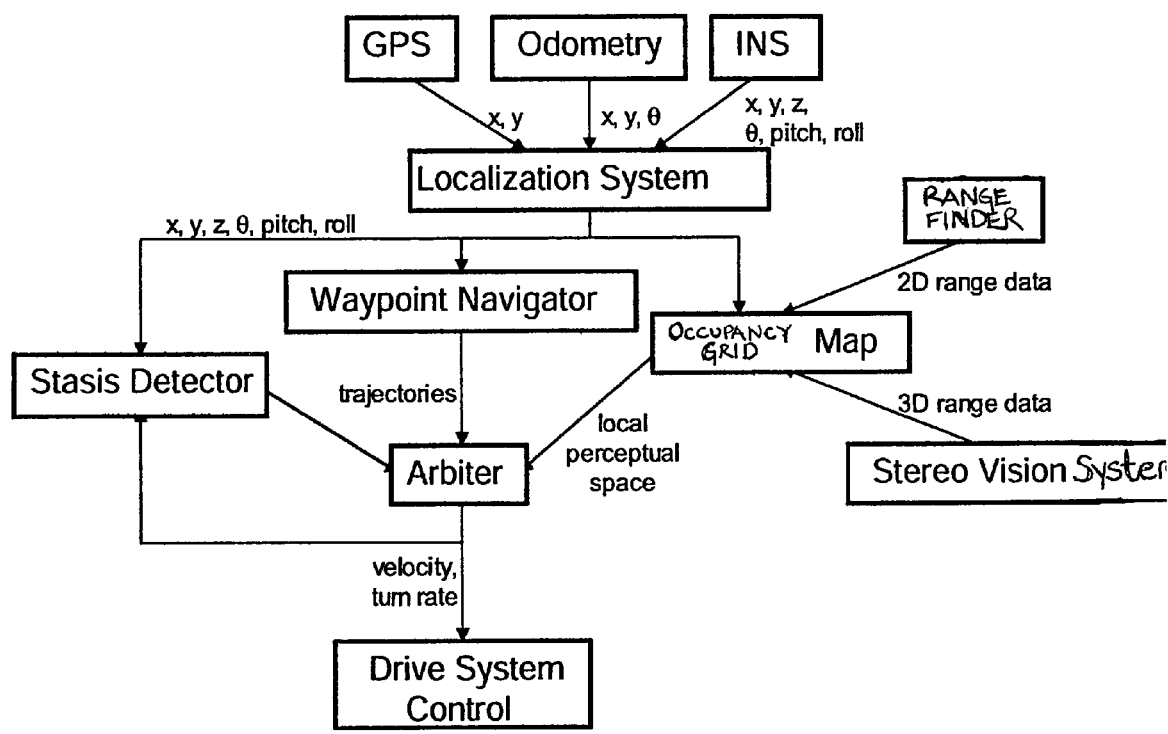
FIG. 36 illustrates an embodiment of a control software organization for a remote vehicle that can navigate autonomously using waypoint navigation.
Figure 37:
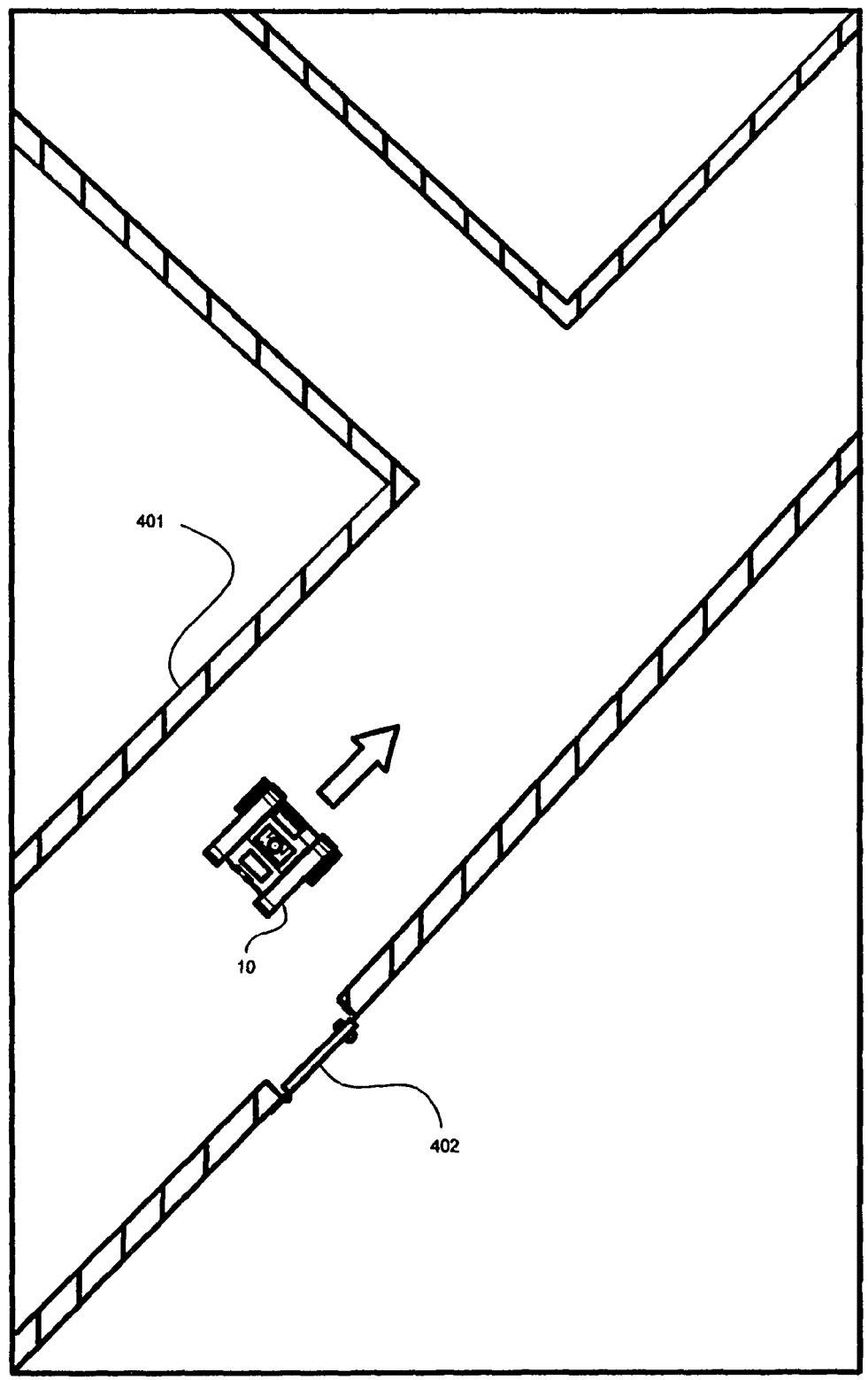
FIGS. 37-40 illustrate an embodiment of a remote vehicle navigating through a hallway using scaled vector field histogram (SVFH) analysis.

FIG. 36 illustrates an embodiment of a control software organization for a remote vehicle that can navigate autonomously using waypoint navigation. The remote vehicle control software includes a localization system for reckoning the remote vehicle's position in world coordinates based on positional data received from sensors, in this embodiment a GPS receiver, an odometry tracker, and an inertial navigation system. The localization information includes the remote vehicle's coordinates in the global X, Y, and Z planes, and may also specify the remote vehicle's attitude (θ), pitch, and roll orientations relative to the ground plane.

As illustrated, this localization information is made available to a waypoint navigator routine, an obstacle map routine, and a stasis detector routine. Each of these routines outputs to an arbiter routine, which processes the incoming data and outputs velocity and turn rate commands to the remote vehicle's drive system control routine for causing the drive system to appropriately steer and propel the remote vehicle toward a navigation goal.

As discussed, the follow-waypoints behavior uses information from the localization system to select a target trajectory for the remote vehicle 10—for example, by comparing the remote vehicle's global coordinates to the coordinates of the next waypoint in the mission information provided to the remote vehicle, and calculating the angle between the remote vehicle's current heading and the next waypoint. In accordance with the embodiment of the software organization illustrated in FIG. 36, the target trajectory is then passed on to the arbiter routine, which converts the target trajectory information into velocity and turn rate commands suitable for the drive system control routine to control the drive system to move the remote vehicle across the terrain at the appropriate heading and with the appropriate speed.

In an embodiment of the invention that additionally performs mapping, the mapping behavior receives input from a range finder and a stereo vision system, and constructs a grid occupancy map based on this input. The occupancy grid map is supplied to the arbiter and/or an obstacle detection behavior, where it can be used in combination with the target trajectory to adjust the actual steering and/or velocity commands issued to the drive system control routine.

As a result, when detectable obstacles are encountered along the path between the remote vehicle and its navigation target, the arbiter or obstacle detection behavior can deduce their presence and location from the occupancy grid map and alter the steering or velocity of the remote vehicle to avoid the obstacles. Further, in the embodiment of FIG. 36, the follow-waypoints routine need not receive the occupancy grid map nor take it into account, because the arbiter automatically processes the occupancy grid map and avoids obstacles when encountered, and resumes steering toward the target trajectory when no obstacles are imminent.

In accordance with one embodiment, a stasis detection behavior also receives the localization information (e.g., X, Y, Z, θ, pitch, roll) and can determine whether the robot is proceeding inappropriately. For example, the stasis detector behavior may periodically compare the remote vehicle's coordinates to a previous set of coordinates from a previous time and, if the two sets of coordinates are not sufficiently distant, the routine may then supply appropriate notice to the arbiter and appropriate stasis-escape or cul-de-sac avoidance actions may then be performed.

A library of Hough transform software routines may be integrated with the local obstacle map constructed from the laser and stereo vision range data.

In an embodiment of the invention, a range filter may be utilized to address, for example, instances where the remote vehicle becomes tilted and the laser plane intersects the ground, generating "false positive" (spurious) potential lines that could confuse navigation behaviors. A range filter uses sensor data from a pan/tilt sensor to project the laser points into 3D (see the organization diagram of FIG. 26, for example, illustrating the flow of pan/tilt data). Then, the points in 3D that are located below the robot (relative to the gravity vector) are removed from the laser scan before this scan is passed to the Hough transform. When the robot is tilted, the laser plane will intersect the ground at some point below the robot (assuming the robot is not directly adjacent to the ground), and so these points will have a negative z-coordinate value relative to the robot. In simple urban terrain, the mobile robot can just ignore these points. In more complex terrain, the mobile robot may be instructed to explicitly avoid these points.

This filter can work effectively to allow the robot to ignore spurious range readings that hit the ground because of the tilt of the robot, for example. This may enable the robot to successfully follow building walls without being distracted by the spurious ground hits. In addition, when the robot traverses over curbs, this can prevent the obstacle avoidance behavior from erroneously perceiving the ground as an obstacle and undesirably turning to avoid it, for example.

Integrating and Controlling Two or More Remote Vehicles

The present invention contemplates controlling a team of two or more remote vehicles 10 to perform joint operations. In accordance with an embodiment of the invention, an OCU such as the above-described tablet PC can be used to facilitate control of the team of remote vehicles by presenting information for each remote vehicle (e.g., map and location information) and accepting commands for the remote vehicles through a touch-sensitive screen.

The hardware and software features of the teamed remote vehicles include one or more of the embodiments of the remote vehicle 10 discussed above. Teamed remote vehicles may include additional hardware or software features to facilitate team operation. For example, a teamed remote vehicle may include extended VFH/SVFH functionality, and may include additional behavior routines for performing assemblage-type remote vehicle behaviors (e.g., "formation"

behaviors, a follow-the-leader behaviors, a caravaning behavior, distributed landscape exploration behaviors, etc.). In an embodiment of the invention, by using an appropriate software platform and software object model, remote vehicle group sensors and behaviors can be abstracted as network services accessible to OCU client software. The system may further include behaviors such as visual landmark modeling or group tasking, for example.

Figure 44:
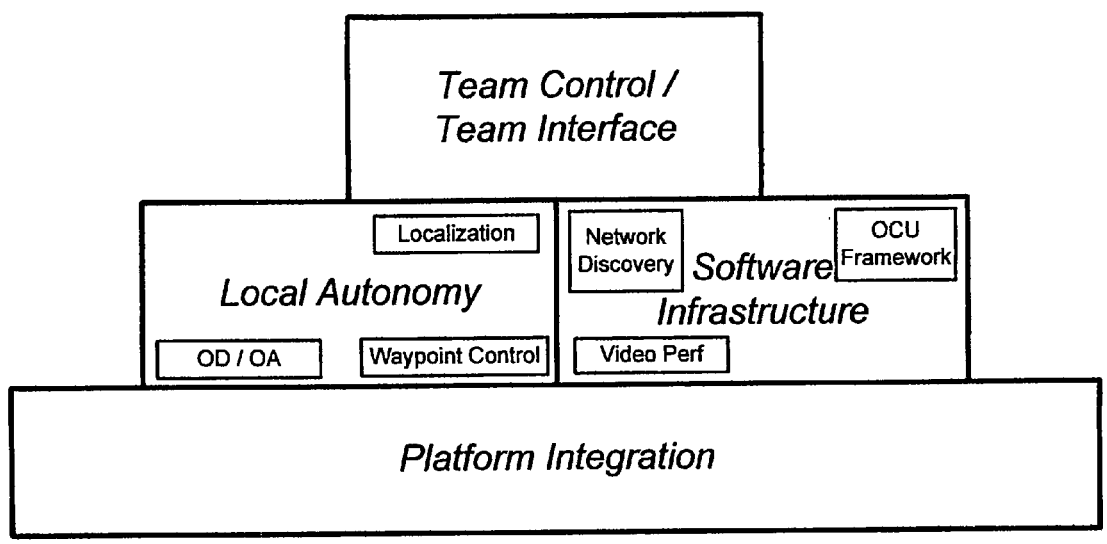
FIG. 44 illustrates an embodiment of building blocks of system organization used in a teamed remote vehicle control system.

FIG. 44 illustrates an embodiment of building blocks of system organization used in a teamed remote vehicle control system.

Figure 45:
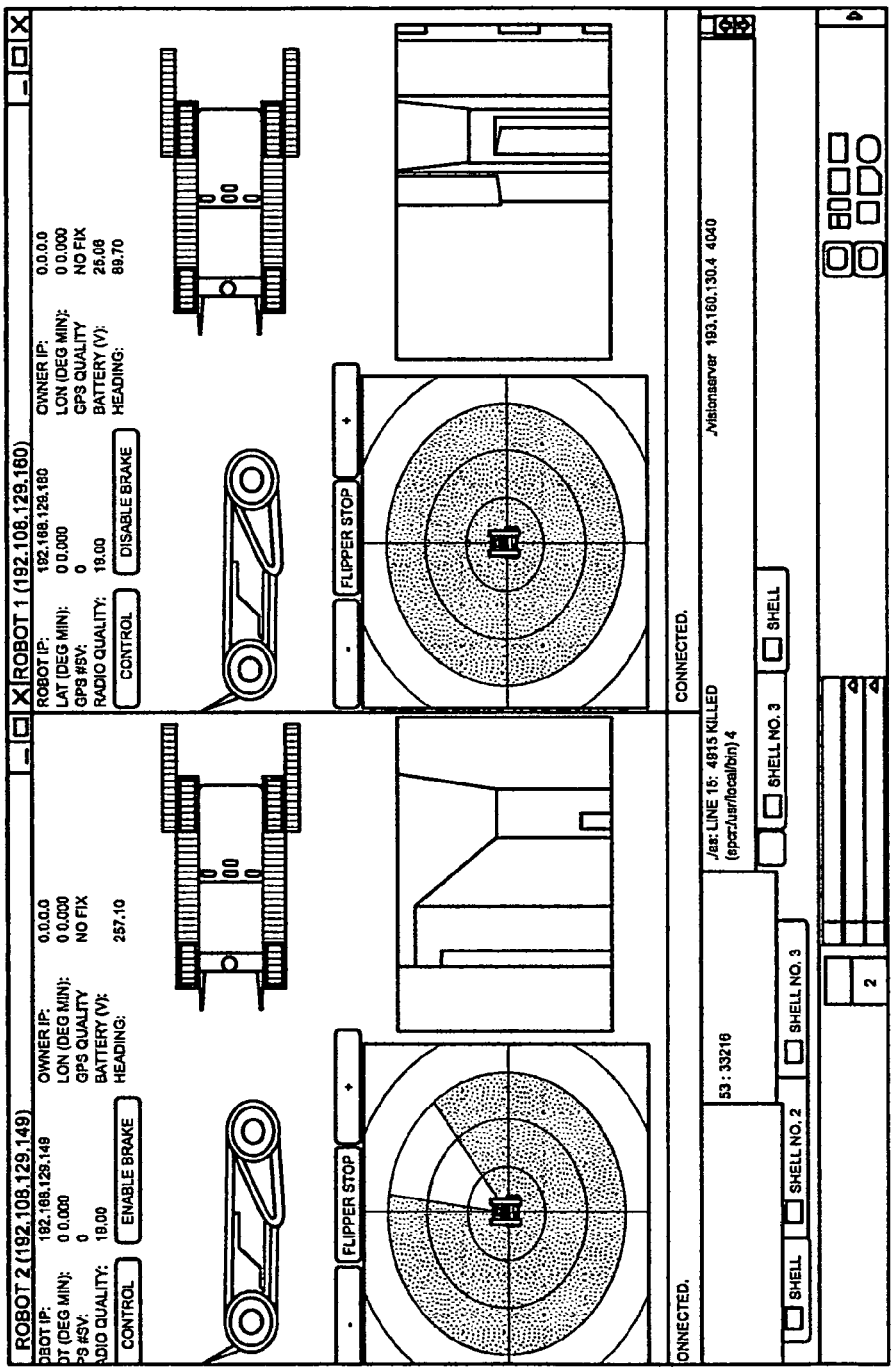
FIG. 45 illustrates an embodiment of an OCU display allowing an operator to control two teamed remote vehicles.

FIG. 45 illustrates an embodiment of an OCU display allowing an operator to control teamed remote vehicles, labeled Robot 1 and Robot 2 in their respective windows.

Figure 46:
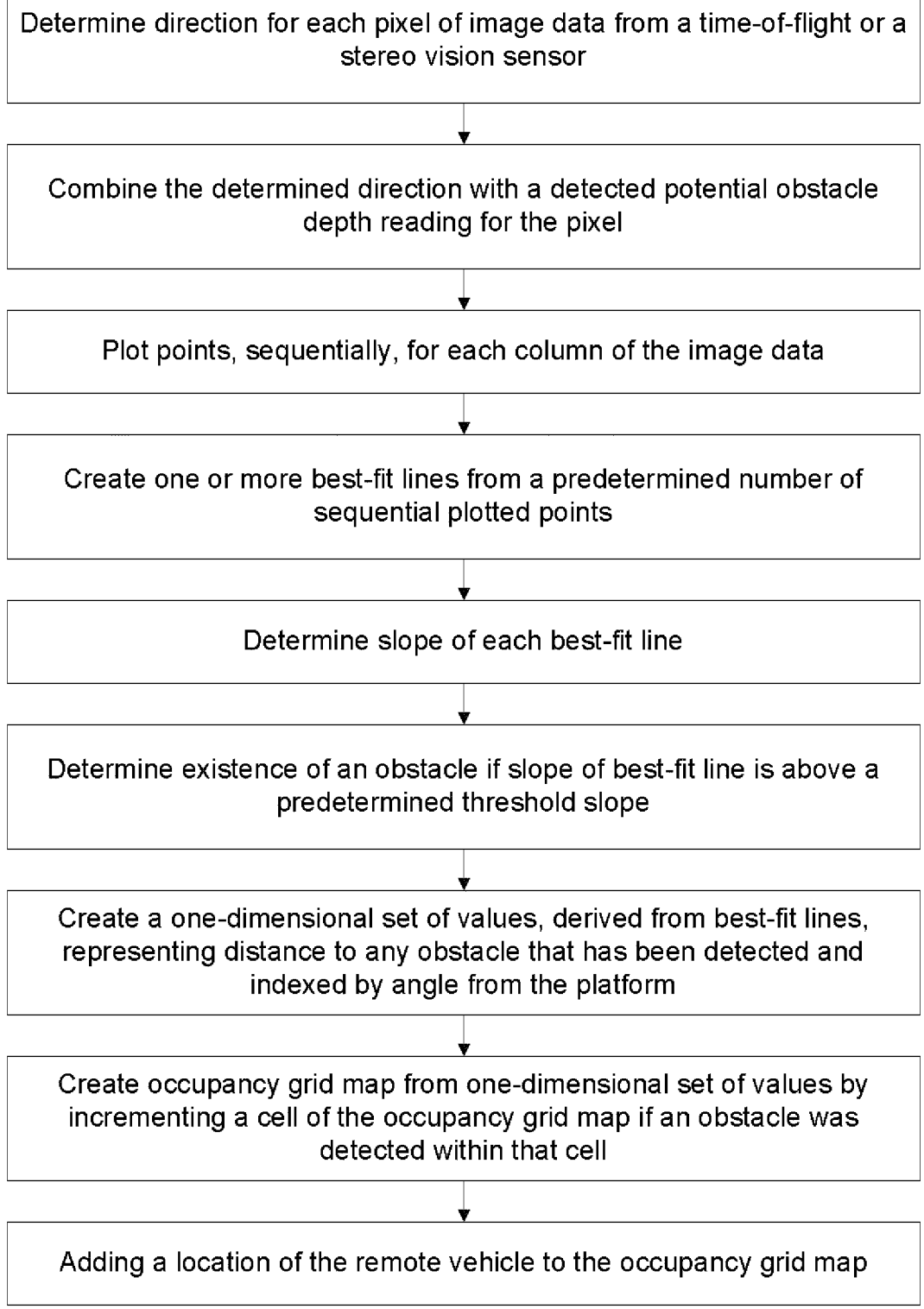
FIG. 46 is a flow chart illustrating an exemplary embodiment of a method for generating an occupancy grid map from image data received from either a time-of-tlight sensor or a stereo vision camera.

FIG. 46 is a flow chart illustrating an exemplary embodiment of a method for generating an occupancy grid map from image data received from either a time-of-flight sensor or a stereo vision camera.

The teamed remote vehicle control software permits each remote vehicle in a team a high degree of local autonomy, offloading remote vehicle-specific details such as obstacle avoidance to the remote vehicle's onboard obstacle avoidance. Accordingly, the teamed remote vehicle control software need only send high-level navigational goals to the teamed remote vehicles and then each teamed remote vehicle will take care of any necessary path adjustments or obstacle avoidance issues on its own as it proceeds toward the high-level navigational goal.

During a team navigation operation, the OCU 21 may display a map of the vicinity of the teamed remote vehicles, along with superimposed representations of the remote vehicles' respective positions in the map, as illustrated in FIG. 17. The display of FIG. 17 aids the operator in controlling teamed remote vehicles as discussed above. With these and other situational awareness representations, the operator can quickly gain an overview of the entire team of remote vehicles with only a quick glance. If an anomaly is detected, the operator can tunnel down into more detailed information, including full telemetry from each teamed remote vehicle, to diagnose and respond to any issues.

FIG. 13, discussed above, illustrates the communication organization between the constituent elements of the teamed remote vehicle control system, in which the operator interacts with the OCU, and the OCU communicates wirelessly with groups of teamed remote vehicles through a wireless LAN.

Although the above-noted discussion describes components and functions implemented in the embodiments with reference to particular standards and protocols, the invention is not limited to such standards and protocols. The terms "standard" or "protocol" are not limited in meaning to public or publicly promulgated concepts, and are inclusive of proprietary and private systems or rules. Standards for Internet and other packet-switched network transmission, for public telephone networks, for wireless communication, for buses and interfaces, or for cellular telephone networks represent examples of the state of the art. Such standards are periodically superseded by faster, more capable, or more efficient equivalents having essentially the same functions.

In most cases such standards coexist with similar competing and complementary standards and variations of each. Accordingly, competing and complementary standards (as well as variations of explicitly discussed standards and variations of competitor and complementary standards) having the same role in a network are considered to fall within the literal claim language, or alternatively as equivalents of the literal claim language. Superseding standards, files types, protocols, directory structures, language variations, and/or new generations of each, are also considered to fall within the literal claim language, or alternatively to be equivalents of the literal claim language.

It should be noted that not all of the functions and features described in detail herein are necessary for a complete and functional expression of the invention. No one (or more) described element or feature is implicitly, explicitly, or inherently critical or necessary to the operation of the invention, except as explicitly described herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" includes any and all sub-ranges between (and including) the minimum value of zero and the maximum value of 10, that is any and all sub-ranges having a minimum value of equal to or greater than zero and a maximum value of equal to or less than 10, e.g., 1 to 5.

It is noted that, as used in this specification and the appended claims, the singular forms "a," "an," and "the," include plural referents unless expressly and unequivocally limited to one referent. As used herein, the term "include" and its grammatical variants are intended to be non-limiting such that recitation of items in a list is not to the exclusion of other like items that can be substituted or added to the listed items.

It is to be understood that the present invention contemplates a system and method for controlling a remote vehicle that includes a variety of embodiments having varied capabilities and hardware. The true scope and spirit of the invention is set forth in the claims below. In one exemplary implementation of the invention on an iRobot PackBot Wayfarer having Tyzx G2 stereo vision system, remote vehicle capable of performing autonomous perimeter reconnaissance and route reconnaissance while building an occupancy grid map of the environment based on LIDAR (e.g., SICK LD OEM LIDAR) and using INS/GPS (e.g., an Athena INS/GPS) for localization. In an alternate exemplary implementation of the invention, UWB sensors (e.g., Multispectral Solutions, Inc.'s RaDeKL) and foliage navigation functionality can be added, perhaps with a separate interfacing processor.

It will be apparent to those skilled in the art that various modifications and variations can be made to the sample system and method for controlling a remote vehicle of the present disclosure without departing from the scope its teachings. Other embodiments of the disclosure will be apparent to those skilled in the art from consideration of the specification and practice of the teachings disclosed herein. It is intended that the specification and examples be considered as exemplary only.

What is claimed is:

1. A method of maintaining an occupancy grid map having cells, the method comprising:
   receiving image data from a sensor of a remote vehicle, the sensor being one of a time-of-flight sensor and a stereo vision camera sensor, the image data including one or more columns of pixels;
   for each pixel of the image data from the sensor:
      determining, at a processor operatively connected to the sensor, a direction for the pixel based on a field of view of the sensor; and
      combining, at the processor, the direction with depth information of the image data for a potential obstacle in the pixel;
   using, at the processor, the combined direction and depth information to plot points, sequentially, for each column of pixels of the image data, each point representing a distance of the potential obstacle from the remote vehicle and a direction of the potential obstacle;
   creating, at the processor, one or more best-fit lines from a predetermined number of sequential plotted points;
   determining, at the processor, a respective slope of each best-fit line, and determining the existence of the potential obstacle if the slope of the best-fit line is above a threshold slope;
   generating, at the processor, a one-dimensional set of values, derived from the best-fit lines, representing the distance to any obstacle detected by the sensor, each value being indexed by its angle with respect to the field of view of the sensor;
   updating, at the processor, the occupancy grid map based on the one-dimensional set of values by incrementing a cell of the occupancy grid map, if an obstacle was detected within that cell; and
   adding, at the processor, a location of the remote vehicle to the occupancy grid map.

2. The method of claim 1 wherein, a value of the one dimensional set of values is set equal to infinity when an object is not detected in a portion of the image data corresponding to an index of the value.

3. The method of claim 1, further comprising downsampling the one-dimensional set of values to a predetermined number of values.

4. The method of claim 1, wherein creating the occupancy grid map from the one-dimensional set of values further comprises decrementing a cell of the occupancy grid map if no obstacle was detected within that cell.

5. The method of claim 1, wherein more recent depth information is weighted to represent its greater importance in creating the occupancy grid map.

6. The method of claim 5, wherein the time-of-flight sensor is a SwissRanger sensor or a flash LIDAR sensor.

7. A method for generating obstacle detection information, the method comprising:
   receiving image data from a sensor of a remote vehicle, the sensor being one of a time-of-flight sensor and a stereo vision camera sensor, the image data including one or more columns of pixels;
   for each pixel of the image data from the sensor:
      determining, at a processor operatively connected to the sensor, a direction for the pixel based on a field of view of the sensor; and
      combining, at the processor, the direction with a depth information of the image data for a potential obstacle in the pixel;
   using, at the processor, the combined direction and depth information to plot points, sequentially, for each column of pixels of the image data, each point representing a distance of the potential obstacle from the remote vehicle and a direction of the potential obstacle;
   creating, at the processor, one or more best-fit lines from a predetermined number of sequential plotted points;
   determining, at the processor, a respective slope of each best-fit line, and determining the existence of the potential obstacle if the slope of the best-fit line is above a threshold slope; and
   generating, at the processor, a one-dimensional set of values, derived from the best-fit lines, representing the distance to any obstacle detected by the sensor, each value being indexed by its angle with respect to the field of view of the sensor.

8. The method of claim 7, further comprising downsampling the one-dimensional set of values to a predetermined number of values.

* * * * *

UNITED STATES PATENT AND TRADEMARK OFFICE
CERTIFICATE OF CORRECTION

PATENT NO.         : 8,577,538 B2                                    Page 1 of 1
APPLICATION NO.    : 11/826541
DATED              : November 5, 2013
INVENTOR(S)        : Scott Raymond Lenser It is certified that error appears in the above-identified patent and that said Letters Patent is hereby corrected as shown below:

In the Claims

At column 46, claim number 7, line number 22, which reads "the direction with a depth" should read "the direction with depth".

Signed and Sealed this
Fifteenth Day of April, 2014

Michelle K. Lee
*Deputy Director of the United States Patent and Trademark Office*